United States Patent
Hyde et al.

(10) Patent No.: US 10,008,294 B2
(45) Date of Patent: Jun. 26, 2018

(54) METHODS AND SYSTEMS FOR MIGRATING FUEL ASSEMBLIES IN A NUCLEAR FISSION REACTOR

(75) Inventors: Roderick A. Hyde, Redmond, WA (US); Robert C Petroski, Cambridge, MA (US); Joshua C. Walter, Kirkland, WA (US); Thomas Allan Weaver, San Mateo, CA (US); Charles Whitmer, North Bend, WA (US); Lowell L. Wood, Jr., Bellevue, WA (US); George B. Zimmerman, Lafayette, CA (US); Ehud Greenspan, Emeryville, CA (US)

(73) Assignee: TerraPower, LLC, Bellevue, WA (US)

(*) Notice: Subject to any disclaimer, the term of this patent is extended or adjusted under 35 U.S.C. 154(b) by 2106 days.

(21) Appl. No.: 12/590,448

(22) Filed: Nov. 6, 2009

(65) Prior Publication Data
US 2011/0110480 A1    May 12, 2011

(51) Int. Cl.
| | | |
|---|---|---|
| *G21C 7/00* | (2006.01) |
| *G21C 1/02* | (2006.01) |
| *G21C 7/30* | (2006.01) |
| *G21C 17/108* | (2006.01) |
| *G21D 3/00* | (2006.01) |

(52) U.S. Cl.
CPC .............. *G21C 7/005* (2013.01); *G21C 1/026* (2013.01); *G21C 7/30* (2013.01); *G21C 17/108* (2013.01); *G21D 3/001* (2013.01); *Y02E 30/34* (2013.01); *Y02E 30/39* (2013.01)

(58) Field of Classification Search
CPC ........ G21C 7/005; G21C 7/30; G21C 17/108; G21D 3/001; Y02E 30/34; Y02E 30/39
USPC .......................................................... 376/237
See application file for complete search history.

(56) References Cited

U.S. PATENT DOCUMENTS

| | | | |
|---|---|---|---|
| 2,992,174 | A | 7/1961 | Edlund et al. |
| 3,262,859 | A | 7/1966 | Winsche |
| 3,321,377 | A | 5/1967 | Schluderberg |
| 3,335,061 | A | 8/1967 | Winsche et al. |
| 3,575,803 | A | 4/1971 | Greebler |
| 3,591,453 | A | 7/1971 | Gratton |
| 3,957,575 | A | 5/1976 | Fauth, Jr. et al. |
| 4,040,902 | A | 8/1977 | Mysels |

(Continued)

FOREIGN PATENT DOCUMENTS

| | | |
|---|---|---|
| CN | 86108810 A | 8/1987 |
| CN | 1062230 A | 6/1992 |

(Continued)

OTHER PUBLICATIONS

PCT International Search Report; International App. No. PCT/US2010/002925; dated Jan. 31, 2011; pp. 1-2.

(Continued)

*Primary Examiner* — Frank J McGue

(57) ABSTRACT

Illustrative embodiments provide methods and systems for migrating fuel assemblies in a nuclear fission reactor, methods of operating a nuclear fission traveling wave reactor, methods of controlling a nuclear fission traveling wave reactor, systems for controlling a nuclear fission traveling wave reactor, computer software program products for controlling a nuclear fission traveling wave reactor, and nuclear fission traveling wave reactors with systems for migrating fuel assemblies.

41 Claims, 38 Drawing Sheets

(56) References Cited

U.S. PATENT DOCUMENTS

| | | | |
|---|---|---|---|
| 4,056,437 A | | 11/1977 | Giacometti et al. |
| 4,285,769 A | * | 8/1981 | Specker et al. ............... 376/267 |
| 4,378,329 A | | 3/1983 | Uchikawa et al. |
| 4,584,167 A | | 4/1986 | Carelli |
| 4,649,020 A | | 3/1987 | Dehon et al. |
| 4,762,672 A | | 8/1988 | Kurihara et al. |
| 4,835,446 A | | 5/1989 | Nation et al. |
| 4,852,973 A | | 8/1989 | Durnin et al. |
| 5,143,690 A | | 9/1992 | Congdon et al. |
| 5,282,229 A | | 1/1994 | Ukai et al. |
| 5,305,016 A | | 4/1994 | Quate |
| 5,307,387 A | | 4/1994 | Nakajima et al. |
| 5,446,773 A | | 8/1995 | Wakabayashi |
| 5,490,185 A | | 2/1996 | Dent et al. |
| 5,677,938 A | | 10/1997 | Gassmann |
| 6,026,136 A | | 2/2000 | Radkowsky |
| 6,181,759 B1 | | 1/2001 | Heibel |
| 6,339,629 B1 | | 1/2002 | Takeuchi et al. |
| 6,504,889 B1 | | 1/2003 | Narita et al. |
| 6,748,348 B1 | | 6/2004 | Russell, II |
| 6,862,329 B1 | | 3/2005 | Kropaczek et al. |
| 7,224,761 B2 | | 5/2007 | Popa |
| 8,942,338 B2 | | 1/2015 | Ahlfeld et al. |
| 2001/0016025 A1 | | 8/2001 | Schulze |
| 2001/0026603 A1 | | 10/2001 | Hirukawa et al. |
| 2003/0138071 A1 | | 7/2003 | Arias et al. |
| 2004/0141578 A1 | | 7/2004 | Enfinger |
| 2007/0002998 A1 | | 1/2007 | Helmersson et al. |
| 2008/0123795 A1 | | 5/2008 | Hyde et al. |
| 2008/0123796 A1 | | 5/2008 | Hyde et al. |
| 2008/0123797 A1 | | 5/2008 | Hyde et al. |
| 2008/0232535 A1 | | 9/2008 | Ahlfeld et al. |
| 2008/0240333 A1 | | 10/2008 | Ahlfeld et al. |
| 2009/0080586 A1 | | 3/2009 | Yokoyama et al. |
| 2009/0080587 A1 | | 3/2009 | Ahlfeld et al. |
| 2009/0175402 A1 | | 7/2009 | Hyde et al. |
| 2009/0232268 A1 | | 9/2009 | Ahlfeld et al. |
| 2009/0252273 A1 | * | 10/2009 | Gilleland et al. ............. 376/261 |
| 2009/0252283 A1 | | 10/2009 | Ahlfeld et al. |
| 2010/0254502 A1 | | 10/2010 | Ahlfeld et al. |

FOREIGN PATENT DOCUMENTS

| | | | |
|---|---|---|---|
| CN | 1516202 A | | 7/2004 |
| CN | 1541395 A | | 10/2004 |
| CN | 102714066 A | | 10/2012 |
| DE | 2839667 A1 | | 9/1978 |
| JP | 56-087891 | | 7/1981 |
| JP | 63-154994 | | 6/1988 |
| JP | 63-187191 | | 8/1988 |
| JP | 2010-51117 A | | 2/1989 |
| JP | 11-295462 | | 10/1999 |
| JP | 2002-170206 A | | 6/2002 |
| JP | 2003-021692 A | | 1/2003 |
| JP | 2004-299286 | | 10/2004 |
| JP | 2007-232429 | | 9/2007 |
| JP | 2009-145294 | | 7/2009 |
| JP | 2009-195294 | | 9/2009 |
| JP | 2009-292481 A | | 12/2009 |
| JP | 2013-510310 A | | 3/2013 |
| WO | 2005022551 A1 | | 3/2005 |
| WO | WO2008/097298 | | 8/2008 |
| WO | 2009058185 | | 5/2009 |
| WO | WO2010147614 | | 10/2010 |
| WO | WO2010147615 | | 10/2010 |

OTHER PUBLICATIONS

Toshinsky, Georgy I.; "LMFBR Operation in the Nuclear Cycle Without Fuel Reprocessing"; Proceedings of the International Topical Meeting on Advanced Reactors Safety (ARS '97); Jun. 1-5, 1997; pp. 39-44; vol. I; Orlando, FL.

Greenspan, E.; Hejzlar, P.; Sekimoto, H.; Toshinsky, G.; and Wade, D.C.; "New Fuel Cycle and Fuel Management Options in Heavy Liquid Metal Cooled Reactors"; Nuclear Technology; Aug. 15, 2005; pp. 177-191; vol. 151.

PCT International Search Report; International App. No. PCT/US2010/02912; dated Aug. 17, 2011; pp. 1-2.

PCT International Search Report; International App. No. PCT/US2010/02907; dated Aug. 22, 2011; pp. 1-3.

PCT International Search Report; International App. No. PCT/US2010/02905; dated Aug. 29, 2011; pp. 1-2.

Ryu, Kouichi and Sekimoto, Hiroshi; "Basic Study of Concentrically Zoned Fast Reactor Using Natural Uranium Highly Efficiently without Fuel Reprocessing"; Annals of Nuclear Energy; bearing dates of Mar. 26, 1999 and May 4, 1999; pp. 93-98; vol. 27; Elsevier Science Ltd.

Teller, Edward, Ishikawa, Muriel, wood, Lowell, Hyde, Roderick, and Nuckolls, John; "Completely Automated Nuclear Power Reactors for Long-Term Operation: III. Enabling Technology for Large-Scale, Low-Risk, Affordable Nuclear Electricity"; presented at the Jul. 2003 Workshop of the Aspen Global Change Institute; bearing a date of Jul. 2003; pp. 1-57; University of California Lawrence Livermore National Laboratory.

Chinese State Intellectual Property Office, Office Action; App. No. 201080060896.2; dated Aug. 26, 2014 (received by our Agent on Aug. 29, 2014); pp. 1-10 (no translation available).

Author Unknown, "Boiling water reactor"; Wikipedia, the free encyclopedia. Last modified on Mar. 18, 2016, Retrieved from: https://en.wikipedia.org/w/index.php?title=Boiling_water_ reactor &oldid=710692224.

Atefi et al., "An Evaluation of the Breed/Burn Fast Reactor Concept"; Massachusetts Institute of Technology, Department of Nuclear Engineering; Dec. 1979; pp. 1-302.

Rydin, Roger A., "Wave Mechanics without Waves: A New Classical Model for Nuclear Reactions", The General Science Journal, Jan. 2009.

Ellis et al., "Travelling-Wave Reactors: A Truly Sustainable and Full-Scale Resource for Global Energy Needs", Proceedings of ICAPP '10, San Diego, CA, Jun. 13-17, 2010.

Khotyayinstev et al., "Travelling Wave Reactor; Velocity Formation Mechanisms", PHYSOR 2010-Advances in Reactor Physics to Power the Nuclear Renaissance, Pittsburg, PA, May 9-14, 2010, American Nuclear Society.

Pavlovich et al., "Reactor Operating on a Slow Wave of Nuclear Fission", Atomic Energy, vol. 102, No. 3, pp. 181-189, 2007.

\* cited by examiner

26

Controllably migrate selected ones of the plurality of nuclear fission fuel subassemblies radially along the first dimension from respective first locations toward respective second locations — 42

Controllably migrate selected ones of the plurality of nuclear fission fuel subassemblies spirally along the first dimension from respective first locations toward respective second locations — 44

FIG.1N

METHODS AND SYSTEMS FOR MIGRATING FUEL ASSEMBLIES IN A NUCLEAR FISSION REACTOR

BACKGROUND

The present application relates to methods and systems for migrating fuel assemblies in a nuclear fission reactor.

SUMMARY

Illustrative embodiments provide methods and systems for migrating fuel assemblies in a nuclear fission reactor, methods of operating a nuclear fission traveling wave reactor, methods of controlling a nuclear fission traveling wave reactor, systems for controlling a nuclear fission traveling wave reactor, computer software program products for controlling a nuclear fission traveling wave reactor, and nuclear fission traveling wave reactors with systems for migrating fuel assemblies.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIGS. 1M-1N are block diagrams of details of part of the method of FIG. 1A.

FIGS. 1X-1AF are block diagrams of details of parts of the method of FIG. 1A.

DETAILED DESCRIPTION

Figure 1A:
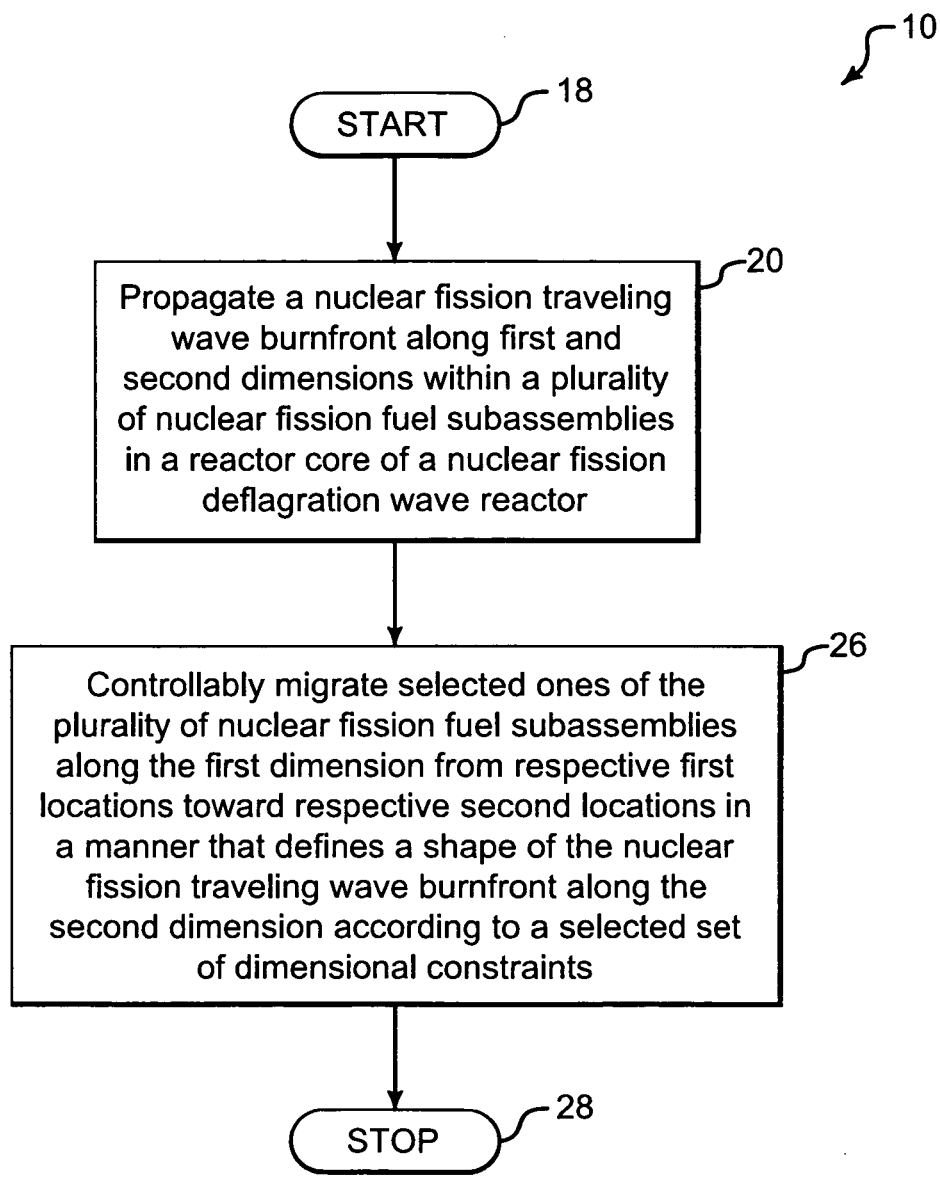
FIG. 1A is a block diagram of an illustrative method of operating a nuclear fission traveling wave reactor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Illustrative embodiments provide methods and systems for migrating fuel assemblies in a nuclear fission reactor, methods of operating a nuclear fission traveling wave reactor, methods of controlling a nuclear fission traveling wave reactor, systems for controlling a nuclear fission traveling wave reactor, computer software program products for controlling a nuclear fission traveling wave reactor, and nuclear fission traveling wave reactors with systems for migrating fuel assemblies.

Overview of Nuclear Fission Traveling Wave

Before details are explained regarding the non-limiting embodiments set forth herein, a brief overview will be set forth regarding a nuclear fission traveling wave. While a nuclear fission traveling wave is also known as a nuclear fission deflagration wave, for sake of clarity reference will be made herein to a nuclear fission traveling wave. Portions of the following discussion include information excerpted from a paper entitled "Completely Automated Nuclear Power Reactors For Long-Term Operation: III. Enabling Technology For Large-Scale, Low-Risk, Affordable Nuclear Electricity" by Edward Teller, Muriel Ishikawa, Lowell Wood, Roderick Hyde, and John Nuckolls, presented at the July 2003 Workshop of the Aspen Global Change Institute, University of California Lawrence Livermore National Laboratory publication UCRL-JRNL-122708 (2003) (This paper was prepared for submittal to *Energy, The Interna-*

*tional Journal*, 30 Nov. 2003), the contents of which are hereby incorporated by reference.

In a "wave" that moves through a core of a nuclear fission traveling wave reactor at speeds on the order of around a centimeter or so per year, fertile nuclear fission fuel material is bred into fissile nuclear fission fuel material, which then undergoes fission.

Certain of the nuclear fission fuels envisioned for use in nuclear fission traveling wave reactors are typically widely available, such as without limitation uranium (natural, depleted, or enriched), thorium, plutonium, or even previously-burned nuclear fission fuel assemblies. Other, less widely available nuclear fission fuels, such as without limitation other actinide elements or isotopes thereof may also be used. Some nuclear fission traveling wave reactors contemplate long-term operation at full power on the order of around ⅓ century to around ½ century or longer. Some nuclear fission traveling wave reactors do not contemplate nuclear refueling (but instead contemplate burial in-place at end-of-life) while some other nuclear fission traveling wave reactors contemplate nuclear refueling—with some nuclear refueling occurring during shutdown and some nuclear refueling occurring during operation at power. It is also contemplated that nuclear fission fuel reprocessing may be avoided in some cases, thereby mitigating possibilities for diversion to military uses and other issues.

Simultaneously accommodating desires to achieve ⅓-½ century (or longer) of operations at full power without nuclear refueling and to avoid nuclear fission fuel reprocessing may entail use of a fast neutron spectrum. Moreover, propagating a nuclear fission traveling wave permits a high average burn-up of non-enriched actinide fuels, such as natural uranium or thorium, and use of a comparatively small "nuclear fission igniter" region of moderate isotopic enrichment of nuclear fissionable materials in the core's fuel charge.

As such, a nuclear fission traveling wave reactor core suitably can include a nuclear fission igniter and a larger nuclear fission deflagration burn-wave-propagating region. The nuclear fission deflagration burn-wave-propagating region suitably contains thorium or uranium fuel, and functions on the general principle of fast neutron spectrum fission breeding.

A nuclear fission traveling wave reactor core suitably is a breeder for reasons of efficient nuclear fission fuel utilization and of minimization of requirements for isotopic enrichment. Further, a fast neutron spectrum suitably is used because the high absorption cross-section of fission products for thermal neutrons typically does not permit high fuel utilization of thorium or of the more abundant uranium isotope, $^{238}U$, in uranium-fueled embodiments, without removal of fission products.

An illustrative nuclear fission traveling wave will now be explained. Propagation of deflagration burning-waves through nuclear fission fuel materials can release power at predictable levels. Moreover, if the material configuration has sufficiently time-invariant features such as configurations found in typical commercial power-producing nuclear reactors, then ensuing power production may be at a steady level. Finally, if traveling wave propagation-speed may be externally modulated in a practical manner, the energy release-rate and thus power production may be controlled as desired.

Nucleonics of the nuclear fission traveling wave are explained below. Inducing nuclear fission of selected isotopes of the actinide elements—the fissile ones—by absorption of neutrons of any energy may permit the release of nuclear binding energy at any material temperature, including arbitrarily low ones. The neutrons that are absorbed by the fissile actinide element may be provided by the nuclear fission igniter.

Release of more than a single neutron per neutron absorbed, on the average, by nuclear fission of substantially any actinide isotope can provide opportunity for a diverging neutron-mediated nuclear-fission chain reaction in such materials. Typically, the number of neutrons released per absorption is identified as $\eta$, where $\eta = \upsilon \sigma_f/(\sigma_f - \sigma_c)$ with $\upsilon$ being the number of neutrons released per fission. Release of more than two neutrons for every neutron which is absorbed (over certain neutron-energy ranges, on the average) may permit first converting an atom of a non-fissile isotope to a fissile one (via neutron capture and subsequent beta-decay) by an initial neutron capture, and then additionally permit neutron-fissioning the nucleus of the newly-created fissile isotope in the course of a second neutron fission absorption.

Most high-Z ($Z \geq 90$) nuclear species can be used as nuclear fission fuel material in a traveling wave reactor (or a breeder reactor) if, on the average, one neutron from a given nuclear fission event can be radiatively captured on a non-fissile-but-'fertile' nucleus which will then convert (such as via beta-decay) into a fissile nucleus and a second neutron from the same fission event can be captured on a fissile nucleus and, thereby, induce fission. In particular, if either of these arrangements is steady-state, then sufficient conditions for propagating a nuclear fission traveling wave in the given material can be satisfied.

Due to beta-decay of intermediate isotopes in the process of converting a fertile nucleus to a fissile nucleus, the rate at which fissile material is made available for fissioning is limited. The characteristic speed of wave advance is, therefore, limited by the half-lives on the order of days or months. For example, a characteristic speed of wave advance may be on the order of the ratio of the distance traveled by a neutron from its fission-birth to its radiative capture on a fertile nucleus (that is, a mean free path) to the half-life of the (longest-lived nucleus in the chain of) beta-decay leading from the fertile nucleus to the fissile one. Such a characteristic fission neutron-transport distance in normal-density actinides is approximately 10 cm and the beta-decay half-life is $10^5$-$10^6$ seconds for most cases of interest. Accordingly for some designs, the characteristic wave-speed is $10^{-4}$-$10^{-7}$ cm sec$^{-1}$. Such a relatively slow speed-of-advance indicates that the wave can be characterized as a traveling wave or a deflagration wave, rather than a detonation wave.

If the traveling wave attempts to accelerate, its leading-edge counters ever-more-pure fertile material (which is relatively lossy in a neutronic sense), for the concentration of fissile nuclei well ahead of the center of the wave becomes exponentially low. Thus the wave's leading-edge (referred to herein as a "burnfront") stalls or slows. Conversely, if the wave slows and the conversion ratio is maintained greater than one (that is, breeding rate is greater than fissioning rate), then the local concentration of fissile nuclei arising from continuing beta-decay increases, the local rates of fission and neutron production rise, and the wave's leading-edge, that is the burnfront, accelerates.

Finally, if the heat associated with nuclear fission is removed sufficiently rapidly from all portions of the configuration of initially fertile matter in which the wave is propagating, the propagation may take place at an arbitrarily low material temperature—although the temperatures of both the neutrons and the fissioning nuclei may be around 1 MeV.

Such conditions for initiating and propagating a nuclear fission traveling wave can be realized with readily available materials. While fissile isotopes of actinide elements are rare terrestrially, both absolutely and relative to fertile isotopes of these elements, fissile isotopes can be concentrated, enriched and synthesized. For example, the use of both naturally-occurring and man-made fissile isotopes, such as $U^{233}$, $^{235}U$ and $^{239}Pu$, respectively, in initiating nuclear fission chain reactions is well-known.

Consideration of pertinent neutron cross-sections suggests that a nuclear fission traveling wave can burn a large fraction of a core of naturally-occurring actinides, such as $^{232}Th$ or $^{238}U$, if the neutron spectrum in the wave is a 'hard' or 'fast' one. That is, if the neutrons which carry the chain reaction in the wave have energies which are not very small compared to the approximately 1 MeV at which they are evaporated from nascent fission fragments, then relatively large losses to the spacetime-local neutron economy can be avoided when the local mass-fraction of fission products becomes comparable to that of the fertile material (recalling that a single mole of fissile material fission-converts to two moles of fission-product nuclei). Even neutronic losses to typical neutron-reactor structural materials, such as Ta, which has desirable high-temperature properties, may become substantial at neutron energies≤0.1 MeV.

Another consideration is the (comparatively small) variation with incident neutron energy of the neutron multiplicity of fission, $\nu$, and the fraction of all neutron absorption events which result in fission (rather than merely γ-ray emission from neutron capture), $\alpha$. The algebraic sign of the function $\alpha(\nu-2)$ constitutes a condition for the feasibility of nuclear fission traveling wave propagation in fertile material compared with the overall fissile isotopic mass budget, in the absence of neutron leakage from the core or parasitic absorptions (such as on fission products) within its body, for each of the fissile isotopes of the reactor core. The algebraic sign is generally positive for all fissile isotopes of interest, from fission neutron-energies of approximately 1 MeV down into the resonance capture region.

The quantity $\alpha(\nu-2)/\nu$ upper-bounds the fraction of total fission-born neutrons which may be lost to leakage, parasitic absorption, or geometric divergence during traveling wave propagation. It is noted that this fraction is 0.15-0.30 for the major fissile isotopes over the range of neutron energies which prevails in all effectively unmoderated actinide isotopic configurations of practical interest (approximately 0.1-1.5 MeV). In contrast to the situation prevailing for neutrons of (epi-) thermal energy, in which the parasitic losses due to fission products dominate those of fertile-to-fissile conversion by 1-1.5 decimal orders-of-magnitude, fissile element generation by capture on fertile isotopes is favored over fission-product capture by 0.7-1.5 orders-of-magnitude over the neutron energy range 0.1-1.5 MeV. The former suggests that fertile-to-fissile conversion will be feasible only to the extent of 1.5-5% percent at-or-near thermal neutron energies, while the latter indicates that conversions in excess of 50% may be expected for near-fission energy neutron spectra.

In considering conditions for propagation of a nuclear fission traveling wave, in some approaches neutron leakage may be effectively ignored for very large, "self-reflected" actinide configurations. It will be appreciated that traveling wave propagation can be established in sufficiently large configurations of the two types of actinides that are relatively abundant terrestrially: $^{232}Th$ and $^{238}U$, the exclusive and the principal (that is, longest-lived) isotopic components of naturally-occurring thorium and uranium, respectively.

Specifically, transport of fission neutrons in these actinide isotopes will likely result in either capture on a fertile isotopic nucleus or fission of a fissile one before neutron energy has decreased significantly below 0.1 MeV (and thereupon becomes susceptible with non-negligible likelihood to capture on a fission-product nucleus). It will be appreciated that fission product nuclei concentrations can approach or in some circumstances exceed fertile ones and fissile nuclear concentrations may be an order-of-magnitude less than the lesser of fission-product or fertile ones while remaining quantitatively substantially reliable. Consideration of pertinent neutron scattering cross-sections suggests that configurations of actinides which are sufficiently extensive to be effectively infinitely thick—that is, self-reflecting—to fission neutrons in their radial dimension will have density-radius products>>200 $gm/cm^2$—that is, they will have radii>>10-20 cm of solid-density $^{238}U$-$^{232}Th$.

The breeding-and-burning wave provides sufficient excess neutrons to breed new fissile material 1-2 mean-free-paths into the yet-unburned fuel, effectively replacing the fissile fuel burnt in the wave. The 'ash' behind the burn-wave's peak is substantially 'neutronically neutral', since the neutronic reactivity of its fissile fraction is just balanced by the parasitic absorptions of structure and fission product inventories on top of leakage. If the fissile atom inventory in the wave's center and just in advance of it is time-stationary as the wave propagates, then it is doing so stably; if less, then the wave is 'dying', while if more, the wave may be said to be 'accelerating.'

Thus, a nuclear fission traveling wave may be propagated and maintained in substantially steady-state conditions for long time intervals in configurations of naturally-occurring actinide isotopes.

The above discussion has considered, by way of non-limiting example, circular cylinders of natural uranium or thorium metal of less than a meter or so diameter—and that may be substantially smaller in diameter if efficient neutron reflectors are employed—that may stably propagate nuclear fission traveling waves for arbitrarily great axial distances. However, propagation of nuclear fission traveling waves is not to be construed to be limited to circular cylinders, to symmetric geometries, or to singly-connected geometries. To that end, additional embodiments of alternate geometries of nuclear fission traveling wave reactor cores are described in U.S. patent application Ser. No. 11/605,943, entitled AUTOMATED NUCLEAR POWER REACTOR FOR LONG-TERM OPERATION, naming RODERICK A. HYDE, MURIEL Y. ISHIKAWA, NATHAN P. MYHRVOLD, AND LOWELL L. WOOD, JR. as inventors, filed 28 Nov. 2006, the contents of which are hereby incorporated by reference.

Propagation of a nuclear fission traveling wave has implications for embodiments of nuclear fission traveling wave reactors. As a first example, local material temperature feedback can be imposed on the local nuclear reaction rate at an acceptable expense in the traveling wave's neutron economy. Such a large negative temperature coefficient of neutronic reactivity confers an ability to control the speed-of-advance of the traveling wave. If very little thermal power is extracted from the burning fuel, its temperature rises and the temperature-dependent reactivity falls, and the nuclear fission rate at wave-center becomes correspondingly small and the wave's equation-of-time reflects only a very small axial rate-of-advance. Similarly, if the thermal power removal rate is large, the material temperature decreases and the neutronic reactivity rises, the intra-wave neutron economy becomes relatively undamped, and the wave advances axially relatively rapidly. Details regarding illustrative implementations of temperature feedback that may be incorporated within embodiments of reactor core assemblies are described in U.S. patent application Ser. No. 11/605,933, entitled CONTROLLABLE LONG TERM OPERATION OF A NUCLEAR REACTOR, naming RODERICK A. HYDE, MURIEL Y. ISHIKAWA, NATHAN P. MYHRVOLD, AND LOWELL L. WOOD, JR. as inventors, filed 28 Nov. 2006, the contents of which are hereby incorporated by reference.

As a second example of implications of propagation of a nuclear fission traveling wave on embodiments of nuclear fission traveling wave reactors, less than all of the total fission neutron production in a nuclear fission traveling wave reactor may be utilized. For example, reactivity control systems, such as without limitation neutron-absorbing material in control rods or local material-temperature thermostating modules, may use around 5-10% of the total fission neutron production in the nuclear fission traveling wave reactor 10. Another ≤10% of the total fission neutron production in a nuclear fission traveling wave reactor may be lost to parasitic absorption in the high-performance, high temperature, structure materials (such as Ta, W, or Re) employed in structural components of the nuclear fission traveling wave reactor. This loss occurs in order to realize desired thermodynamic efficiencies in conversion to electricity and to gain high system safety figures-of-merit. The Zs of these materials, such as Ta, W and Re, are approximately 80% of that of the actinides, and thus their radiative capture cross-sections for high-energy neutrons are not particularly small compared to those of the actinides. A final 5-10% of the total fission neutron production in a nuclear fission traveling wave reactor may be lost to parasitic absorption in fission products. However, it may be expected that the spectrum may be similar to that of a sodium-cooled fast reactor in that parasitic absorption may account for only around a 1-2% loss. As noted above, the neutron economy characteristically is sufficiently rich that approximately 70% of total fission neutron production is sufficient to sustain traveling wave-propagation in the absence of leakage and rapid geometric divergence.

As a third example of implications of propagation of a nuclear fission traveling wave on embodiments of nuclear fission traveling wave reactors, high burn-ups (on the order of up to around 20% to around 30% or, in some cases around 40% or 50% to as much as around 80%) of initial actinide fuel-inventories which are characteristic of the nuclear fission traveling waves can permit high-efficiency utilization of as-mined fuel—moreover without a requirement for reprocessing.

It will be noted that the neutron flux from the most intensely burning region behind the burnfront breeds a fissile isotope-rich region at the burnfront's leading-edge, thereby serving to advance the nuclear fission traveling wave. After the nuclear fission traveling wave's burnfront has swept over a given mass of fuel, the fissile atom concentration continues to rise for as long as radiative capture of neutrons on available fertile nuclei is considerably more likely than on fission product nuclei, while ongoing fission generates an ever-greater mass of fission products. Nuclear power-production density peaks in this region of the fuel-charge, at any given moment.

It will be appreciated that well behind the nuclear fission traveling wave's advancing burnfront, the concentration ratio of fission product nuclei (whose mass closely averages half that of a fissile nucleus) to fissile ones climbs to a value comparable to the ratio of the fissile fission to the fission product radiative capture cross-sections. The "local neutronic reactivity" thereupon approaches a negative value or, in some embodiments may become negative. Hence, both burning and breeding effectively cease. It will also be appreciated that in some embodiments, non-fissile neutron absorbing material, such as boron carbide, hafnium, or gadolinium may be added to ensure the "local neutronic reactivity" is negative.

In some embodiments of nuclear fission traveling wave reactors, all the nuclear fission fuel ever used in the reactor is installed during manufacture of the reactor core assembly. Also, in some configurations no spent fuel is ever removed from the reactor core assembly. In one approach, such embodiments may allow operation without ever accessing the reactor core after nuclear fission ignition up to and perhaps after completion of propagation of the burnfront.

In some other embodiments of nuclear fission traveling wave reactors, all the nuclear fission fuel ever used in the reactor is installed during manufacture of the reactor core assembly and in some configurations no spent fuel is ever removed from the reactor core assembly. However, and as will be explained below, at least some of the nuclear fission fuel may be migrated or shuffled between or among locations within a reactor core. Such migration or shuffling of at least some of the nuclear fission fuel may be performed to achieve objectives as discussed below.

However, in some other embodiments of nuclear fission traveling wave reactors, additional nuclear fission fuel may be added to the reactor core assembly after nuclear fission ignition. In some other embodiments of nuclear fission traveling wave reactors, spent fuel may be removed from the reactor core assembly (and, in some embodiments, removal of spent fuel from the reactor core assembly may be performed while the nuclear fission traveling wave reactor is operating at power). Such illustrative refueling and defueling is explained in U.S. patent application Ser. No. 11/605,848, entitled METHOD AND SYSTEM FOR PROVIDING FUEL IN A NUCLEAR REACTOR, naming RODERICK A. HYDE, MURIEL Y. ISHIKAWA, NATHAN P. MYHRVOLD, AND LOWELL L. WOOD, JR. as inventors, filed 28 Nov. 2006, the contents of which are hereby incorporated by reference. Regardless of whether or not spent fuel is removed, pre-expansion of the as-loaded fuel permits higher-density actinides to be replaced with lower-density fission products without any overall volume changes in fuel elements, as the nuclear fission traveling wave sweeps over any given axial element of actinide 'fuel,' converting it into fission-product 'ash.'

Given by way of overview, launching of nuclear fission traveling waves into $^{232}$Th or $^{238}$U fuel-charges can initiate with 'nuclear fission igniter modules', such as without limitation nuclear fission fuel assemblies that are enriched in fissile isotopes. Illustrative nuclear fission igniter modules and methods for launching nuclear fission traveling waves are discussed in detail in a co-pending U.S. patent application Ser. No. 12/069,908, entitled NUCLEAR FISSION IGNITER naming CHARLES E. AHLFELD, JOHN ROGERS GILLELAND, RODERICK A. HYDE, MURIEL Y. ISHIKAWA, DAVID G. MCALEES, NATHAN P. MYHRVOLD, CHARLES WHITMER, AND LOWELL L. WOOD, JR. as inventors, filed 12 Feb. 2008, the contents of which are hereby incorporated by reference. Higher enrichments can produce more compact modules, and minimum mass modules may employ moderator concentration gradients. In addition, nuclear fission igniter module design may be determined in part by non-technical considerations, such as resistance to materials diversion for military purposes in various scenarios.

In other approaches, illustrative nuclear fission igniters may have other types of reactivity sources. For example, other nuclear fission igniters may include "burning embers", e.g., nuclear fission fuel enriched in fissile isotopes via exposure to neutrons within a propagating nuclear fission traveling wave reactor. Such "burning embers" may function as nuclear fission igniters, despite the presence of various amounts of fission products "ash". In other approaches to launching a nuclear fission traveling wave, nuclear fission igniter modules enriched in fissile isotopes may be used to supplement other neutron sources that use electrically driven sources of high energy ions (such as protons, deuterons, alpha particles, or the like) or electrons that may in turn produce neutrons. In one illustrative approach, a particle accelerator, such as a linear accelerator may be positioned to provide high energy protons to an intermediate material that may in turn provide such neutrons (e.g., through spallation). In another illustrative approach, a particle accelerator, such as a linear accelerator may be positioned to provide high energy electrons to an intermediate material that may in turn provide such neutrons (e.g., by electro-fission and/or photofission of high-Z elements). Alternatively, other known neutron emissive processes and structures, such as electrically induced fusion approaches, may provide neutrons (e.g., 14 Mev neutrons from D-T fusion) that may thereby be used in addition to nuclear fission igniter modules enriched in fissile isotopes to initiate the propagating fission wave.

Now that nucleonics of the fuel charge and the nuclear fission traveling wave have been discussed, further details regarding "nuclear fission ignition" and maintenance of the nuclear fission traveling wave will be discussed. A centrally-positioned illustrative nuclear fission igniter moderately enriched in fissionable material, such as $^{235}$U or $^{239}$Pu, has a neutron-absorbing material (such as a borohydride or the like) removed from it (such as by operator-commanded electrical heating or by withdrawal of one or more control rods), and the nuclear fission igniter becomes neutronically critical. Local fuel temperature rises to a predetermined temperature and is regulated thereafter, such as by a reactor coolant system and/or a reactivity control system or local thermostating modules (discussed in detail in U.S. patent application Ser. No. 11/605,943, entitled AUTOMATED NUCLEAR POWER REACTOR FOR LONG-TERM OPERATION, naming RODERICK A. HYDE, MURIEL Y. ISHIKAWA, NATHAN P. MYHRVOLD, AND LOWELL L. WOOD, JR. as inventors, filed 28 Nov. 2006, the contents of which are hereby incorporated by reference). Neutrons from the fast fission of $^{233}$U or $^{239}$Pu are mostly captured at first on local $^{238}$U or $^{232}$Th.

It will be appreciated that uranium enrichment of the nuclear fission igniter may be reduced to levels not much greater than that of light water reactor (LWR) fuel by introduction into the nuclear fission igniter and the fuel region immediately surrounding it of a radial density gradient of a refractory moderator, such as graphite. High moderator density enables low-enrichment fuel to burn satisfactorily, while decreasing moderator density permits efficient fissile breeding to occur. Thus, optimum nuclear fission igniter design may involve trade-offs between proliferation robustness and the minimum latency from initial criticality to the availability of full-rated-power from the fully-ignited fuel-charge of the core. Lower nuclear fission igniter enrichments entail more breeding generations and thus impose longer latencies.

In some embodiments, the peak reactivity of the reactor core assembly may slowly decrease in the first phase of the nuclear fission ignition process because, although the total fissile isotope inventory is increasing, the total inventory becomes more spatially dispersed. As a result of choice of initial fuel geometry, fuel enrichment versus position, and fuel density, it may be arranged for the maximum reactivity to still be slightly positive at the time-point at which its minimum value is attained. Soon thereafter, the maximum reactivity begins to increase rapidly toward its greatest value, corresponding to the fissile isotope inventory in the region of breeding substantially exceeding that remaining in the nuclear fission igniter. For many cases a quasi-spherical annular shell then provides maximum specific power production. At this point, the fuel-charge of the reactor core assembly can be referred to as "ignited."

Propagation of the nuclear fission traveling wave, which may also be referred to herein as "nuclear fission burning", will now be discussed. In the previously described configuration, the spherically-diverging shell of maximum specific nuclear power production continues to advance radially from the nuclear fission igniter toward the outer surface of the fuel charge. When it reaches the outer surface, it typically breaks into two spherical zonal surfaces, with each surface propagating in a respective one of two opposite directions along the axis of the cylinder. At this time-point, the full thermal power production potential of the core may have been developed. This interval is characterized as that of the launching period of the two axially-propagating nuclear fission traveling wave burnfronts. In some embodiments the center of the core's fuel-charge is ignited, thus generating two oppositely-propagating waves. This arrangement doubles the mass and volume of the core in which power production occurs at any given time, and thus decreases by two-fold the core's peak specific power generation, thereby quantitatively minimizing thermal transport challenges. However, in other embodiments, the core's fuel charge is ignited at or near one end, as desired for a particular application. Such an approach may result in a single propagating wave in some configurations.

In other embodiments, the core's fuel charge may be ignited in multiple sites. In yet other embodiments, the core's fuel charge is ignited at any 3-D location within the core as desired for a particular application. In some embodiments, two propagating nuclear fission traveling waves may be initiated and propagate away from a nuclear fission ignition site; however, depending upon geometry, nuclear fission fuel composition, the action of neutron modifying control structures, or other considerations, different numbers (e.g., one, three, or more) of nuclear fission traveling waves may be initiated and propagated. However, for sake of understanding and brevity, the discussion herein refers, without limitation, to propagation of two nuclear fission traveling wave burnfronts.

From this time forward through the break-out of the two waves when they reach or approach the two opposite ends, the physics of nuclear power generation is typically effectively time-stationary in the frame of either wave. The speed of wave advance through the fuel is proportional to the local neutron flux, which in turn is linearly dependent on the thermal power drawn from the reactor core assembly via the collective action on the nuclear fission traveling wave's neutron budget of the neutron control system, In one approach, the neutron control system may be implemented with thermostating modules (not shown) as has been described in U.S. patent application Ser. No. 11/605,933, entitled CONTROLLABLE LONG TERM OPERATION OF A NUCLEAR REACTOR, naming RODERICK A. HYDE, MURIEL Y. ISHIKAWA, NATHAN P. MYHRVOLD, AND LOWELL L. WOOD, JR. as inventors, filed 28 Nov. 2006, the contents of which are hereby incorporated by reference. In other approaches, the neutron control system may be implemented with one or more rods containing neutron-absorbing material and being movable with one or more control rod drive mechanisms.

When more power is demanded from the reactor via lower-temperature coolant flowing into the core, in some embodiments the temperature of the two ends of the core (which in some embodiments are closest to the coolant inlets) decreases slightly below the thermostating modules' design set-point, a neutron absorber is thereby withdrawn from the corresponding sub-population of the core's thermostating modules, and the local neutron flux is permitted thereby to increase to bring the local thermal power production to the level which drives the local material temperature up to the set-point of the local thermostating modules. In some other embodiments, temperature control may be effected by shimming control rods as desired responsive to changes in monitored temperature.

However, in the two burnfront embodiment this process is not effective in heating the coolant significantly until its two divided flows move into the two nuclear burn-fronts. These two portions of the core's fuel-charge—which are capable of producing significant levels of nuclear power when not suppressed by the neutron absorbers—then act to heat the coolant to the temperature specified by the design set-point of their modules, provided that the nuclear fission fuel temperature does not become excessive (and regardless of the temperature at which the coolant arrived in the core). The two coolant flows then move through the two sections of already-burned fuel centerward of the two burnfronts, removing residual nuclear fission and afterheat thermal power from them, both exiting the fuel-charge at its center. This arrangement encourages the propagation of the two burnfronts toward the two ends of the fuel-charge by "trimming" excess neutrons primarily from the trailing edge of each front.

Thus, the core's neutronics in this configuration may be considered to be substantially self-regulated. For example, for cylindrical core embodiments, the core's nucleonics may be considered to be substantially self-regulating when the fuel density-radius product of the cylindrical core is $\geq 200$ nm/cm$^2$ (that is, 1-2 mean free paths for neutron-induced fission in a core of typical composition, for a reasonably fast neutron spectrum). One function of the neutron reflector in such core design may be to substantially reduce the fast neutron fluence seen by the outer portions of the reactor, such as its radiation shield, structural supports, outermost shell, and reactivity control system components such as without limitation control rods (when provided) or thermostating modules (when provided). The neutron reflector may also impact the performance of the core by increasing the breeding efficiency and the specific power in the outermost portions of the fuel. Such impact may enhance the reactor's economic efficiency. Outlying portions of the fuel-charge are not used at low overall energetic efficiency, but have isotopic burn-up levels comparable to those at the center of the fuel-charge.

While the core's neutronics in the above-described configurations may be considered to be substantially self-regulated, other configurations may operate under control of a reactor control system that includes a suitable electronic controller having appropriate electrical circuitry and that may include a suitable electro-mechanical system, such as one or more rods containing neutron-absorbing material and being movable with one or more control rod drive mechanisms.

Final, irreversible negation of the core's neutronic reactivity may be performed at any time by injection of neutronic poison into the coolant stream as desired. For example, lightly loading a coolant stream with a material such as $BF_3$, possibly accompanied by a volatile reducing agent such as $H_2$ if desired, may deposit metallic boron substantially uniformly over the inner walls of coolant-tubes threading through the reactor's core, via exponential acceleration of the otherwise slow chemical reaction $2BF_3+3H_2->2B+6HF$ by the high temperatures found therein. Boron, in turn, is a highly refractory metalloid, and will not typically migrate from its site of deposition. Substantially uniform presence of boron in the core in <100 kg quantities may negate the core's neutronic reactivity for indefinitely prolonged intervals without involving the use of powered mechanisms in the vicinity of the reactor.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

Illustrative Embodiments

Now that a brief overview has been set forth regarding initiation and propagation of a nuclear fission traveling wave, illustrative embodiments will now be explained by way of non-limiting examples.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either subcomponent operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 1B:
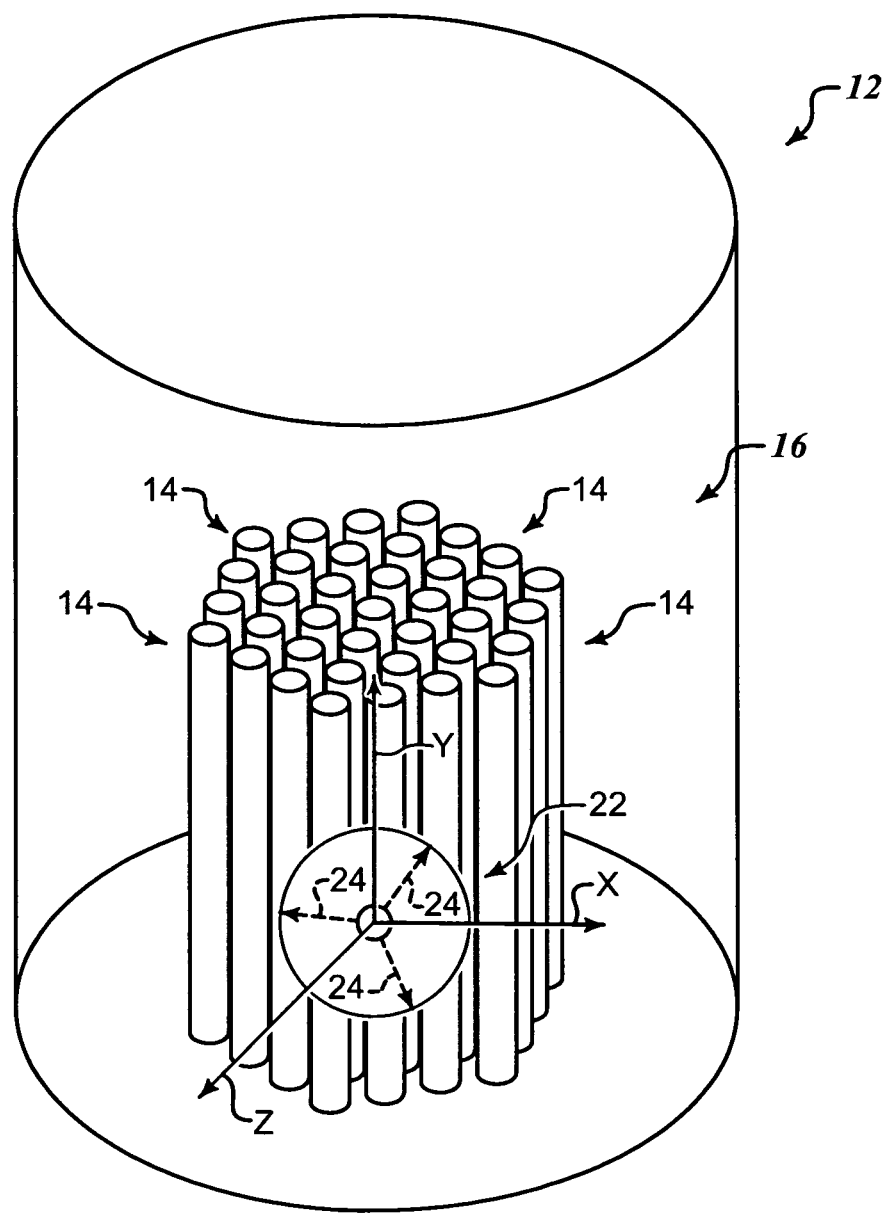
FIGS. 1B-1D are perspective views in partial schematic form of components of illustrative nuclear fission reactor cores.

Referring now to FIG. 1A and by way of overview, an illustrative method 10 is provided for operating a nuclear fission traveling wave reactor. Referring additionally to FIG. 1B, components of an illustrative nuclear fission traveling wave reactor core 12 of a nuclear fission traveling wave reactor are shown by way of example and not of limitation. Nuclear fission fuel subassemblies 14 are housed in a reactor core assembly 16. To aid in clarity, FIG. 1B may illustrate less than all of the nuclear fission fuel subassemblies 14 that may be housed in embodiments of the reactor core assembly 16.

A frame of reference is defined within the reactor core assembly 16. In some embodiments, the frame of reference can be defined by an x-dimension, a y-dimension, and a z-dimension. In some other embodiments, the frame of reference can be defined by a radial dimension and an axial dimension. In some other embodiments, the frame of reference can include an axial dimension and a lateral dimension.

In some embodiments, the nuclear fission fuel subassemblies 14 may be individual nuclear fission fuel elements, such as nuclear fission fuel rods, plates, spheres, or the like. In some other embodiments, the nuclear fission fuel subassemblies 14 may be nuclear fission fuel assemblies—that is, two or more individual nuclear fission fuel elements that are grouped into an assembly. Regardless of embodiment of the nuclear fission fuel subassemblies 14, nuclear fission fuel material contained within the nuclear fission fuel subassemblies 14 can be any suitable type of nuclear fission fuel material as described above.

Still by way of overview, the method 10 starts at a block 18. At a block 20, a nuclear fission traveling wave burnfront 22 is propagated (as indicated by arrows 24) along first and second dimensions within the nuclear fission fuel subassemblies 14 in the reactor core assembly 16 of the nuclear fission traveling wave reactor core 12. At a block 26 selected ones of the nuclear fission fuel subassemblies 14 are controllably migrated along the first dimension from respective first locations toward respective second locations in a manner that defines a shape of the nuclear fission traveling wave burnfront 22 along the second dimension according to a selected set of dimensional constraints. The method 10 stops at a block 28.

Illustrative details will now be explained by way of non-limiting examples.

The nuclear fission fuel subassemblies 14 bear a spatial relationship to the dimensions that are designated as the first and second dimensions. For example, in some embodiments the nuclear fission fuel subassemblies 14 may be elongate along the second dimension. In some embodiments, the second dimension may be the y-dimension or an axial dimension. In some other embodiments, the second dimension may be the x-dimension, the z-dimension, or a lateral dimension.

Moreover, in some embodiments the first dimension may be substantially orthogonal to an elongated axis of the nuclear fission subassemblies 14. In some embodiments, the first dimension and the second dimension may be substantially orthogonal to each other.

Various dimensions may be designated as the first dimension and second dimension. For example, in some embodiments the first dimension may include a radial dimension and the second dimension may include an axial dimension. In some other embodiments the first dimension may include an axial dimension and the second dimension may include a radial dimension. In some embodiments the first dimension may include an axial dimension and the second dimension may include a lateral dimension. In some other embodiments the first dimension may include a lateral dimension and the second dimension may include an axial dimension. In a cylindrical core with assemblies elongated in the axial direction, such as typical commercial light water reactor configurations, the first dimension may be the radial dimension and the second dimension may be the axial dimension. In other reactor configurations, such as that of the CANDU heavy water reactors, the fuel assemblies are elongated in a first dimension and can be moved in a lateral or radial second dimension.

Figure 1C:
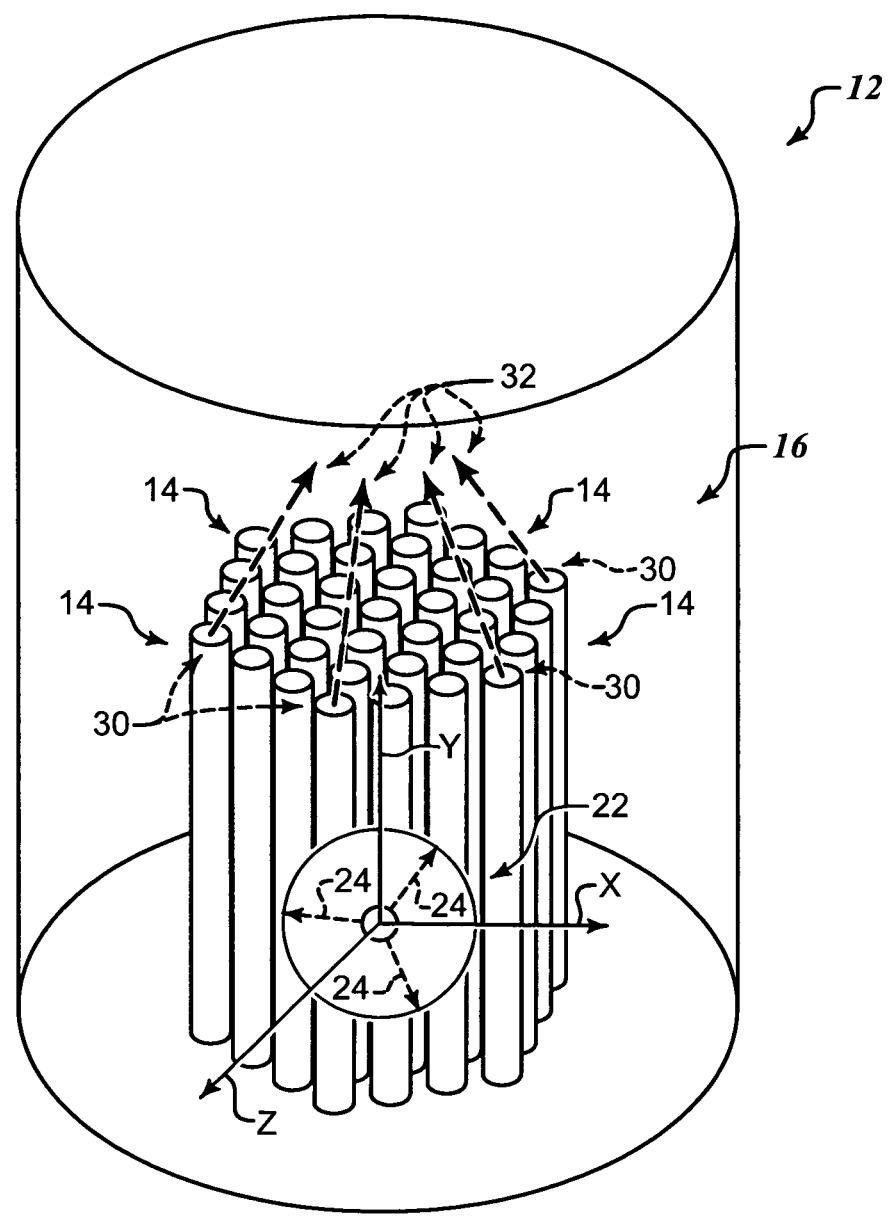

As illustrated in FIG. 1B, locations within the reactor core 12 may be characterized as the first locations and the second locations according to various attributes. In general, a location may be considered to be a space in a vicinity of a region of the reactor core 12 around a nuclear fission fuel subassembly 14. A location may also be considered generally to be a space immediately surrounding any given area in the reactor core 12, or may be considered to be most of the reactor core 12. For example and referring additionally to FIG. 1C, in some embodiments the first locations may include outward locations 30 and the second locations may include inward locations 32. As illustrated in FIG. 1C, in some embodiments the inward locations 32 and outward locations 30 may be based on geometrical proximity to a central portion of the reactor core 12. In some other embodiments, the inward locations and the outward locations may be based on neutron flux such that neutron flux at the inward locations is greater than neutron flux at the outward locations. In some other embodiments, the inward locations and the outward locations may be based on reactivity such that $k_{effective}$ at the inward locations is greater than $k_{effective}$ at the outward locations. Embodiments typical of a traveling wave reactor may have outward locations including locations outside, or in the direction of, a propagating wave while inward locations may include locations through which a nuclear fission traveling wave is propagating or has already propagated.

Figure 1D:
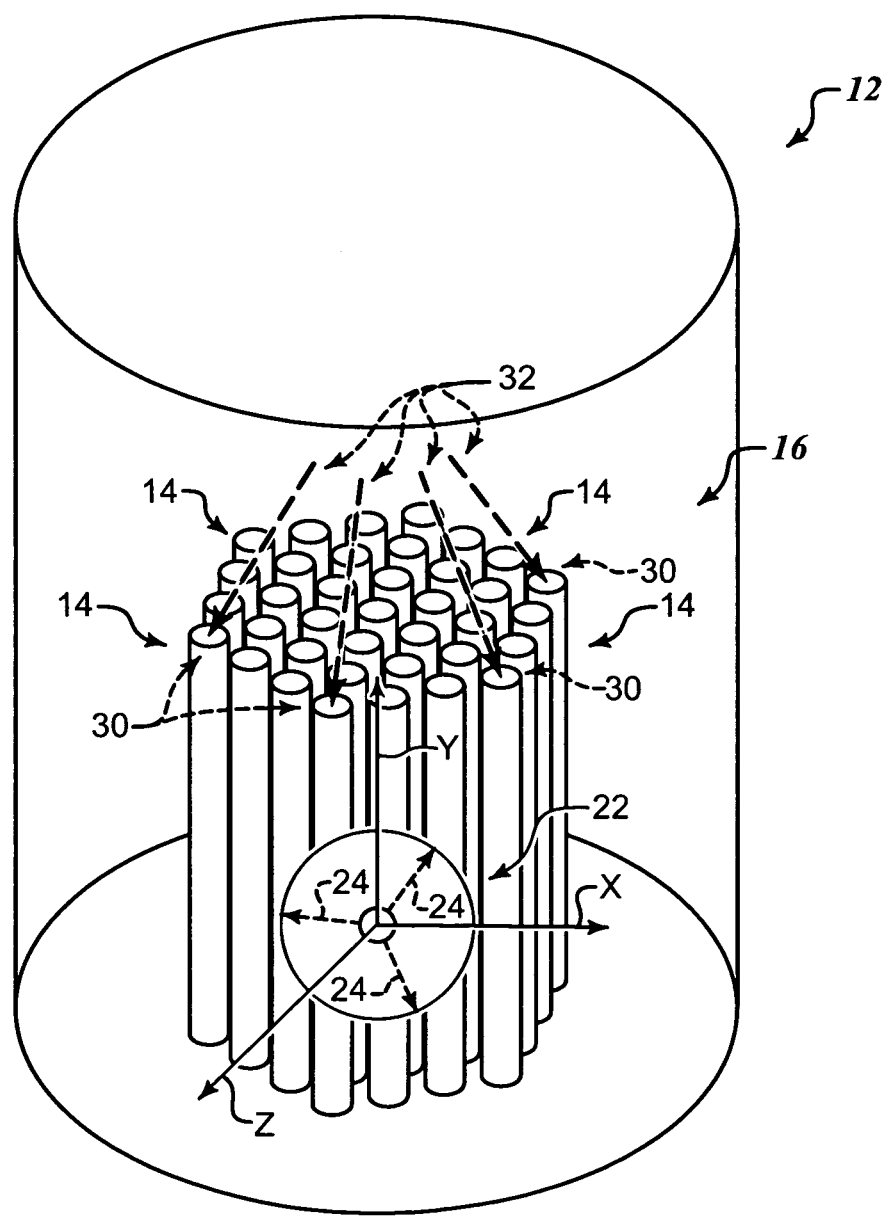

Given by way of further examples and referring additionally to FIG. 1D, in some embodiments the first locations may include the inward locations 32 and the second locations may include the outward locations 30. As illustrated in FIG. 1D, in some embodiments the inward locations 32 and the outward locations 30 may be based on geometrical proximity to the central portion of the reactor core 12. In some other embodiments, the inward locations and the outward locations may be based on neutron flux such that neutron flux at the inward locations is greater than neutron flux at the outward locations. In some other embodiments, the inward locations and the outward locations may be based on reactivity such that $k_{effective}$ at the inward locations is greater than $k_{effective}$ at the outward locations. In other embodiments, the inward and outward locations may be described in terms of the predominant nuclear reaction occurring in those regions. Given by way of non-limiting example, the inward location may be characterized by predominantly nuclear fission reactions while the outward location may be characterized by predominantly nuclear absorption reactions on fertile material.

Regardless of characterization of the first locations and the second locations as either inward locations or outward locations, the first locations and the second locations may be characterized according to other attributes. For example, in some embodiments the first locations and the second locations may be located on opposite sides of a reference value along the first dimension. In some other embodiments the first locations and the second locations may include at least one attribute that is substantially equalized. For example, the at least one attribute that is substantially equalized may include geometrical proximity to a central region of the reactor core, neutron flux, reactivity, or the like.

Figure 1E:
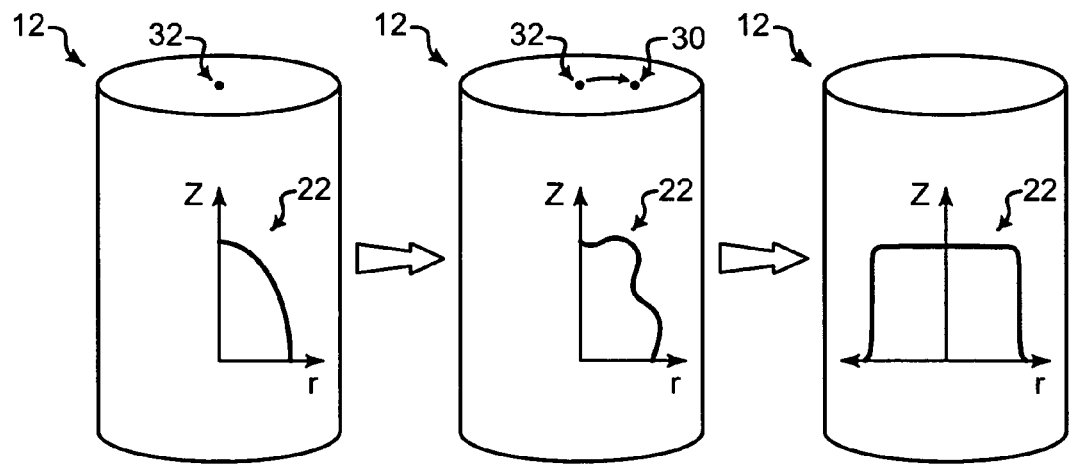
FIGS. 1E-1H illustrate effects on shape of a nuclear fission traveling wave burnfront by migration of selected nuclear fission fuel subassemblies.

Given by way of non-limiting example and referring to FIG. 1E, selected ones of the nuclear fission fuel subassemblies (not shown for clarity) may be controllably migrated radially outwardly from respective inward locations 32 toward respective outward locations 30 in a manner that defines a shape of the nuclear fission traveling wave burnfront 22 axially according to a selected set of dimensional constraints. Given by way of illustration and not of limitation, axial changes in shape of the nuclear fission traveling wave burnfront 22 with radial movement of nuclear fission fuel subassemblies (not shown) are shown. A left pane illustrates an initial shape of the nuclear fission traveling wave burnfront 22. It will be appreciated that, for clarity purposes, only one-fourth of the perimeter of the nuclear fission traveling wave burnfront 22 is shown.

In a center pane, a selected nuclear fission fuel subassembly (not shown) has been radially migrated from the inward location 32 to the outward location 30 after the selected nuclear fission fuel subassembly (not shown) has been burned for a desired time or according to a desired reactivity parameter (such as, without limitation, burnup). Reactivity has been moved radially outwardly from a peak that was radially located at the inward location 32 (as shown in the left pane) to the outward location 30 (as shown in the center pane).

Over the life of the nuclear fission traveling wave reactor core 12, additional nuclear fission fuel subassemblies (not shown) may be radially migrated outwardly from the inward locations 32 to the outward locations 30. As a result of such additional outward migration, nuclear fission fuel subassemblies (not shown) at radially inward locations in the nuclear fission traveling wave reactor core 12 may be kept from burning more than nuclear fission fuel subassemblies (not shown) at radially outward locations in the nuclear fission traveling wave reactor core 12. As shown in the right pane, if a sufficient number of the nuclear fission fuel subassemblies are migrated radially outwardly as described above, then the shape of the nuclear fission traveling wave burnfront 22 may approximate a Bessel function. Also, if a sufficient number of the nuclear fission fuel subassemblies are migrated radially outwardly as described above, then all or substantially all of the nuclear fission fuel subassemblies in the nuclear fission traveling wave reactor core 12 may reach or approach their respective burn-up limits at around a same time. In such a case, use of the nuclear fission fuel subassemblies in the nuclear fission traveling wave reactor core 12 has been maximized.

Figure 1F:
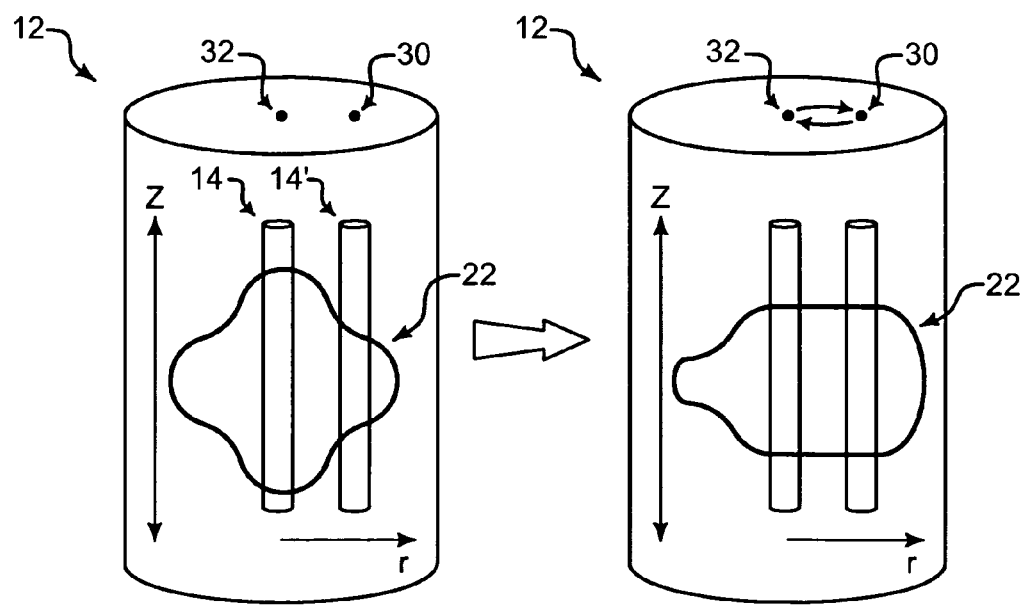

Given by way of another non-limiting example and referring to FIG. 1F, selected ones of the nuclear fission fuel subassemblies 14 may be controllably migrated radially outwardly from respective inward locations 32 toward respective outward locations 30 and other selected ones of the nuclear fission fuel subassemblies 14' may be controllably migrated radially inwardly from the respective outward locations 30 to the respective inward locations 32 in a manner that defines a shape of the nuclear fission traveling wave burnfront 22 axially according to a selected set of dimensional constraints. That is, the selected nuclear fission fuel assemblies 14 and 14' are interchanged between the inward locations 32 and the outward locations 30.

Given by way of illustration and not of limitation, axial changes in shape of the nuclear fission traveling wave burnfront 22 with such interchanging radial movement of nuclear fission fuel subassemblies 14 and 14' are shown. A left pane illustrates an initial shape of the nuclear fission traveling wave burnfront 22. In the left pane, the nuclear fission fuel assemblies 14 have more fissile content than do the nuclear fission fuel assemblies 14'. For example, the nuclear fission fuel subassemblies 14 may be part of an igniter assembly for the nuclear fission traveling wave reactor core 12. As another example, the nuclear fission fuel assemblies 14 may include fissile material that has been bred from fertile isotopic material as a result of absorption of fast spectrum neutrons in the nuclear fission traveling wave reactor core 12 and subsequent transmutation into fissile isotopes. By contrast, the nuclear fission fuel subassemblies 14' have less fissile content than do the nuclear fission fuel subassemblies 14. In some cases, the nuclear fission fuel subassemblies 14' may include more fertile isotopic content than do the nuclear fission fuel subassemblies 14. In such cases, the nuclear fission fuel subassemblies 14' are more absorptive to fast spectrum neutrons than are the nuclear fission fuel subassemblies 14.

In a right pane, the selected nuclear fission fuel subassembly 14 has been radially outwardly migrated from the inward location 32 to the outward location 30 and the selected nuclear fission fuel subassembly 14' has been radially inwardly migrated from the outward location 30 to the inward location 32. After the interchanging of the nuclear fission fuel subassemblies 14 and 14', the axial profile of the nuclear fission traveling wave burnfront 22 has been made more compact and more uniform compared to the axial profile of the nuclear fission traveling wave burnfront 22 before such interchanging (see the left pane). As a result, in some embodiments a substantially uniform profile or uniform profile may be achieved for the nuclear fission traveling wave burnfront 22. In some other embodiments it may not be desired to achieve a substantially uniform profile or uniform profile for the nuclear fission traveling wave burnfront 22. In such cases it may merely be desired to relocate fissile material or to relocate fertile isotopic material. In some other embodiments it may be desirable to extend the nuclear fission traveling wave burnfront 22 in the radial dimension.

Figure 1G:
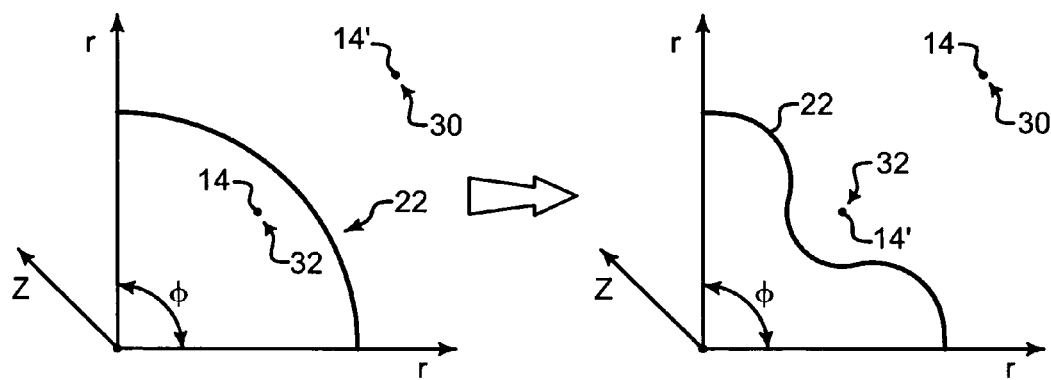

Referring additionally to FIG. 1G, the shape of the nuclear fission traveling wave burnfront 22 also may be defined in the radial dimension by migrating the nuclear fission fuel subassemblies 14 and 14' in the radial dimension as discussed above with reference to FIG. 1F. The radial profile of the nuclear fission traveling wave burnfront 22 may be considered to represent neutron leakage current. The left and right panes of FIG. 1G show views along the axial dimension that correspond to the left and right panes, respectively, of FIG. 1F.

Figure 1H:
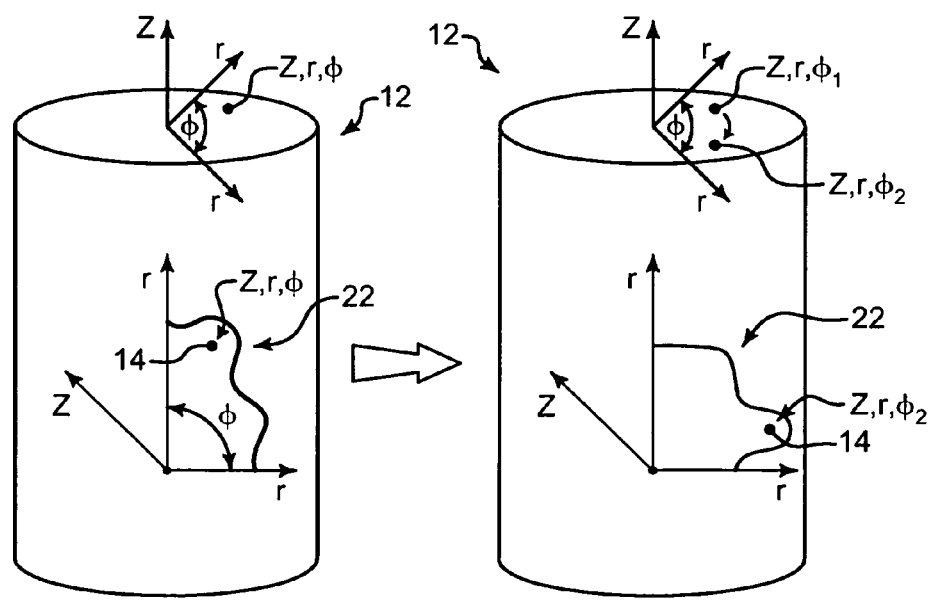

Referring now to FIG. 1H, selected ones of the nuclear fission fuel subassemblies 14 may be controllably migrated laterally from respective first locations toward respective second locations in a manner that defines a shape of the nuclear fission traveling wave burnfront 22 radially according to a selected set of dimensional constraints.

A left pane illustrates an initial shape of the nuclear fission traveling wave burnfront 22 viewed along the axial dimension. A selected nuclear fission fuel subassembly 14 is located at a first location z, r, $\varphi_1$. In the example shown for illustration purposes, the nuclear fission fuel subassembly 14 contributes reactivity at the first location z, r, $\varphi_1$ that may be determined, for any reason whatsoever, to be in excess of an amount of reactivity desired at the first location z, r, $\varphi_1$. For example, the nuclear fission fuel subassembly 14 may be part of an igniter assembly for the nuclear fission traveling wave reactor core 12. As another example, the nuclear fission fuel assembly 14 may include fissile material that has been bred from fertile isotopic material as a result of absorption of fast spectrum neutrons in the nuclear fission traveling wave reactor core 12 and subsequent transmutation into fissile isotopes. As a result, the nuclear fission traveling wave burnfront 22 may be propagating too much in the radial direction at the first location z, r, $\varphi_1$.

As shown in the right pane, the selected nuclear fission fuel subassembly 14 has been laterally migrated along the lateral dimension $\varphi$ from the first location z, r, $\varphi_1$ to the second location z, r, $\varphi_2$. It will be appreciated that the shape of the nuclear fission traveling wave burnfront 22 has been defined radially as a result of lateral migration of the selected nuclear fission fuel subassembly 14 from the first location z, r, $\varphi_1$ to the second location z, r, $\varphi_2$. Lateral migration of the selected nuclear fission fuel subassembly from the first location z, r, $\varphi_1$ to the second location z, r, $\varphi_2$ has removed fissile content from the first location z, r, $\varphi_1$ and has added fissile content to the second location z, r, $\varphi_1$. As shown in the right pane, the shape of the nuclear fission traveling wave burnfront 22 has been shortened along the radial dimension r in the vicinity of the first location z, r, $\varphi_1$ and has been lengthened along the radial dimension r in the vicinity of the second location z, r, $\varphi_2$.

Figure 1I:
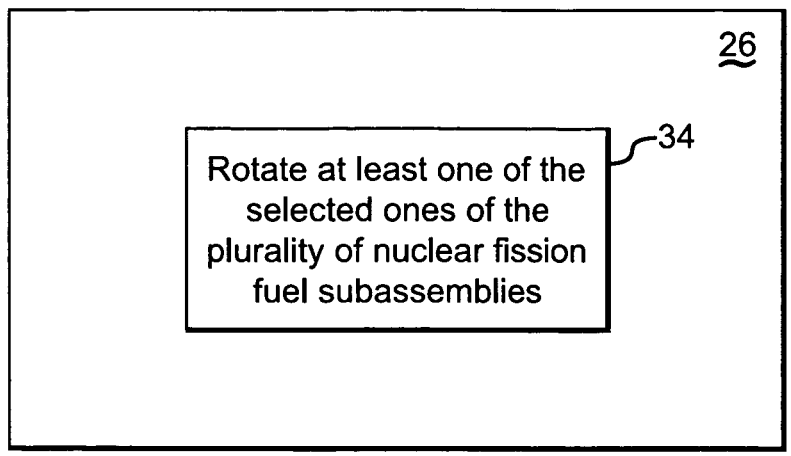
FIG. 1I is a block diagram of a detail of part of the method of FIG. 1A.
Figure 1J:
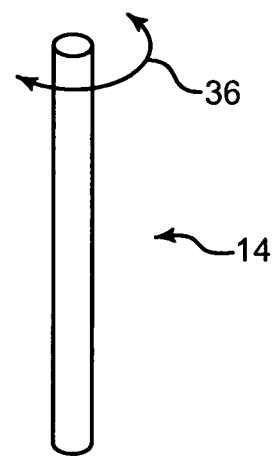
FIG. 1J illustrates rotation of a nuclear fission fuel subassembly.

Controllably migrating selected ones of the nuclear fission fuel subassemblies 14 along the first dimension from respective first locations toward respective second locations at the block 26 may entail one or more processes. For example and referring additionally to FIGS. 1I and 1J, in some embodiments controllably migrating selected ones of the nuclear fission fuel subassemblies 14 along the first dimension from respective first locations toward respective second locations at the block 26 may include rotating at least one of the selected ones of the nuclear fission fuel subassemblies 14 at a block 34, as indicated by arrow 36 (FIG. 1J). It will be appreciated that rotating at least one of the selected ones of the nuclear fission fuel subassemblies 14 at the block 34 may be performed with any suitable in-core fuel handling system as desired. Furthermore, it may be desired to rotate the selected nuclear fission fuel subassemblies 14 in order to minimize or prevent deformation of reactor structural material, such as bowing of nuclear fission fuel subassemblies.

Figure 1K:
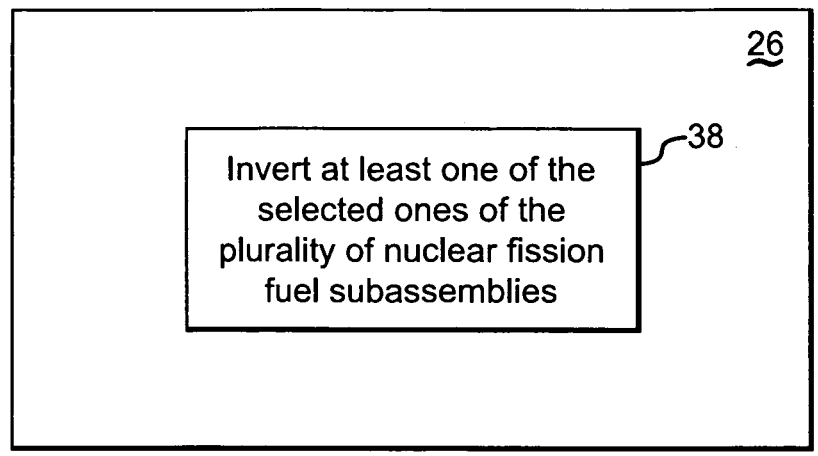
FIG. 1K is a block diagram of a detail of part of the method of FIG. 1A.
Figure 1L:
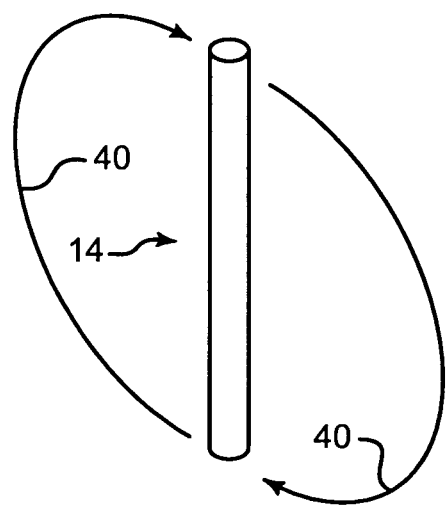
FIG. 1L illustrates inversion of a nuclear fission fuel subassembly.

As another example and referring additionally to FIGS. 1K and 1L, in some other embodiments controllably migrating selected ones of the nuclear fission fuel subassemblies 14 along the first dimension from respective first locations toward respective second locations at the block 26 may include inverting at least one of the selected ones of the nuclear fission fuel subassemblies 14 at a block 38, as indicated by arrows 40 (FIG. 1L). It will be appreciated that inverting at least one of the selected ones of the nuclear fission fuel subassemblies 14 at the block 38 may be performed with any suitable in-core fuel handling system as desired. Inverting a nuclear fission fuel subassembly 14 can result in an inlet of the nuclear fission fuel subassembly 14 (prior to inversion) becoming an outlet of the nuclear fission fuel subassembly 14 (after inversion), and vice versa. Such an inversion can result in axially equalizing thermal stresses and/or radiation effects on the nuclear fission fuel subassembly 14 at the ends of the nuclear fission fuel subassembly 14. Any such radiation effects may be temperature related and/or may be related to variations in neutron flux at the axial ends of the nuclear fission reactor core 12. It will be appreciated that inversion of a nuclear fission fuel subassembly 14 results in both ends of the inverted nuclear fission fuel subassembly 14 migrating from a first location to a second location about the central point of inversion. However, in some cases, it may be desirable to alter the location of the assembly laterally as well.

It will also be appreciated that any one or more dimensional constraints may be selected as desired for a particular application. For example, in some embodiments the selected set of dimensional constraints may include a predetermined maximum distance along the second dimension.

In some other embodiments, the selected set of dimensional constraints may be a function of at least one burnfront criteria. For example, the burnfront criteria may include neutron flux. In some arrangements the neutron flux may be associated with at least one of the selected ones of the nuclear fission fuel subassemblies 14. In some other embodiments the burnfront criteria may include neutron fluence. In some arrangements the neutron fluence may be associated with at least one of the selected ones of the nuclear fission fuel subassemblies 14.

In some other embodiments the burnfront criteria may include burnup. In some arrangements the burnup may be associated with at least one of the selected ones of the nuclear fission fuel subassemblies 14. In such arrangements, it may be desirable to move the selected ones of the nuclear fission fuel subassemblies 14 from a first location having a first burn-up rate to a second location having a second burn-up rate. If the selected nuclear fission fuel subassembly 14 is nearing the end of its useful lifetime, then the first location may be a location that is characterized by a high burn-up rate and the second location may be a location that is characterized by a reduced burn-up rate (relative to the high burn-up rate at the first location) or a substantially zero value of burn-up rate. In embodiments where a nuclear fission fuel subassembly 14 is being bred-up, it may be desirable to move the nuclear fission fuel subassembly 14 from a first location having a low burn-up rate to a second location having a higher burn-up rate (relative to that of the first location).

In some other embodiments the burnfront criteria may include burnfront location within at least one of the selected ones of the nuclear fission fuel subassemblies 14. Burnfront location may be characterized by features of the nuclear fission traveling wave reactor core 12 or nuclear fission fuel subassemblies 14 therein. Such features may include, but are not limited to, fission rate, breeding rate, power output, temperature, reactivity, and the like.

It will be appreciated that controllably migrating selected ones of the nuclear fission fuel subassemblies along the first dimension from respective first locations toward respective second locations at the block 26 may be performed in any manner as desired for a particular application. For example and referring additionally to FIG. 1M (and as indicated in FIGS. 1C and 1D), in some embodiments controllably migrating selected ones of the nuclear fission fuel subassemblies 14 along the first dimension from respective first locations toward respective second locations at the block 26 may include controllably migrating selected ones of the nuclear fission fuel subassemblies 14 radially along the first dimension from respective first locations toward respective second locations at a block 42. It will be appreciated that radial migration at the block 42 may be performed with any suitable in-core fuel handling system as desired.

Figure 1O:
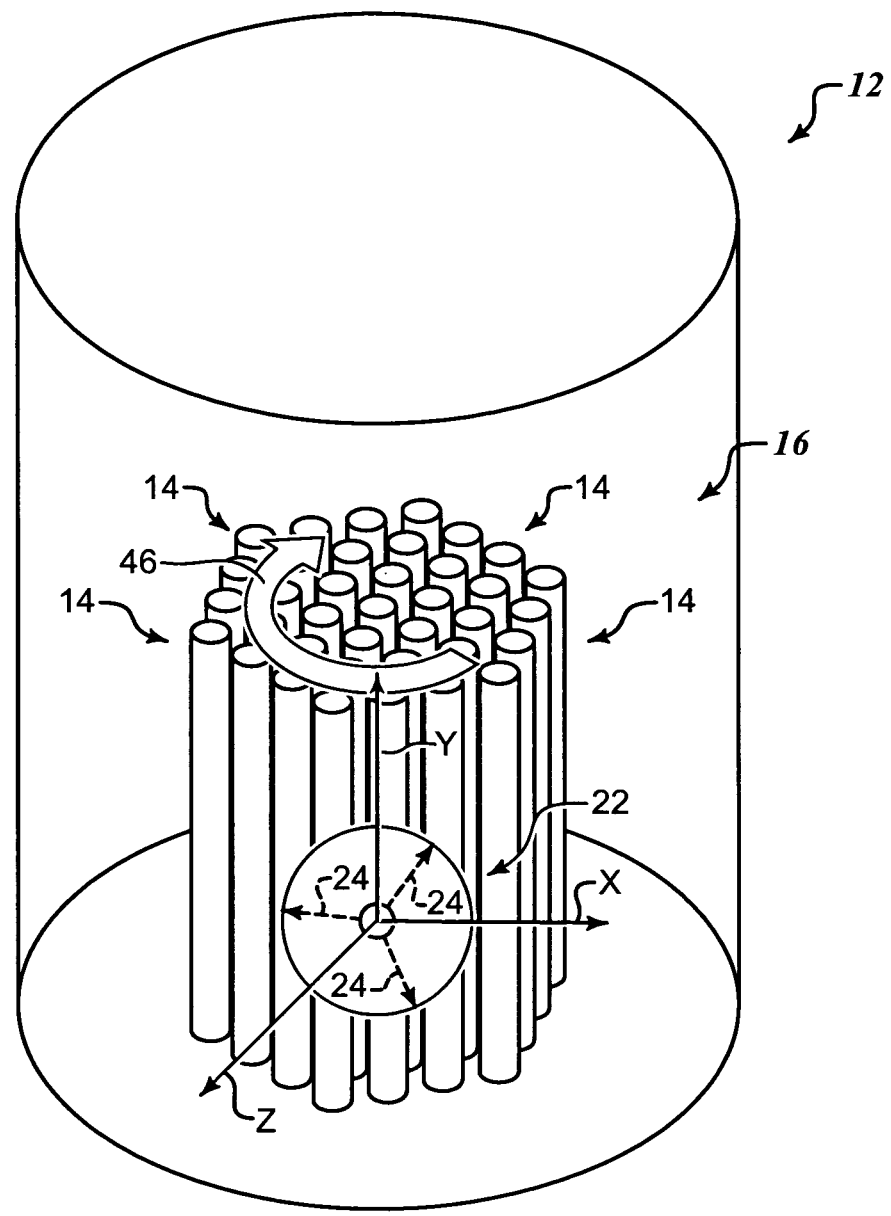
FIG. 1O illustrates spiral migration of a nuclear fission fuel subassembly.

In some other embodiments and referring additionally to FIGS. 1N and 1O, controllably migrating selected ones of the nuclear fission fuel subassemblies 14 along the first dimension from respective first locations toward respective second locations at the block 26 may include controllably migrating selected ones of the nuclear fission fuel subassemblies spirally along the first dimension from respective first locations toward respective second locations at a block 44, as indicated by arrow 46. It will be appreciated that spiral migration at the block 44 may be performed with any suitable in-core fuel handling system as desired.

Figure 1P:
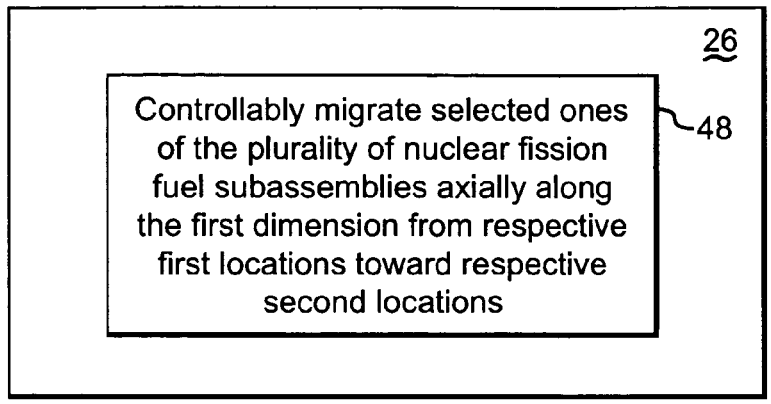
FIG. 1P is a block diagram of a detail of part of the method of FIG. 1A.
Figure 1Q:
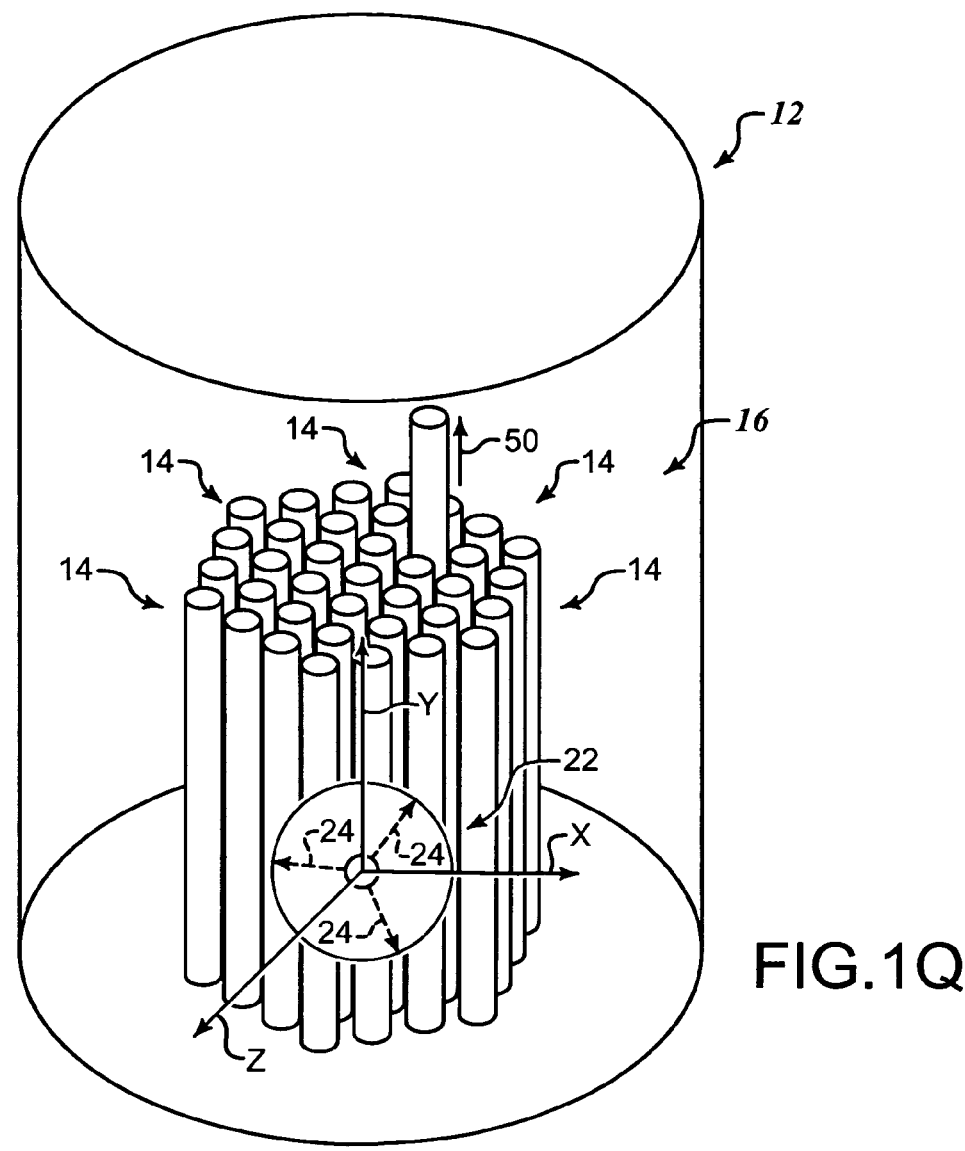
FIG. 1Q illustrates axial migration of a nuclear fission fuel subassembly.

In some other embodiments and referring additionally to FIGS. 1P and 1Q, controllably migrating selected ones of the nuclear fission fuel subassemblies 14 along the first dimension from respective first locations toward respective second locations at the block 26 may include controllably migrating selected ones of the nuclear fission fuel subassemblies 14 axially along the first dimension from respective first locations toward respective second locations at a block 48, as indicated by an arrow 50. It will be appreciated that axial migration at the block 48 may be performed with any suitable in-core fuel handling system as desired.

Figure 1R:
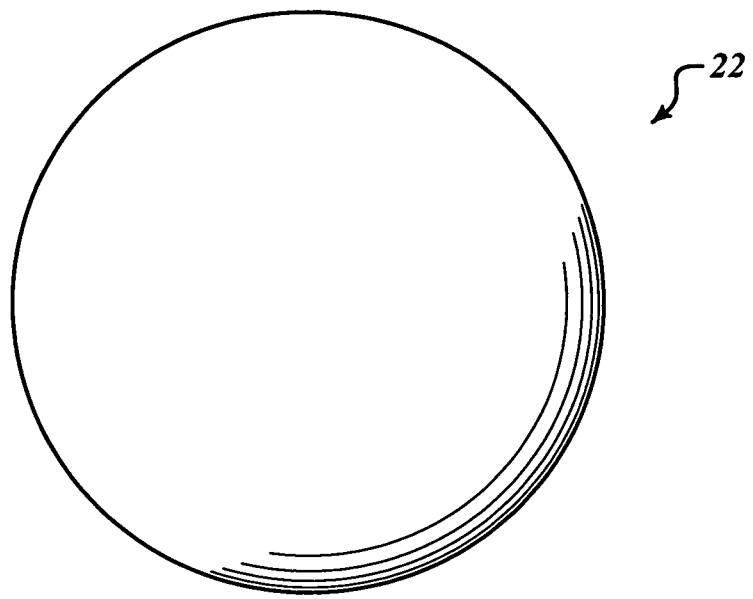
FIG. 1R illustrates a substantially spherical shape of a nuclear fission traveling wave burnfront.
Figure 1S:
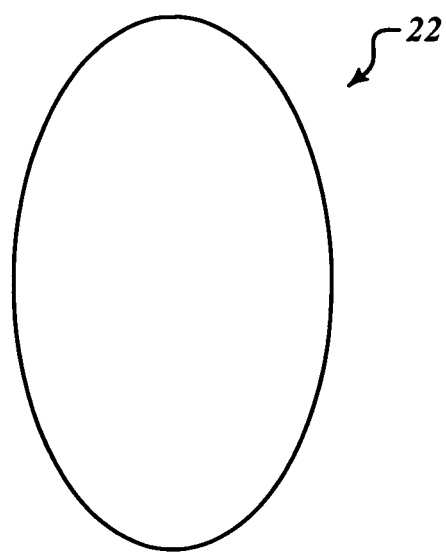
FIG. 1S illustrates a continuously curved surface of a nuclear fission traveling wave burnfront.
Figure 1T:
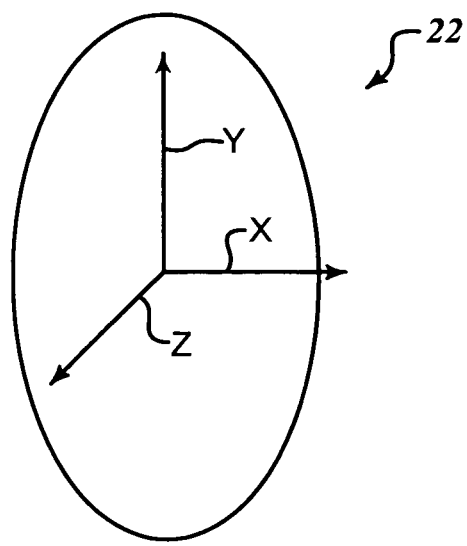
FIG. 1T illustrates a substantially rotationally symmetrical shape of a nuclear fission traveling wave burnfront.
Figure 1U:
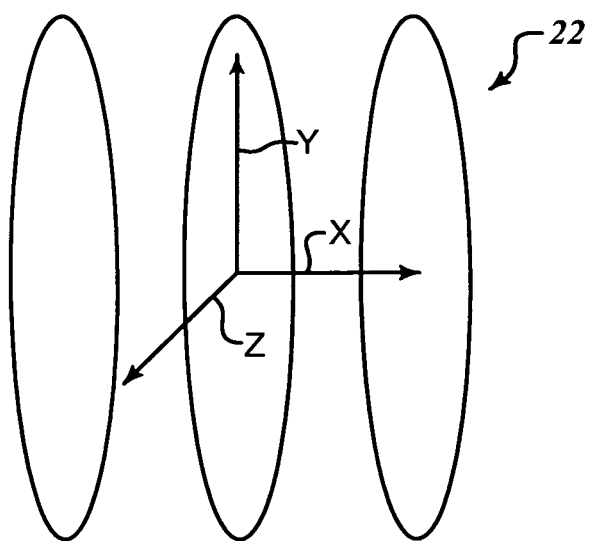
FIGS. 1U-1V illustrate substantial n-fold rotational symmetry of a shape of a nuclear fission traveling wave burnfront.
Figure 1V:
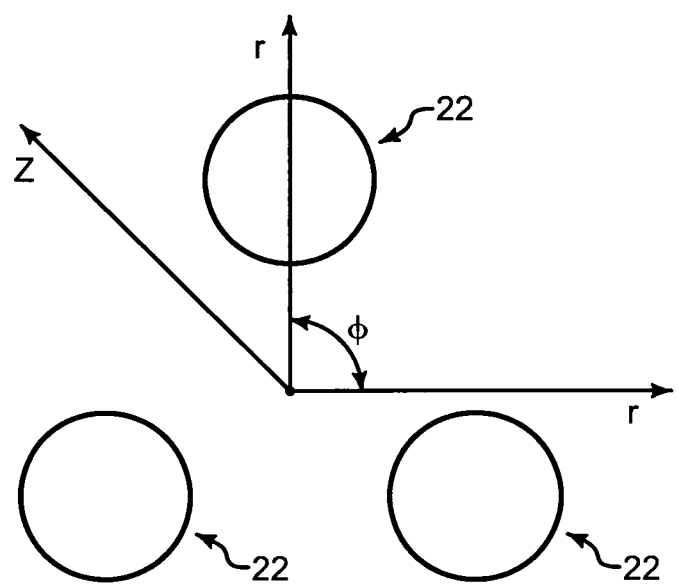

It will be appreciated that the shape of the nuclear fission traveling wave burnfront 22 may be defined by any parameter associated with the nuclear fission traveling wave burnfront 22, such as without limitation neutron flux, neutron fluence, burnup, and/or reactivity (or any of their components). It will also be appreciated that the nuclear fission traveling wave burnfront 22 may have any shape as desired for a particular application. For example and referring additionally to FIG. 1R, in some embodiments the shape of the nuclear fission traveling wave burnfront 22 may be substantially spherical. In some other embodiments and referring additionally to FIG. 1S, the shape of the nuclear fission traveling wave burnfront 22 may substantially conform to a selected continuously curved surface. In some embodiments and referring additionally to FIG. 1T, the shape of the nuclear fission traveling wave burnfront 22 may be substantially rotationally symmetrical around the second dimension. In some other embodiments and referring additionally to FIGS. 1U and 1V, the shape of the nuclear fission traveling wave burnfront 22 may have substantial n-fold rotational symmetry around the second dimension.

It is known by those skilled in the art that maintaining a substantially constant, 'flat', burn profile (such as a Bessel function) across a reactor core minimizes power peaking between nuclear fission fuel subassemblies within the core and enhances fuel utilization. In a traveling wave nuclear fission reactor, as described above, the burning region of the reactor tends to expand in size due to a high conversion ratio. The burning region is maintained with sufficient feed nuclear material, such as fertile isotopic material or fissile material, to maintain a high conversion ratio.

It will be appreciated that in some reactor configurations, there are advantages to migrating nuclear fission fuel subassemblies as described above to maintain desired reactor burn-front characteristics. For example, migrating the nuclear fission fuel subassemblies radially into the burn region may act to supply either fertile isotopic material or fissile material to the reaction zone. Moving nuclear fission fuel subassemblies radially outward may serve to migrate nuclear fission fuel subassemblies having reached their burn-up limit out of an area of high neutronic activity. Radially outward movement may also serve to lower the power density of the burning region by spreading fissile, burnable, nuclear fission fuel material to previously non-burning regions. It will be appreciated that radial movement combined with spiral movement allows for a finer spatial increment of radial motion combined with azimuthal movement for yet further burnfront shaping. It will also be appreciated that, in some cases, nuclear fission fuel subassemblies may be exchanged (or interchanged) with nuclear fission fuel subassemblies in other locations. In such cases, fertile isotopic material may be exchanged from a fertile blanket region with well-burned material from the reactor burning region. In other cases, nuclear fission fuel material may be exchanged from directly-adjacent reactor core locations such that two or more nuclear fission fuel subassemblies trade locations.

Figure 1W:
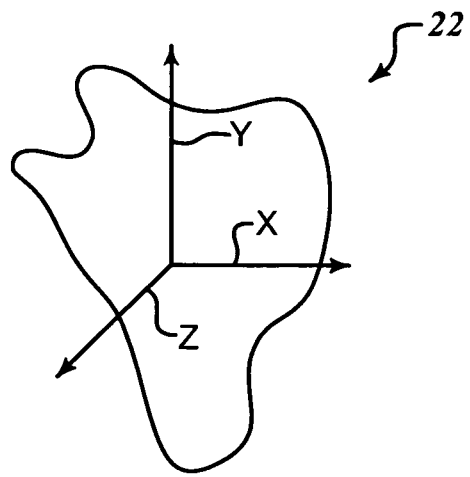
FIG. 1W illustrates an asymmetrical shape of a nuclear fission traveling wave burnfront.

In some embodiments and referring additionally to FIG. 1W, the shape of the nuclear fission traveling wave burnfront 22 along the second dimension may be asymmetrical. In some arrangements, the shape of the nuclear fission traveling wave burnfront 22 may be rotationally asymmetrical around the second dimension.

Figure 1X:
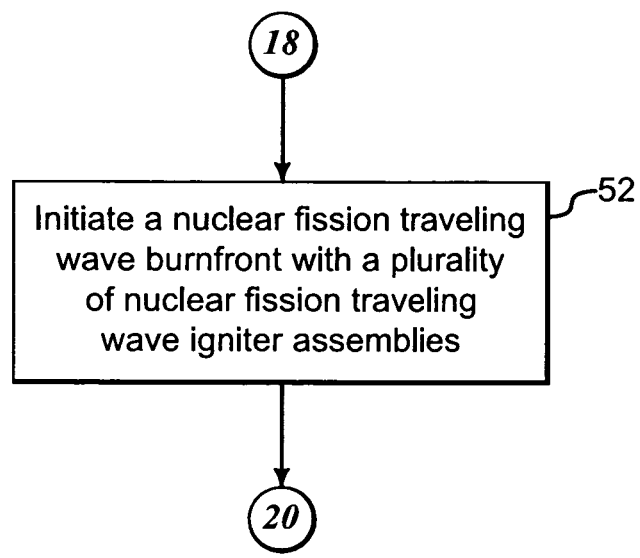
Figure 1Y:
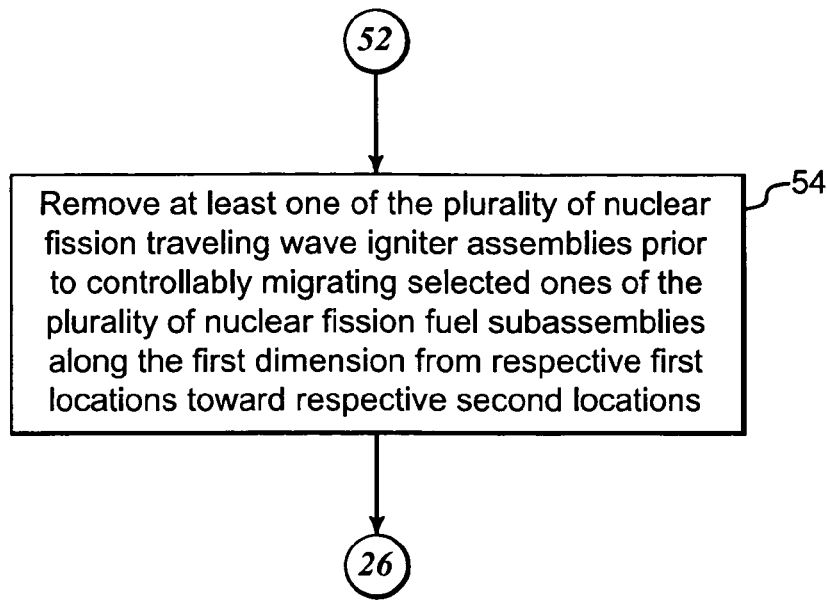
Figure 1Z:
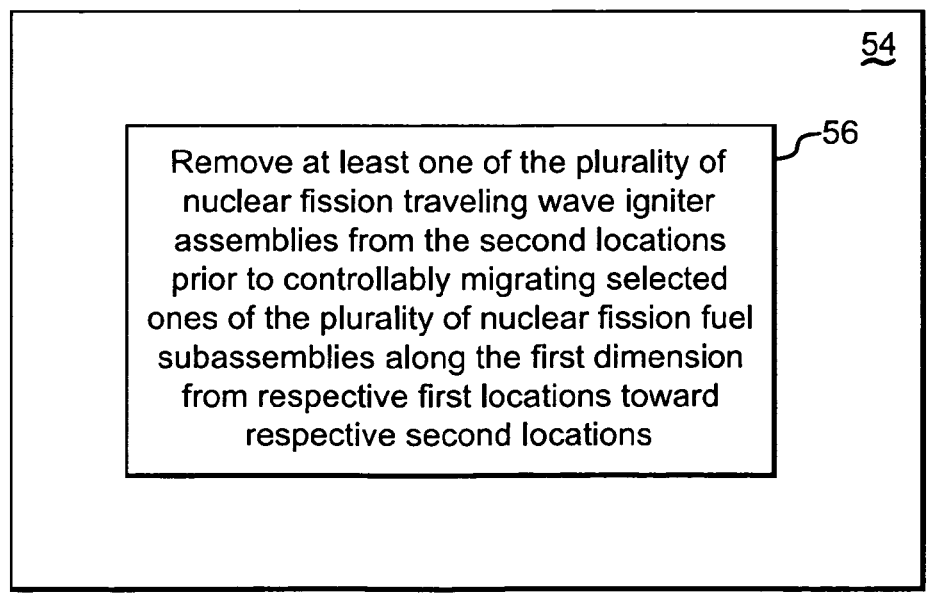
Figure 1A:
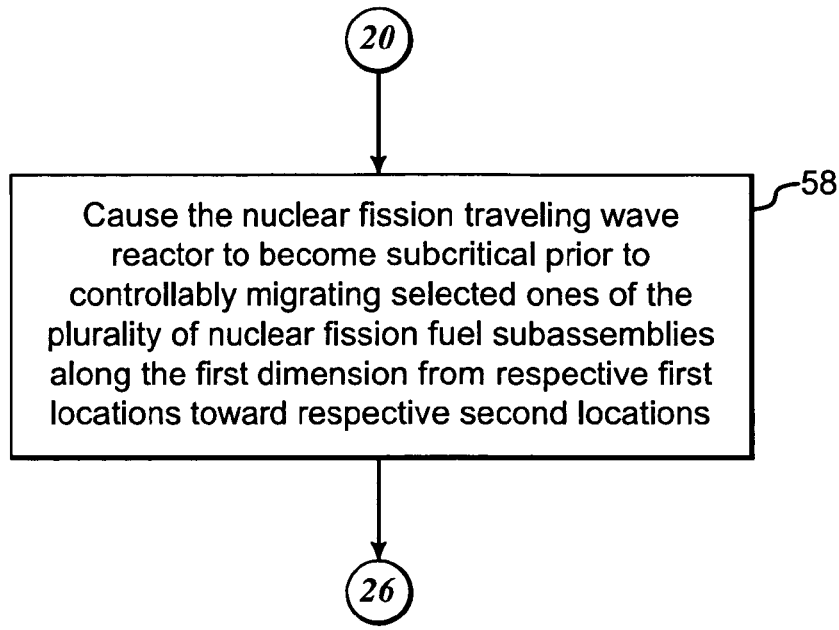
Figure 1A:
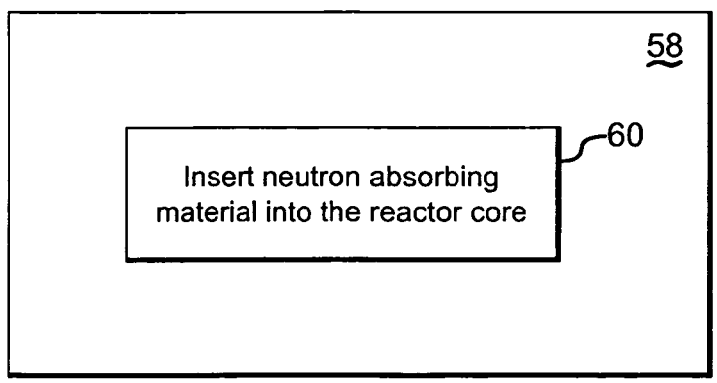
Figure 1A:
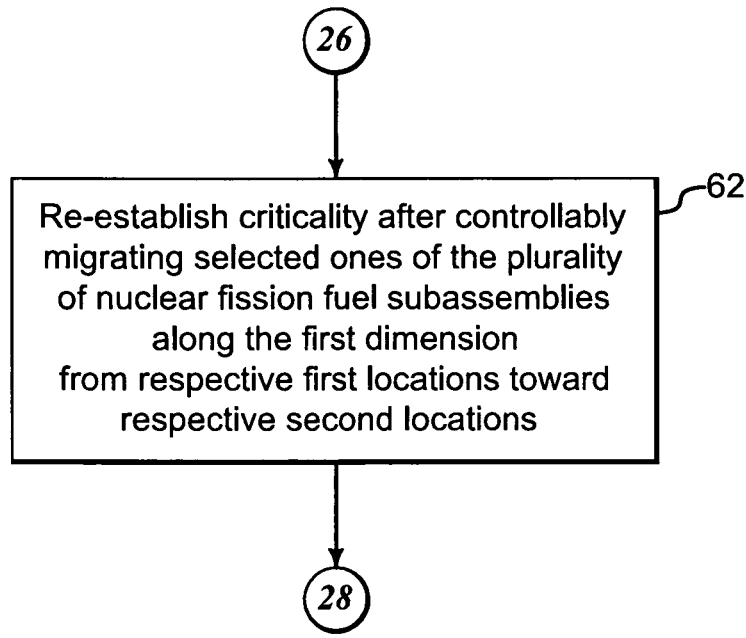
Figure 1A:
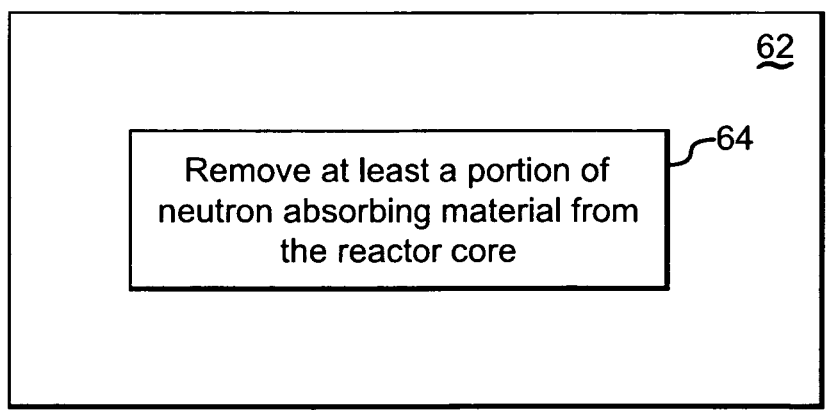
Figure 1A:
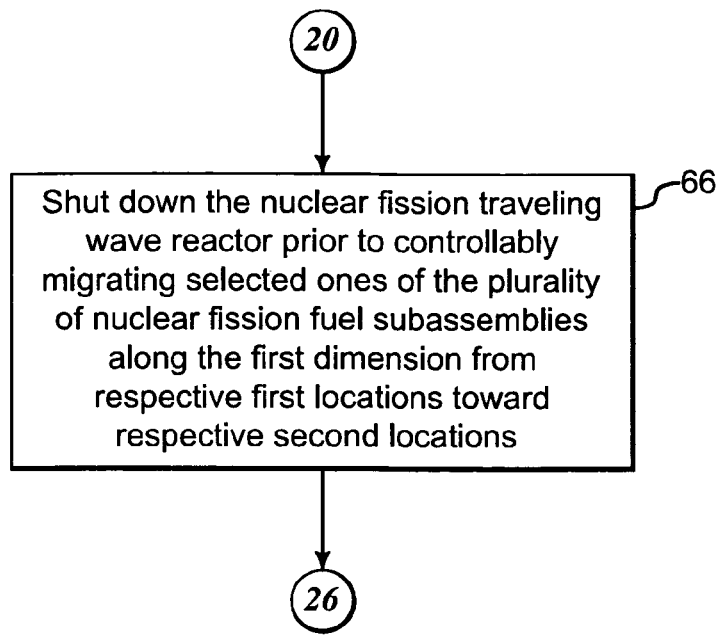
Figure 1A:
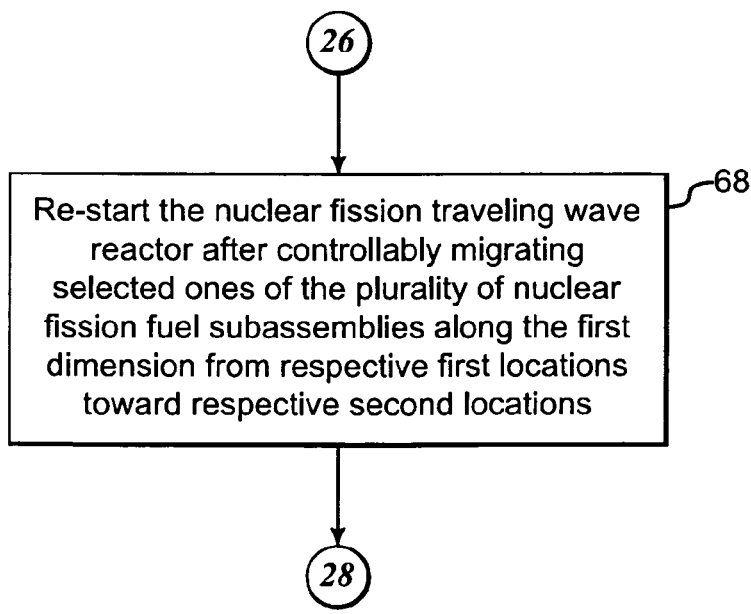

In some embodiments and referring additionally to FIG. 1X, the method 20 may also include initiating the nuclear fission traveling wave burnfront 22 with nuclear fission traveling wave igniter assemblies (not shown) at a block 52. Illustrative examples of initiation of a nuclear fission traveling wave with nuclear fission traveling wave igniter assemblies have been discussed above and need not be repeated. Referring additionally to FIG. 1Y, at a block 54 at least one of the nuclear fission traveling wave igniter assemblies may be removed prior to controllably migrating selected ones of the nuclear fission fuel subassemblies along the first dimension from respective first locations toward respective second locations. Referring additionally to FIG.

1Z, in some embodiments, removing at least one of the nuclear fission traveling wave igniter assemblies at the block 54 prior to controllably migrating selected ones of the nuclear fission fuel subassemblies along the first dimension from respective first locations toward respective second locations may include, at a block 56, removing at least one of the nuclear fission traveling wave igniter assemblies from the second locations prior to controllably migrating selected ones of the nuclear fission fuel subassemblies along the first dimension from respective first locations toward respective second locations.

In some embodiments and referring additionally to FIG. 1AA, at a block 58 the nuclear fission traveling wave reactor is caused to become subcritical prior to controllably migrating selected ones of the nuclear fission fuel subassemblies along the first dimension from respective first locations toward respective second locations. For example and referring additionally to FIG. 1AB, in some embodiments causing the nuclear fission traveling wave reactor to become subcritical at the block 58 may include inserting neutron absorbing material into the reactor core at a block 60.

Referring additionally to FIG. 1AC, in some embodiments at a block 62 criticality may be re-established after controllably migrating selected ones of the nuclear fission fuel subassemblies along the first dimension from respective first locations toward respective second locations. For example and referring additionally to FIG. 1AD, in some embodiments re-establishing criticality at the block 62 may include removing at least a portion of neutron absorbing material from the reactor core at a block 64.

In some embodiments and referring additionally to FIG. 1AE, at a block 66 the nuclear fission traveling wave reactor may be shut down prior to controllably migrating selected ones of the nuclear fission fuel subassemblies along the first dimension from respective first locations toward respective second locations. Referring additionally to FIG. 1AF, at a block 68 the nuclear fission traveling wave reactor may be re-started after controllably migrating selected ones of the nuclear fission fuel subassemblies along the first dimension from respective first locations toward respective second locations.

Figure 2A:
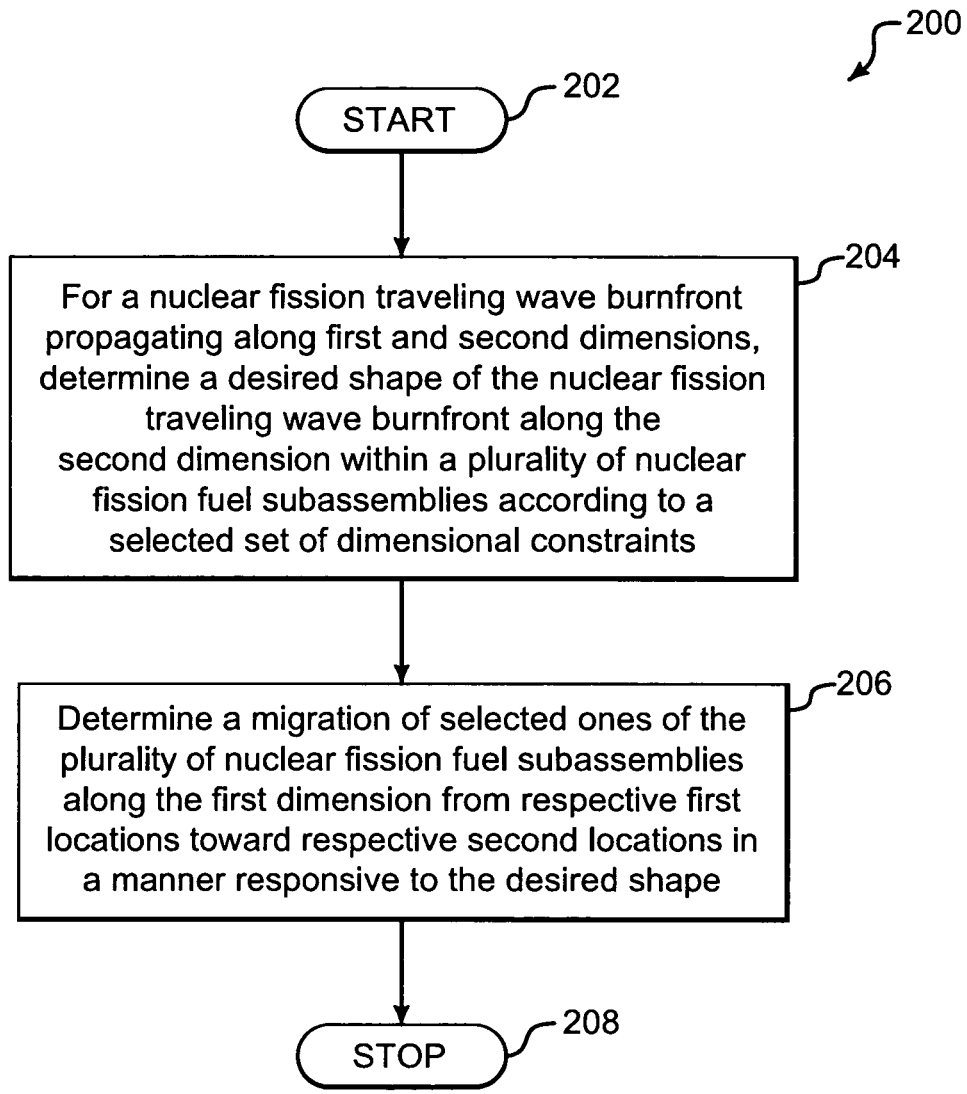
FIG. 2A is a block diagram of an illustrative method of controlling a nuclear fission traveling wave reactor.

Referring now to FIG. 2A and FIG. 1B, an illustrative method 200 is provided for controlling a nuclear fission traveling wave reactor in which a nuclear fission traveling wave burnfront 22 is propagating along first and second dimensions. The method 200 starts at a block 202. At a block 204 a desired shape of the nuclear fission traveling wave burnfront 22 is determined along the second dimension within the nuclear fission fuel subassemblies 14 according to a selected set of dimensional constraints. At a block 206 a migration of selected ones of the nuclear fission fuel subassemblies 14 is determined along the first dimension from respective first locations toward respective second locations in a manner responsive to the desired shape.

Figure 2B:
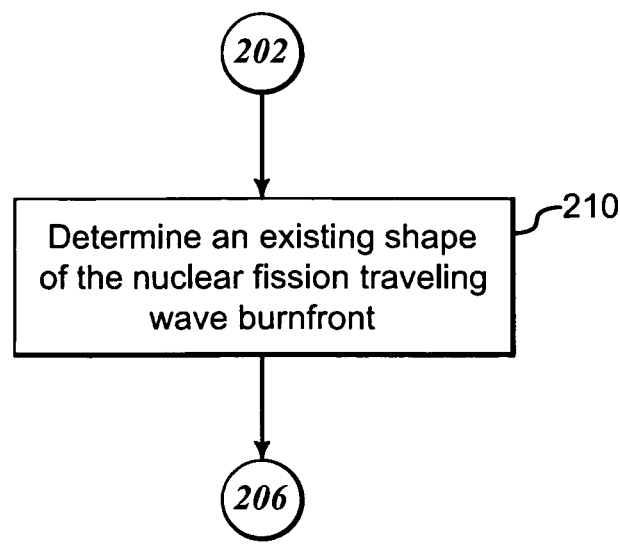
FIGS. 2B-2M are block diagrams of details of parts of the method of FIG. 2A.

Referring additionally to FIG. 2B, in some embodiments at a block 210 an existing shape of the nuclear fission traveling wave burnfront 22 is determined. It will be appreciated that determining the existing shape of the nuclear fission traveling wave burnfront 22 at the block 210 may be performed as desired in relation to determining the desired shape of the nuclear fission traveling wave burnfront 22 at the block 204. In some embodiments determining the existing shape of the nuclear fission traveling wave burnfront 22 at the block 210 may be performed prior to determining the desired shape of the nuclear fission traveling wave burnfront 22 at the block 204. In some other embodiments determining the existing shape of the nuclear fission traveling wave burnfront 22 at the block 210 may be performed substantially simultaneously with determining the desired shape of the nuclear fission traveling wave burnfront 22 at the block 204. In some other embodiments determining the existing shape of the nuclear fission traveling wave burnfront 22 at the block 210 may be performed after determining the desired shape of the nuclear fission traveling wave burnfront 22 at the block 204. The desired shape may be determined as desired, including determination of fission rate, estimated burn-up, breeding rate, temperature distribution, power distribution, assembly operational history, and reactivity worth of the migrated nuclear fission fuel material within respective locations.

Figure 2C:
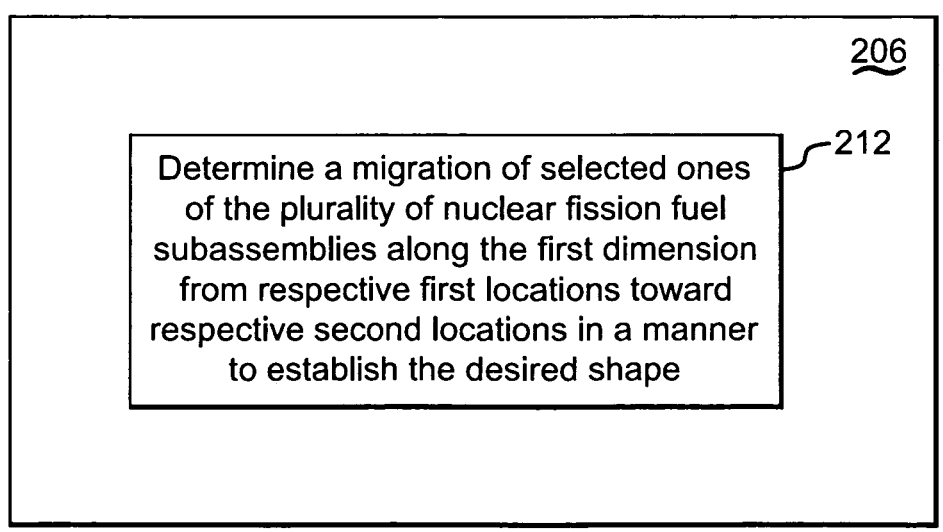
Figure 2D:
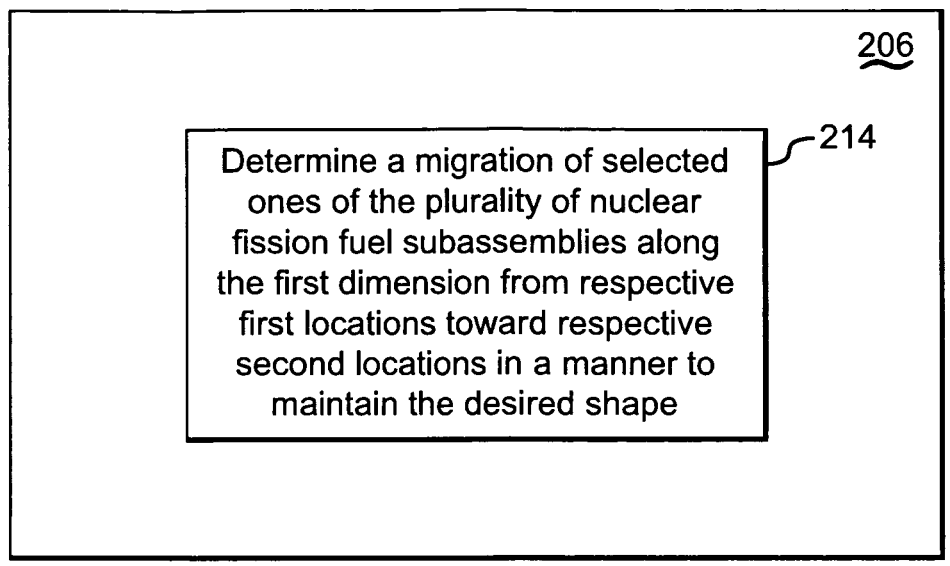

It will be appreciated that the selected ones of the nuclear fission fuel subassemblies 14 may be migrated for any purpose as desired for a particular application, such as establishing the desired shape of the nuclear fission traveling wave burnfront 22 and/or maintaining the desired shape of the nuclear fission traveling wave burnfront 22. For example, in some embodiments and referring additionally to FIG. 2C, determining a migration of selected ones of the nuclear fission fuel subassemblies 14 along the first dimension from respective first locations toward respective second locations in a manner responsive to the desired shape at the block 206 may include determining a migration of selected ones of the nuclear fission fuel subassemblies 14 along the first dimension from respective first locations toward respective second locations in a manner to establish the desired shape at a block 212. In some other embodiments and referring additionally to FIG. 2D, determining a migration of selected ones of the nuclear fission fuel subassemblies 14 along the first dimension from respective first locations toward respective second locations in a manner responsive to the desired shape may include determining a migration of selected ones of the nuclear fission fuel subassemblies 14 along the first dimension from respective first locations toward respective second locations in a manner to maintain the desired shape at a block 214.

Figure 2E:
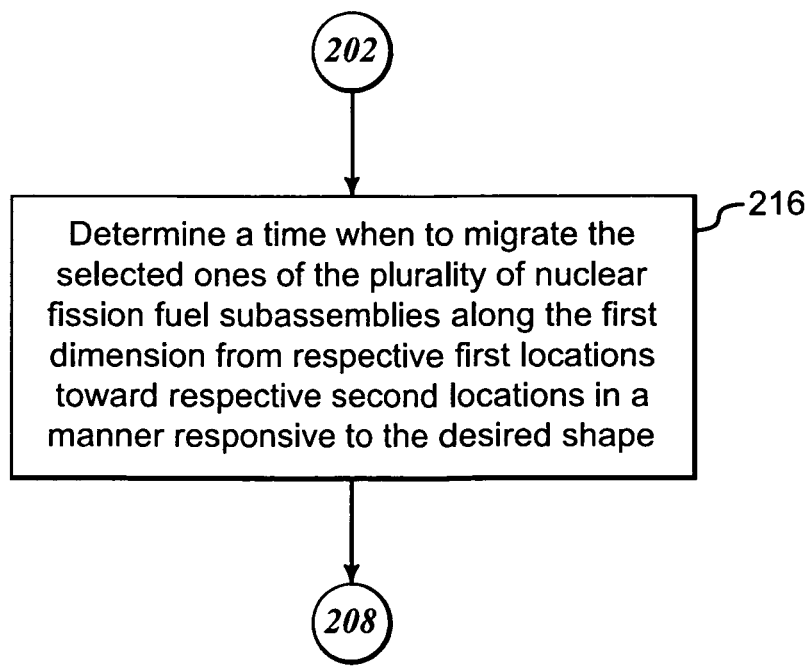

It will be appreciated that it may be desirable to determine, among other things, a time when to perform desired migration. To that end and referring to FIG. 2E, in some embodiments at a block 216 a determination is made of a time when to migrate the selected ones of the nuclear fission fuel subassemblies 14 along the first dimension from respective first locations toward respective second locations in a manner responsive to the desired shape. It will also be appreciated that the determination at the block 216 may be made at any point in performance of the method 200 as desired.

Figure 2F:
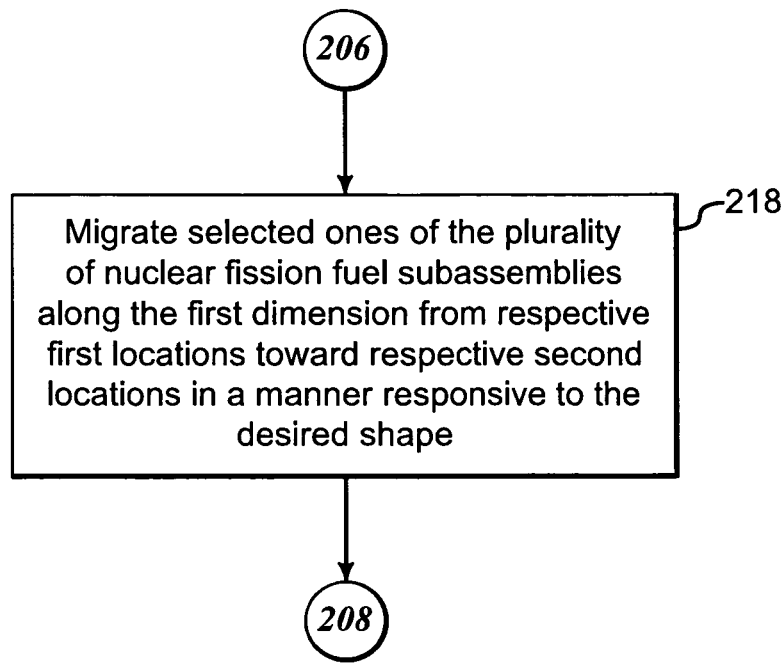

In some embodiments the selected ones of the nuclear fission fuel subassemblies 14 may be migrated. Referring additionally to FIG. 2F, at a block 218 the selected ones of the nuclear fission fuel subassemblies 14 may be migrated along the first dimension from respective first locations toward respective second locations in a manner responsive to the desired shape.

It will be appreciated that some aspects of the method 200 are similar to some of the aspects of the method 10 that have been explained above. These similar aspects will be mentioned but, for sake of brevity, their details need not be explained for an understanding.

For example and referring additionally to FIG. 1B, in some embodiments the nuclear fission fuel subassemblies 14 may be elongate along the second dimension. The first dimension may be substantially orthogonal to an elongated axis of the nuclear fission subassemblies 14. The first dimension and the second dimension may be substantially orthogonal to each other.

In further examples and still referring additionally to FIG. 1B, the first dimension may include a radial dimension and the second dimension may include an axial dimension. In some other examples, the first dimension may include an axial dimension and the second dimension may include a radial dimension. Nuclear fission reactors of any type may include nuclear fission fuel subassemblies that extend across the entire axial dimension with multiple nuclear fission fuel subassemblies extending across the radial dimension. A nuclear fission traveling wave may propagate along and axial dimension at a different rate than in the radial dimension depending on the power distribution and the divergence, in this case, of the nuclear fission traveling wave from inner regions to outer regions, particularly in cylindrical reactor core configurations. It is desirable in this case to perform radial migrations of nuclear fission fuel subassemblies to preserve wave shape and characteristics in the axial dimension. For example, propagation of the nuclear fission traveling wave to the axial extent of the reactor region will promote leakage of neutrons from the reactor core at the reactor core's axial ends. Such leakage, as described above, lessens the fertile-to-fissile conversion within the nuclear fission reactor. Nuclear fission fuel subassemblies with a burnfront that is expanding to undesired axial locations may be moved radially such that the nuclear fission fuel subassemblies are subjected to neutronic activity at locations within the nuclear fission fuel subassembly which reduce or limit further burnfront propagation to undesired locations. In other cases, it may be desirable to move nuclear fission fuel subassemblies radially based on nuclear fission traveling wave propagation in the axial dimension such that fissile material having been bred into the axial regions of the nuclear fission fuel subassembly may be used in other portions of the nuclear fission reactor core. At a given axial location, the burn-front may be made non-uniform in the radial dimension through controlled migration of nuclear fission fuel subassemblies such that, if desired, alternating zones of varying enrichment can be created. Placing high enrichment zones next to depleted or low enrichment zones increases neutron leakage from the high enrichment zone to the low enrichment zone, thereby facilitating conversion of the fertile isotopic material to fissile material. It will be appreciated that the above migrations may be performed to promote propagation in a first dimension while limiting propagation in a second dimension.

In some further examples and still referring additionally to FIG. 1B, the first dimension may include an axial dimension and the second dimension may include a lateral dimension. In other examples, the first dimension may include a lateral dimension and the second dimension may include an axial dimension.

As discussed above and referring additionally to FIG. 1C, the first locations may include the outward locations 30 and the second locations may include the inward locations 32. As also discussed above, the inward locations 32 and the outward locations 30 may be based on geometrical proximity to a central portion of the reactor core 12. The inward locations 32 and the outward locations 30 may also be based on neutron flux such that neutron flux at the inward locations 32 is greater than neutron flux at the outward locations 30. As discussed above, the inward locations 32 and the outward locations 30 may be based on reactivity such that $k_{effective}$ at the inward locations 32 is greater than $k_{effective}$ at the outward locations 30.

In some embodiments and referring additionally to FIG. 1D, the first locations may include the inward locations 32 and the second locations may include the outward locations 30. The inward locations and the outward locations may be based on geometrical proximity to a central portion of the reactor core 12, and/or based on neutron flux such that neutron flux at the inward locations is greater than neutron flux at the outward locations, and/or based on reactivity such that $k_{effective}$ at the inward locations is greater than $k_{effective}$ at the outward locations.

In some embodiments and as shown in FIG. 1B, the first locations and the second locations may be located on opposite sides of a reference value along the first dimension.

As also shown in FIG. 1B, in some embodiments the first locations and the second locations may include at least one attribute that is substantially equalized. For example, the at least one attribute may include geometrical proximity to a central region of the reactor core 12, neutron flux, and/or reactivity.

Figure 2G:
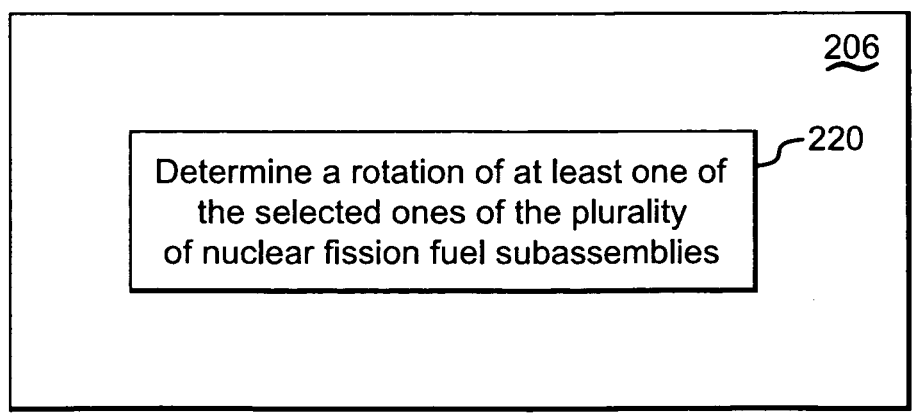
Figure 2H:
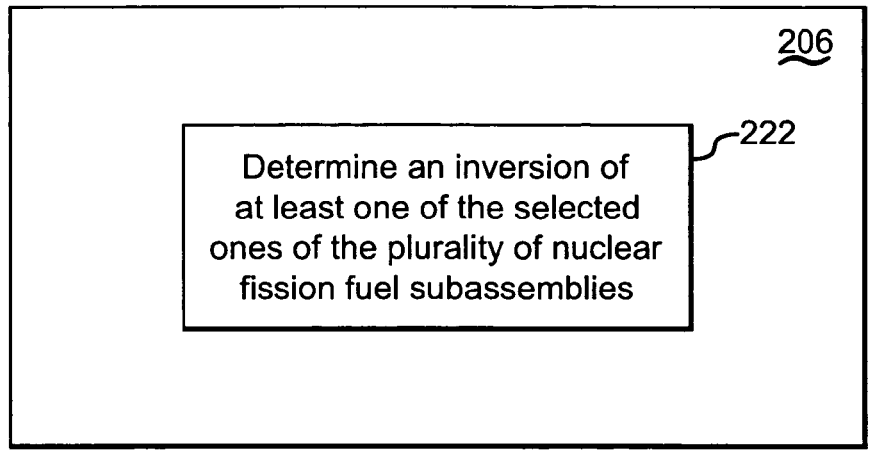

In some embodiments and referring additionally to FIG. 2G, determining a migration of selected ones of the nuclear fission fuel subassemblies 14 along the first dimension from respective first locations toward respective second locations at the block 206 may include determining a rotation of at least one of the selected ones of the nuclear fission fuel subassemblies 14 at a block 220. In some embodiments and referring additionally to FIG. 2H, determining a migration of selected ones of the nuclear fission fuel subassemblies 14 along the first dimension from respective first locations toward respective second locations at the block 206 may include determining an inversion of at least one of the selected ones of the nuclear fission fuel subassemblies 14 at a block 222.

In some embodiments the selected set of dimensional constraints may include a predetermined maximum distance along the second dimension. In some other embodiments the selected set of dimensional constraints is a function of at least one burnfront criteria. For example, the burnfront criteria may include neutron flux, such as without limitation neutron flux that is associated with at least one of the selected ones of the nuclear fission fuel subassemblies 14. As another example, the burnfront criteria may include neutron fluence, such as without limitation neutron fluence that is associated with at least one of the selected ones of the nuclear fission fuel subassemblies 14. As another example, the burnfront criteria may include burnup, such as without limitation burnup that is associated with at least one of the selected ones of the nuclear fission fuel subassemblies 14. In some other embodiments the burnfront criteria may include burnfront location within at least one of the selected ones of the nuclear fission fuel subassemblies 14.

Figure 2I:
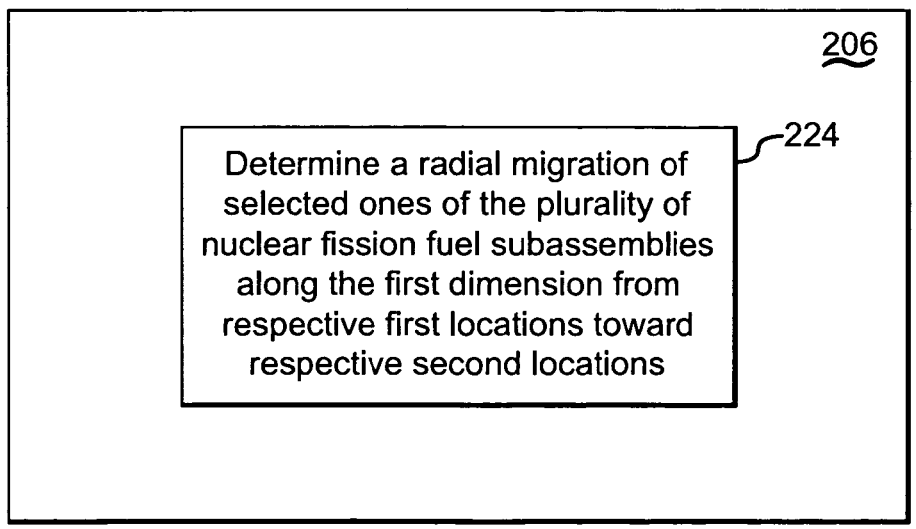
Figure 2J:
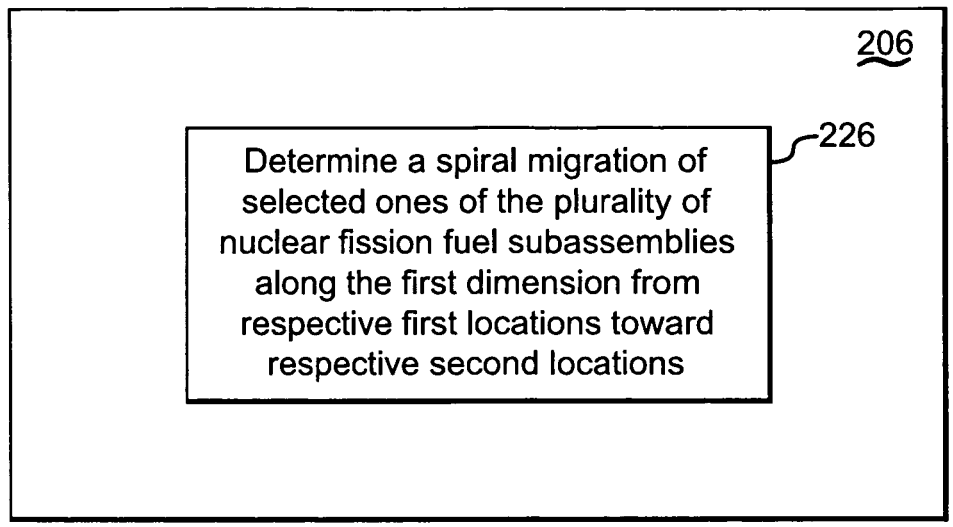
Figure 2K:
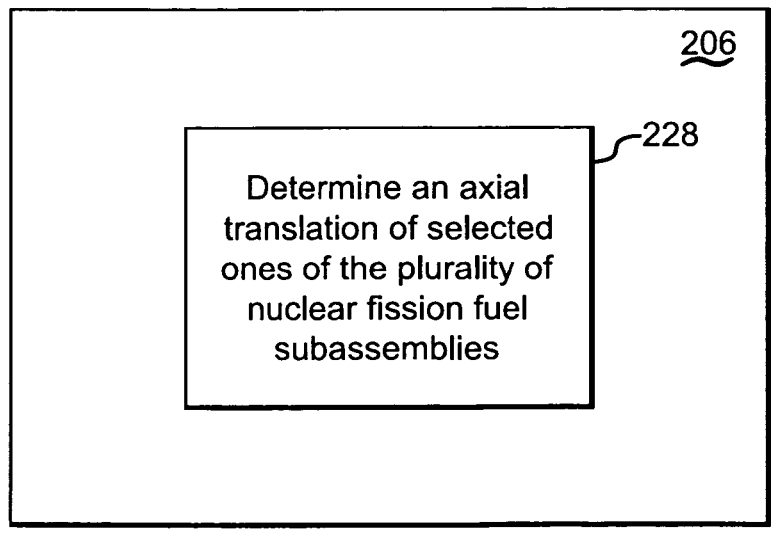

Referring additionally to FIG. 2I, in some embodiments determining a migration of selected ones of the nuclear fission fuel subassemblies 14 along the first dimension from respective first locations toward respective second locations at the block 206 may include determining a radial migration of selected ones of the nuclear fission fuel subassemblies 14 along the first dimension from respective first locations toward respective second locations at a block 224. In some embodiments and referring additionally to FIG. 2J, determining a migration of selected ones of the nuclear fission fuel subassemblies 14 along the first dimension from respective first locations toward respective second locations at the block 206 may include determining a spiral migration of selected ones of the nuclear fission fuel subassemblies 14 along the first dimension from respective first locations toward respective second locations at a block 226. In some other embodiments and referring additionally to FIG. 2K, determining a migration of selected ones of the nuclear fission fuel subassemblies 14 along the first dimension from respective first locations toward respective second locations at the block 206 may include determining an axial translation of selected ones of the nuclear fission fuel subassemblies 14 at a block 228.

Figure 2L:
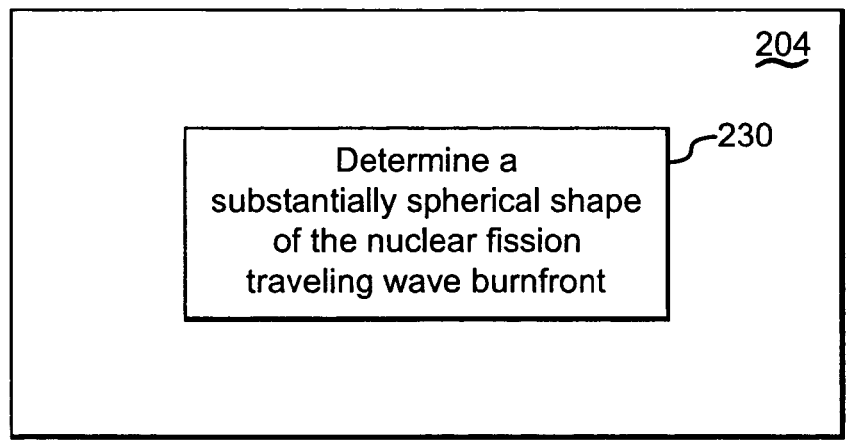
Figure 2M:
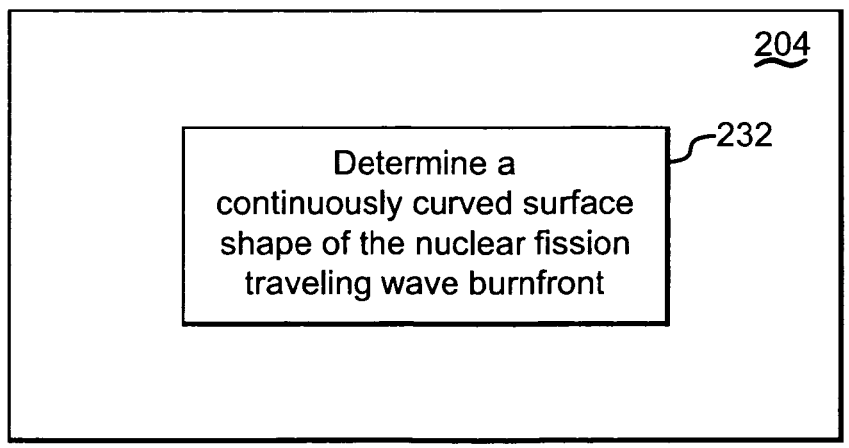

Referring additionally to FIG. 2L, in some embodiments determining a desired shape of the nuclear fission traveling wave burnfront 22 at the block 204 may include determining a substantially spherical shape of the nuclear fission traveling wave burnfront 22 at a block 230. In some other embodiments and referring additionally to FIG. 2M, determining a desired shape of the nuclear fission traveling wave burnfront 22 along the second dimension at the block 204 may include determining a continuously curved surface shape of the nuclear fission traveling wave burnfront 22 at a block 232. In some other embodiments, the curved surface may be made such that the surface area of the burnfront is enhanced. In such embodiments, leakage of neutrons from burning zones to breeding zones is enhanced.

The desired shape of the nuclear fission traveling wave burnfront 22 may be any shape. As discussed above, in various embodiments the desired shape of the nuclear fission traveling wave burnfront 22 may be substantially rotationally symmetrical around the second dimension; the desired shape of the nuclear fission traveling wave burnfront 22 may have substantial n-fold rotational symmetry around the second dimension; the desired shape of the nuclear fission traveling wave burnfront 22 may be asymmetrical; and/or the desired shape of the nuclear fission traveling wave burnfront 22 may be rotationally asymmetrical around the second dimension. In some other embodiments symmetrical shapes of n-fold symmetry may be transformed into separate burning zones within the nuclear fission traveling wave reactor core. For example, the burnfront can be transformed into lobes that can further be propagated into n- or less separate (that is, neutronically decoupled) burning regions (see FIG. 1V).

Some embodiments may be provided as illustrative systems. For example and referring now to FIG. 3A, an illustrative system 300 is provided for determining migration of nuclear fission fuel subassemblies (not shown in FIG. 3A). Given by way of non-limiting example, the system 300 may provide a suitable system environment for performance of the method 200 (FIGS. 2A-2M). In some embodiments and referring additionally to FIG. 1B, for the nuclear fission traveling wave burnfront 22 propagating along the first and second dimensions, electrical circuitry 302 is configured to determine a desired shape of the nuclear fission traveling wave burnfront 22 along the second dimension within the nuclear fission fuel subassemblies 14 according to a selected set of dimensional constraints. Electrical circuitry 304 is configured to determine a migration of selected ones of the nuclear fission fuel subassemblies 14 along the first dimension from respective first locations toward respective second locations in a manner responsive to the desired shape.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Figure 3A:
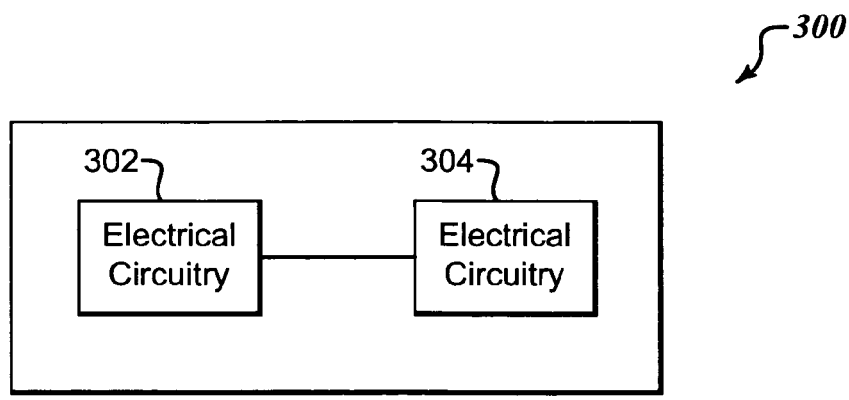
FIG. 3A is a block diagram of an illustrative system for determining migration of nuclear fission fuel subassemblies.
Figure 3B:
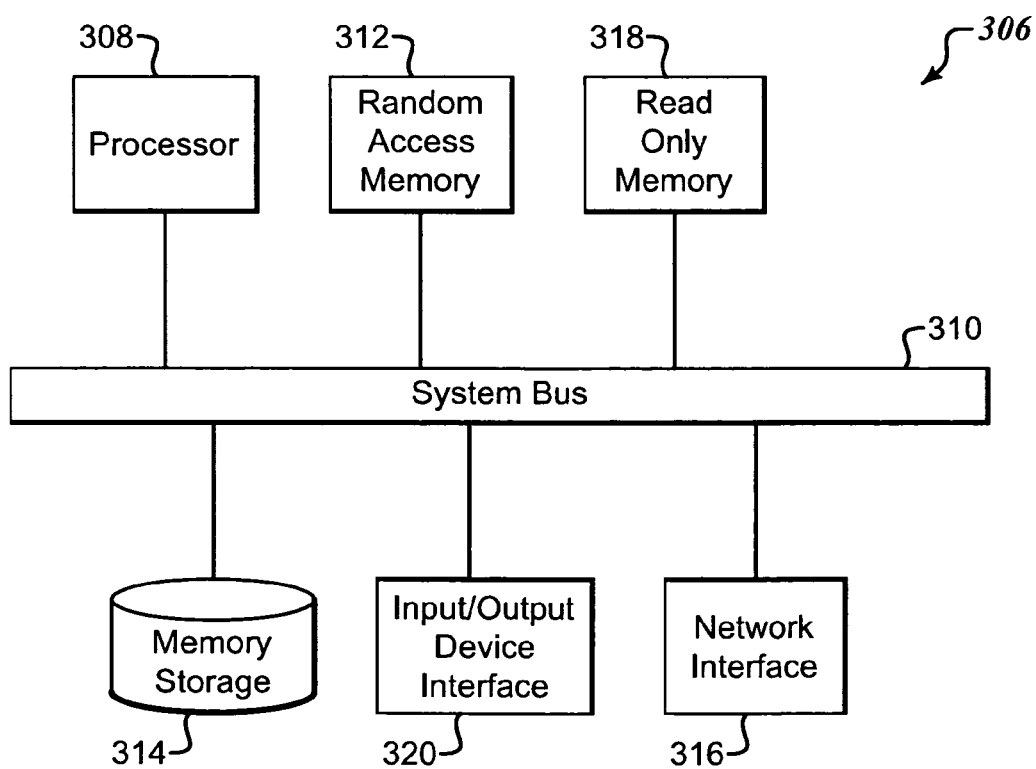
FIGS. 3B-3C are block diagrams of details of components of the system of FIG. 3A.

Referring additionally to FIG. 3B, in an illustrative example the electrical circuitry 302 and/or the electrical circuitry 304 may be embodied as a computing system 306 (that also may be referred to as a host computer or system). In an illustrative embodiment a central processing unit ("CPU") (or microprocessor) 308 is connected to a system bus 310. Random access main memory ("RAM") 312 is coupled to the system bus 310 and provides the CPU 308 with access to memory storage 314 (which may be used for storage of data associated with one or more parameters of the nuclear fission traveling wave burnfront 22). When executing program instructions, the CPU 308 stores those process steps in the RAM 312 and executes the stored process steps out of the RAM 312.

The computing system 306 may connect to a computer network (not shown) via a network interface 316 and through a network connection (not shown). One such network is the Internet that allows the computing system 306 to download applications, code, documents and other electronic information. Read only memory ("ROM") 318 is provided to store invariant instruction sequences such as start-up instruction sequences or basic input/output operating system (BIOS) sequences.

An Input/Output ("I/O") device interface 320 allows the computing system 306 to connect to various input/output devices, for example, a keyboard, a pointing device ("mouse"), a monitor, printer, a modem, and the like. The I/O device interface 320 is shown as a single block for simplicity and may include several interfaces to interface with different types of I/O devices.

It will be appreciated that embodiments are not limited to the architecture of the computing system 306 shown in FIG. 3B. Based on the type of applications/business environment, the computing system 306 may have more or fewer components. For example, the computing system 306 can be a set-top box, a lap-top computer, a notebook computer, a desktop system, or other types of systems.

In various embodiments, portions of disclosed systems and methods include one or more computer program products. The computer program product includes a computer-readable storage medium, such as the non-volatile storage medium, and computer-readable program code portions, such as a series of computer instructions, embodied in the computer-readable storage medium. Typically, the computer program is stored and executed by a processing unit or a related memory device, such as the processing components depicted in FIG. 3B.

In this regard, FIGS. 2A-2M and 3A-3C are flowcharts and block diagrams, respectively, of methods, systems, and program products according to various embodiments. It will be understood that each block of the flowcharts and block diagrams, and combinations of blocks in the flowcharts and block diagrams, can be implemented by computer program instructions. These computer program instructions may be loaded onto a computer or other programmable apparatus to produce a machine, such that the instructions which execute on the computer or other programmable apparatus create means for implementing the functions specified in the flowchart(s) or block diagram(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart(s) or block diagram(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart(s) or block diagram(s).

Accordingly, blocks of the flowchart or block diagram support combinations of means for performing the specified functions, combinations of steps for performing the specified functions, and program instruction means for performing the specified functions. It will also be understood that each block of the flowchart or block diagram and combinations of blocks in the flowchart(s) or block diagram(s) can be implemented by special purpose hardware-based computer systems which perform the specified functions or steps, or combinations of special purpose hardware and computer instructions.

Figure 3C:
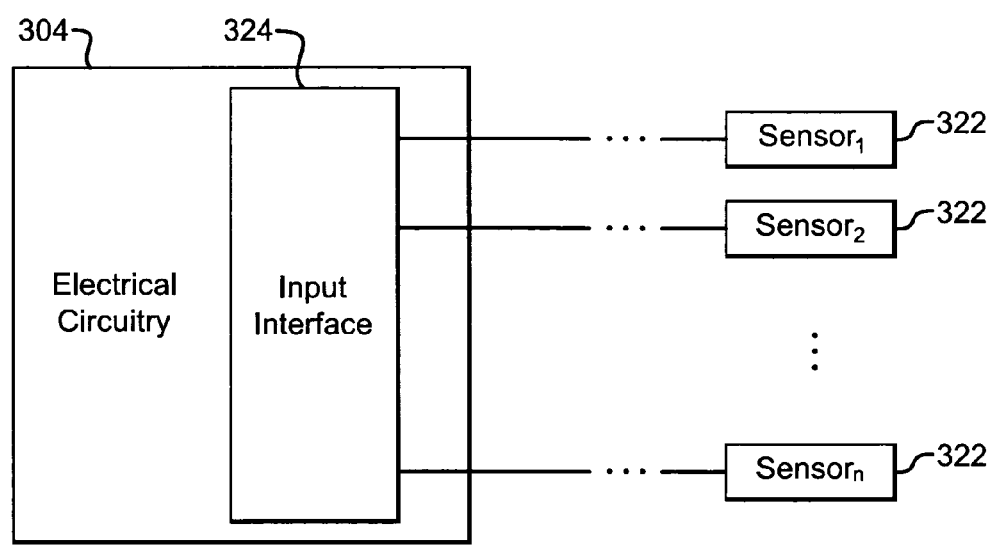

Referring additionally to FIG. 3C, in some embodiments the electrical circuitry 304 may be further configured to determine an existing shape of the nuclear fission traveling wave burnfront 22. For example, sensors 322 may be operatively coupled to the electrical circuitry 304 in signal communication via a suitable input interface 324. The sensors 322 may include any suitable sensor that measures a parameter of the nuclear fission traveling wave burnfront 22. For example, the sensors 322 may measure neutron flux, neutron fluence, burnup, and/or reactivity (or any of their components).

As discussed above, embodiments of the system 300 and the electrical circuitry 302 and 304 may be configured to provide a suitable system environment for performance of the method 200 (FIGS. 2A-2M) regardless of whether computer program instructions are loaded onto a computer or other programmable apparatus to produce a machine such that the instructions which execute on the computer or other programmable apparatus create means for implementing the functions specified in the flowchart(s) or block diagram(s) or each block of the flowchart or block diagram and combinations of blocks in the flowchart(s) or block diagram(s) are implemented by special purpose hardware-based computer systems which perform the specified functions or steps, or combinations of special purpose hardware and computer instructions. Some features of embodiments of the system 300 will be discussed with reference additionally to FIGS. 1B-D, 1J, 1L, 1O, 1Q, 1R-1W, and 2A-2M.

To that end, in some embodiments the electrical circuitry 304 may be further configured to determine a migration of selected ones of the nuclear fission fuel subassemblies 14 along the first dimension from respective first locations toward respective second locations in a manner to establish the desired shape. The electrical circuitry 304 may be further configured to determine a migration of selected ones of the nuclear fission fuel subassemblies 14 along the first dimension from respective first locations toward respective second locations in a manner to maintain the desired shape. The electrical circuitry 304 may be further configured to determine a time when to migrate the selected ones of the nuclear fission fuel subassemblies 14 along the first dimension from respective first locations toward respective second locations in a manner responsive to the desired shape.

As discussed above, in some embodiments the nuclear fission fuel subassemblies 14 may be elongate along the second dimension.

As also discussed above, in some embodiments the first dimension may be substantially orthogonal to an elongated axis of the nuclear fission subassemblies 14. In some other embodiments, the first dimension and the second dimension may be substantially orthogonal to each other.

In various embodiments the first dimension may include a radial dimension and the second dimension may include an axial dimension; the first dimension may include an axial dimension and the second dimension may include a radial dimension; the first dimension may include an axial dimension and the second dimension may include a lateral dimension; and/or the first dimension may include a lateral dimension and the second dimension may include an axial dimension.

In some embodiments the first locations may include the outward locations 30 and the second locations may include the inward locations 32. The inward locations 32 and the outward locations 30 may be based on various attributes as desired, such as without limitation geometrical proximity to a central portion of the reactor core 12, neutron flux such that neutron flux at the inward locations 32 is greater than neutron flux at the outward locations 30, and/or reactivity such that $k_{effective}$ at the inward locations 32 is greater than $k_{effective}$ at the outward locations 30.

In some other embodiments the first locations may include the inward locations 32 and the second locations may include the outward locations 30. The inward locations 32 and the outward locations 30 may be based on various attributes as desired, such as without limitation geometrical proximity to a central portion of the reactor core 12, neutron flux such that neutron flux at the inward locations 32 is greater than neutron flux at the outward locations 30, and/or reactivity such that $k_{effective}$ at the inward locations 32 is greater than $k_{effective}$ at the outward locations 30. In some embodiments the first locations and the second locations may be located on opposite sides of a reference value along the first dimension.

In some other embodiments the first locations and the second locations may include at least one attribute that is substantially equalized. For example, the at least one attribute may include geometrical proximity to a central region of the reactor core 12, neutron flux, and/or reactivity.

In some embodiments the electrical circuitry 304 may be further configured to determine rotation of at least one of the selected ones of the nuclear fission fuel subassemblies 14. In some other embodiments the electrical circuitry 304 may be further configured to determine inversion of at least one of the selected ones of the nuclear fission fuel subassemblies 14.

As discussed above, in some embodiments the selected set of dimensional constraints may include a predetermined maximum distance along the second dimension.

In some other embodiments the selected set of dimensional constraints may be a function of at least one burnfront criteria. For example, the burnfront criteria may include without limitation: neutron flux, such as neutron flux that is associated with at least one of the selected ones of the nuclear fission fuel subassemblies 14; neutron fluence, such as neutron fluence that is associated with at least one of the selected ones of the nuclear fission fuel subassemblies 14; and/or burnup, such as burnup that is associated with at least one of the selected ones of the nuclear fission fuel subassemblies 14. In some embodiments the burnfront criteria may include burnfront location within at least one of the selected ones of the nuclear fission fuel subassemblies 14.

In some embodiments the electrical circuitry 304 may be further configured to determine a radial migration of selected ones of the nuclear fission fuel subassemblies 14 along the first dimension from respective first locations toward respective second locations. The electrical circuitry 304 may be further configured to determine a spiral migration of selected ones of the nuclear fission fuel subassemblies 14 along the first dimension from respective first locations toward respective second locations. The electrical circuitry 304 may be further configured to determine an axial translation of selected ones of the nuclear fission fuel subassemblies 14.

In some embodiments the electrical circuitry 302 may be further configured to determine a substantially spherical shape of the nuclear fission traveling wave burnfront 22. The electrical circuitry 302 may be further configured to determine a continuously curved surface shape of the nuclear fission traveling wave burnfront 22.

In various embodiments the desired shape of the nuclear fission traveling wave burnfront 22 may be substantially rotationally symmetrical around the second dimension; may have substantial n-fold rotational symmetry around the second dimension; and/or may be asymmetrical, such as without limitation by being rotationally asymmetrical around the second dimension.

Figure 4A:
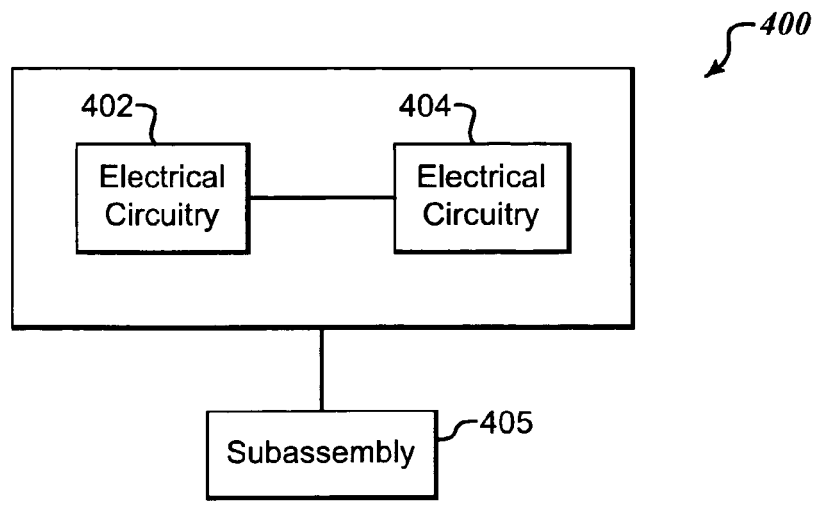
FIG. 4A is a block diagram of an illustrative system for migrating nuclear fission fuel subassemblies.

As another example and referring now to FIG. 4A, another illustrative system 400 is provided for migrating nuclear fission fuel subassemblies (not shown in FIG. 3A). Given by way of non-limiting example, the system 400 may provide a suitable system environment for performance of the method 100 (FIGS. 1A-1AF). As such, the following discussion is made with additional reference to FIGS. 1A-1AF.

In some embodiments, for the nuclear fission traveling wave burnfront 22 propagating along the first and second dimensions, electrical circuitry 402 is configured to determine a desired shape of the nuclear fission traveling wave burnfront 22 along the second dimension within the nuclear fission fuel subassemblies 14 according to a selected set of dimensional constraints. Electrical circuitry 404 is configured to determine a migration of selected ones of the nuclear fission fuel subassemblies 14 along the first dimension from respective first locations toward respective second locations in a manner responsive to the desired shape. A subassembly 405 is configured to migrate selected ones of the nuclear fission fuel subassemblies 14 responsive to the electrical circuitry 404.

It will be appreciated that the electrical circuitry 402 and 404 may be similar to the electrical circuitry 302 and 304. In some cases, the electrical circuitry 402 and 404 may be the same as the electrical circuitry 302 and 304. To that end and for sake of brevity, details need not be repeated for an understanding.

Figure 4B:
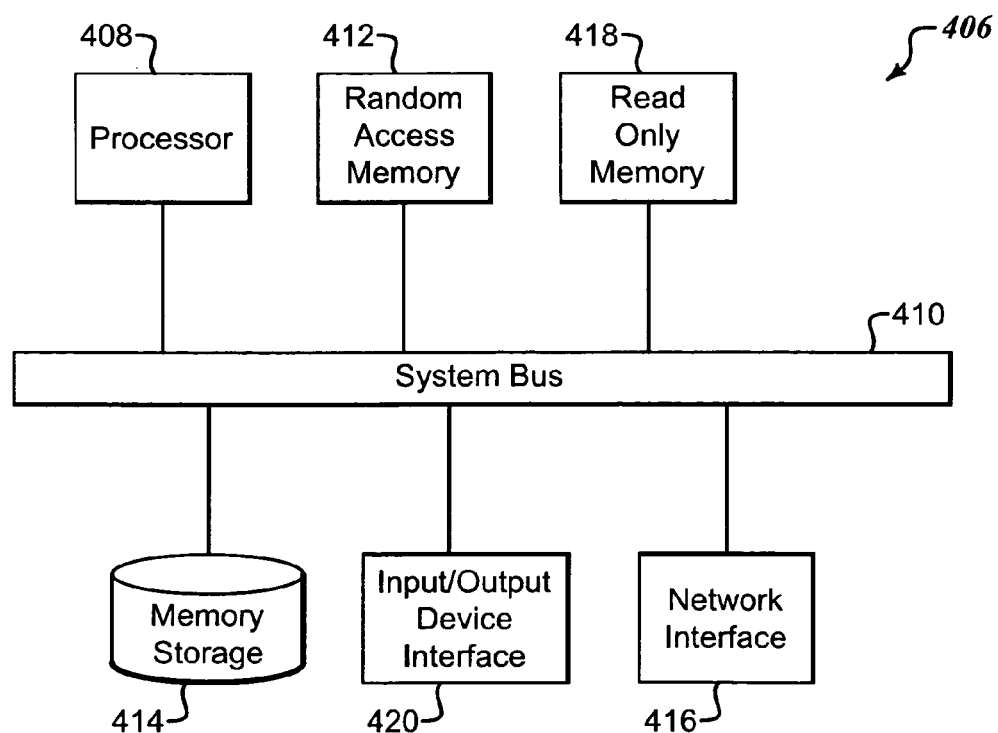
FIGS. 4B-4C are block diagrams of details of components of the system of FIG. 4A.

As a brief overview and referring additionally to FIG. 4B, in an illustrative example the electrical circuitry 402 and/or the electrical circuitry 404 may be embodied as a computing system 406 (that also may be referred to as a host computer or system). In an illustrative embodiment a central processing unit ("CPU") (or microprocessor) 408 is connected to a system bus 410. Random access main memory ("RAM") 412 is coupled to the system bus 410 and provides the CPU 408 with access to memory storage 414 (which may be used for storage of data associated with one or more parameters of the nuclear fission traveling wave burnfront 22). When executing program instructions, the CPU 408 stores those process steps in the RAM 412 and executes the stored process steps out of the RAM 412. The computing system 406 may connect to a computer network (not shown) via a network interface 416 and through a network connection (not shown). Read only memory ("ROM") 418 is provided to store invariant instruction sequences such as start-up instruction sequences or basic input/output operating system (BIOS) sequences. An Input/Output ("I/O") device interface 420 allows the computing system 406 to connect to various input/output devices, for example, a keyboard, a pointing device ("mouse"), a monitor, printer, a modem, and the like. It will be appreciated that embodiments are not limited to the architecture of the computing system 406 shown in FIG. 4B. The discussion of non-limitation regarding the computing system 306 (FIG. 3B) also applies to the computing system 406.

In various embodiments, portions of disclosed systems and methods include one or more computer program products. The discussion above regarding computer program products related to the system 300 (FIG. 3A) also applies to the system 400.

In this regard, FIGS. 1A, 1I, 1K, 1M-1N, 1P, and 1X-1AF and 4A-4C are flowcharts and block diagrams, respectively, of methods, systems, and program products according to various embodiments. It will be understood that each block of the flowcharts and block diagrams, and combinations of blocks in the flowcharts and block diagrams, can be implemented by computer program instructions. These computer program instructions may be loaded onto a computer or other programmable apparatus to produce a machine, such that the instructions which execute on the computer or other programmable apparatus create means for implementing the functions specified in the flowchart(s) or block diagram(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart(s) or block diagram(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart(s) or block diagram(s).

Accordingly, blocks of the flowchart or block diagram support combinations of means for performing the specified functions, combinations of steps for performing the specified functions, and program instruction means for performing the specified functions. It will also be understood that each block of the flowchart or block diagram and combinations of blocks in the flowchart(s) or block diagram(s) can be implemented by special purpose hardware-based computer systems which perform the specified functions or steps, or combinations of special purpose hardware and computer instructions.

Figure 4C:
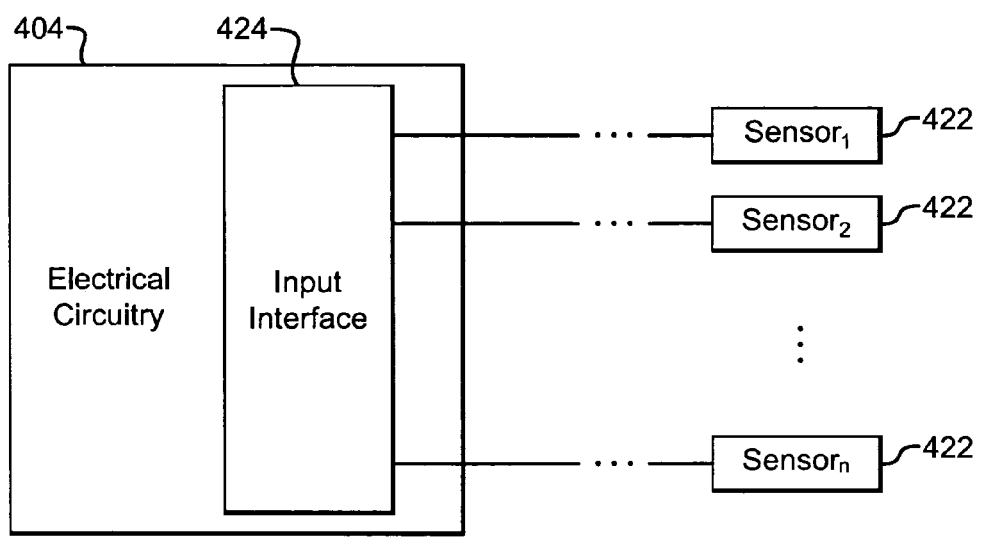

Referring additionally to FIG. 4C, in some embodiments the electrical circuitry 404 may be further configured to determine an existing shape of the nuclear fission traveling wave burnfront 22. For example, sensors 422 may be operatively coupled to the electrical circuitry 404 in signal communication via a suitable input interface 424. The electrical circuitry 404, sensors 422, and input interface 424 may be similar to (and in some cases may be the same as) the electrical circuitry 304, sensors 322, and input interface 324 (all FIG. 3C). Repetition of their details is not necessary for an understanding.

As discussed above, embodiments of the system 400, the electrical circuitry 402 and 404, and the subassembly 405 may be configured to provide a suitable system environment for performance of the method 100 (FIGS. 1A, 1I, 1K, 1M-1N, 1P, and 1X-1AF) regardless of whether computer program instructions are loaded onto a computer or other programmable apparatus to produce a machine such that the instructions which execute on the computer or other programmable apparatus create means for implementing the functions specified in the flowchart(s) or block diagram(s) or each block of the flowchart or block diagram and combinations of blocks in the flowchart(s) or block diagram(s) are implemented by special purpose hardware-based computer systems which perform the specified functions or steps, or combinations of special purpose hardware and computer instructions. Some features of embodiments of the system 400 will be discussed with reference additionally to FIGS. 1A-1AF.

In some embodiments and referring to FIG. 4C, the electrical circuitry 404 may be further configured to determine an existing shape of the nuclear fission traveling wave burnfront 22. Such a determination may be made in a similar or same manner by the electrical circuitry 304 (FIG. 3A) as described above. To that end, sensors 422 and an input interface 424 are similar or, in some cases, the same as the sensors 322 and the input interface 324 (all FIG. 3C). The sensors 422, input interface 424, and electrical circuitry 404 cooperate as discussed above for the sensors 322, input interface 324, and electrical circuitry 304 (all FIG. 3C).

In some embodiments, the electrical circuitry 404 may be further configured to determine a migration of selected ones of the nuclear fission fuel subassemblies 14 along the first dimension from respective first locations toward respective second locations in a manner to establish the desired shape. In some other embodiments, the electrical circuitry 404 may be further configured to determine a migration of selected ones of the nuclear fission fuel subassemblies 14 along the first dimension from respective first locations toward respective second locations in a manner to maintain the desired shape.

In some embodiments the electrical circuitry 404 may be further configured to determine a time when to migrate the selected ones of the nuclear fission fuel subassemblies 14 along the first dimension from respective first locations toward respective second locations in a manner responsive to the desired shape.

In some embodiments, the nuclear fission fuel subassemblies 14 may be elongate along the second dimension. The first dimension may be substantially orthogonal to an elongated axis of the nuclear fission subassemblies 14. The first dimension and the second dimension may be substantially orthogonal to each other.

In various embodiments, the first dimension may include a radial dimension and the second dimension may includes an axial dimension; the first dimension may include an axial dimension and the second dimension may include a radial dimension; the first dimension may include an axial dimension and the second dimension may include a lateral dimension; and/or the first dimension may include a lateral dimension and the second dimension may include an axial dimension.

In some embodiments the first locations may include the outward locations 30 and the second locations may include the inward locations 32. The inward locations 32 and the outward locations 30 may be based on: geometrical proximity to a central portion of the reactor core 12; neutron flux such that neutron flux at the inward locations 32 is greater than neutron flux at the outward locations 30; and/or reactivity such that $k_{effective}$ at the inward locations 32 is greater than $k_{effective}$ at the outward locations 30.

In some other embodiments the first locations may include the inward locations 32 and the second locations include the outward locations 30. The inward locations and outward locations may be based on geometrical proximity to a central portion of the reactor core 12; neutron flux such that neutron flux at the inward locations 32 is greater than neutron flux at the outward locations 30; and/or reactivity such that $k_{effective}$ at the inward locations 32 is greater than $k_{effective}$ at the outward locations 30.

In some embodiments the first locations and the second locations may be located on opposite sides of a reference value along the first dimension.

In some other embodiments the first locations and the second locations may include at least one attribute that is substantially equalized. For example, the at least one attribute may include geometrical proximity to a central region of the reactor core 12; neutron flux; and/or reactivity.

In various embodiments the electrical circuitry 404 may be further configured to determine rotation of at least one of the selected ones of the nuclear fission fuel subassemblies 14. The electrical circuitry 404 may be further configured to determine inversion of at least one of the selected ones of the nuclear fission fuel subassemblies 14.

The subassembly 405 may include any suitable nuclear fuel handling apparatus known in the art, such as without limitation an in-core nuclear fuel handling apparatus. However, in some other embodiments the subassembly 405 may include an extra-core fuel handling apparatus.

Regardless of form in which the subassembly 405 is embodied, in various embodiments the subassembly 405 may be further configured to radially migrate selected ones of the nuclear fission fuel subassemblies 14 from respective first locations toward respective second locations. The subassembly 405 may be further configured to spirally migrate selected ones of the nuclear fission fuel subassemblies 14 from respective first locations toward respective second locations. The subassembly 405 may be further configured to axially translate selected ones of the nuclear fission fuel subassemblies.

In some embodiments the subassembly 405 may be further configured to rotate selected ones of the nuclear fission fuel subassemblies 14. In some other embodiments the subassembly 405 may be further configured to invert selected ones of the nuclear fission fuel subassemblies 14.

Figure 5:
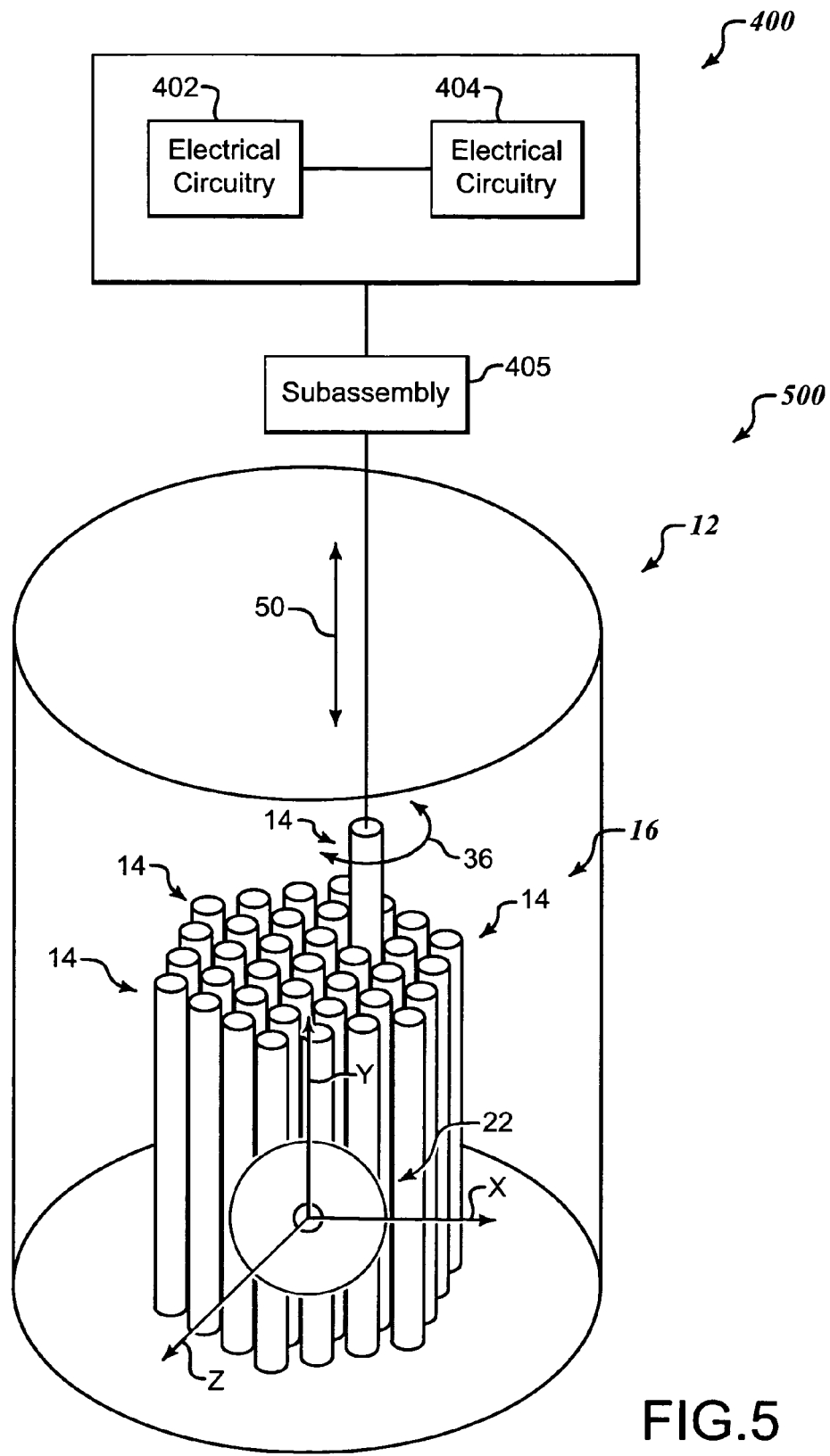
FIG. 5 is block diagram in partial schematic form of an illustrative nuclear fission traveling wave reactor.

Referring now to FIG. 5, in various embodiments an illustrative nuclear fission traveling wave reactor 500 may be provided. The nuclear fission traveling wave reactor 500 includes the nuclear fission traveling wave reactor core 12. As discussed above, the nuclear fission fuel subassemblies 14 are received in the nuclear fission traveling wave reactor core 12. Each of the nuclear fission fuel subassemblies 12 are configured to propagate the nuclear fission traveling wave burnfront 22 therein along first and second dimensions. The electrical circuitry 402 is configured to determine a desired shape of the nuclear fission traveling wave burnfront 22 along the second dimension within the nuclear fission fuel subassemblies 14 according to a selected set of dimensional constraints. The electrical circuitry 404 is configured to determine a migration of selected ones of the nuclear fission fuel subassemblies 14 along the first dimension from respective first locations toward respective second locations in a manner responsive to the desired shape. The subassembly 405 is configured to migrate selected ones of the nuclear fission fuel subassemblies 14 responsive to the electrical circuitry 404.

Thus, the reactor 500 may be embodied as the reactor core 12, discussed above, in combination with and cooperating with the system 400, also discussed above. Because details have been set forth above regarding the reactor core 12 (and its components) and the system 400 (and its components), details need not be repeated for an understanding.

As has been discussed above, in various embodiments the electrical circuitry 404 may be further configured to determine an existing shape of the nuclear fission traveling wave burnfront 22. The electrical circuitry 404 may be further configured to determine a migration of selected ones of the nuclear fission fuel subassemblies 14 along the first dimension from respective first locations toward respective second locations in a manner to establish the desired shape. The electrical circuitry 404 may be further configured to determine a migration of selected ones of the nuclear fission fuel subassemblies 14 along the first dimension from respective first locations toward respective second locations in a manner to maintain the desired shape.

As discussed above, in some embodiments the electrical circuitry 404 may be further configured to determine a time when to migrate the selected ones of the nuclear fission fuel subassemblies 14 along the first dimension from respective first locations toward respective second locations in a manner responsive to the desired shape.

In some embodiments the nuclear fission fuel subassemblies 14 may be elongate along the second dimension.

In some embodiments the first dimension may be substantially orthogonal to an elongated axis of the nuclear fission subassemblies 14. In some embodiments the first dimension and the second dimension may be substantially orthogonal to each other.

In various embodiments, the first dimension may include a radial dimension and the second dimension may include an axial dimension; the first dimension may include an axial dimension and the second dimension may include a radial dimension; the first dimension may include an axial dimension and the second dimension may include a lateral dimension; and/or the first dimension may include a lateral dimension and the second dimension may include an axial dimension.

In some embodiments the first locations may include the outward locations 30 and the second locations include the inward locations 32. The inward locations 32 and the outward locations 30 may be based on geometrical proximity to a central portion of the reactor core 12; neutron flux such that neutron flux at the inward locations 32 is greater than neutron flux at the outward locations 30; and/or reactivity such that $k_{effective}$ at the inward locations 32 is greater than $k_{effective}$ at the outward locations 30.

In some other embodiments the first locations may include the inward locations 32 and the second locations may include the outward locations 30. The inward locations 32 and the outward locations 30 may be based on geometrical proximity to a central portion of the reactor core 12; neutron flux such that neutron flux at the inward locations 32 is greater than neutron flux at the outward locations 30; and/or reactivity such that $k_{effective}$ at the inward locations 32 is greater than $k_{effective}$ at the outward locations 30.

In some embodiments the first locations and the second locations may be located on opposite sides of a reference value along the first dimension.

In some embodiments the first locations and the second locations may include at least one attribute that is substantially equalized. The at least one attribute may include geometrical proximity to a central region of the reactor core 12; neutron flux; and/or reactivity.

In various embodiments and as discussed above, the electrical circuitry 404 may be further configured to determine rotation of at least one of the selected ones of the nuclear fission fuel subassemblies 14 and/or further configured to determine inversion of at least one of the selected ones of the nuclear fission fuel subassemblies 14.

In some embodiments the selected set of dimensional constraints may include a predetermined maximum distance along the second dimension. In some other embodiments the selected set of dimensional constraints may be a function of at least one burnfront criteria, such as without limitation: neutron flux, such as neutron flux that is associated with at least one of the selected ones of the nuclear fission fuel subassemblies 14; neutron fluence, such as neutron fluence that is associated with at least one of the selected ones of the nuclear fission fuel subassemblies 14; and/or burnup, such as burnup that is associated with at least one of the selected ones of the nuclear fission fuel subassemblies 14. In some other embodiments the burnfront criteria may include burnfront location within at least one of the selected ones of the nuclear fission fuel subassemblies 14.

In various embodiments the electrical circuitry 404 may be further configured to determine a radial migration of selected ones of the nuclear fission fuel subassemblies 14 along the first dimension from respective first locations toward respective second locations. The electrical circuitry 404 may be further configured to determine a spiral migration of selected ones of the nuclear fission fuel subassemblies 14 along the first dimension from respective first locations toward respective second locations. The electrical circuitry 404 may be further configured to determine an axial translation of selected ones of the nuclear fission fuel subassemblies 14.

In various embodiments the electrical circuitry 402 may be further configured to determine a substantially spherical shape of the nuclear fission traveling wave burnfront 22 and/or a continuously curved surface shape of the nuclear fission traveling wave burnfront 22. The desired shape of the nuclear fission traveling wave burnfront 22 may be substantially rotationally symmetrical around the second dimension; may have substantial n-fold rotational symmetry around the second dimension; and/or may be asymmetrical, such as rotationally asymmetrical around the second dimension.

In some embodiments the subassembly 405 may include a nuclear fuel handling apparatus. As discussed above, the subassembly 405 may include any suitable nuclear fuel handling apparatus known in the art, such as without limitation an in-core nuclear fuel handling apparatus. However, in some other embodiments the subassembly 405 may include an extra-core fuel handling apparatus.

As also discussed above, in various embodiments the subassembly 405 may be further configured to radially migrate selected ones of the nuclear fission fuel subassemblies 14 from respective first locations toward respective second locations. The subassembly 405 may be further configured to spirally migrate selected ones of the nuclear fission fuel subassemblies 14 from respective first locations toward respective second locations. The subassembly 405 may be further configured to axially translate selected ones of the nuclear fission fuel subassemblies 14. The subassembly 405 may be further configured to rotate selected ones of the nuclear fission fuel subassemblies 14. The subassembly 405 may be further configured to invert selected ones of the nuclear fission fuel subassemblies 14.

Figure 6A:
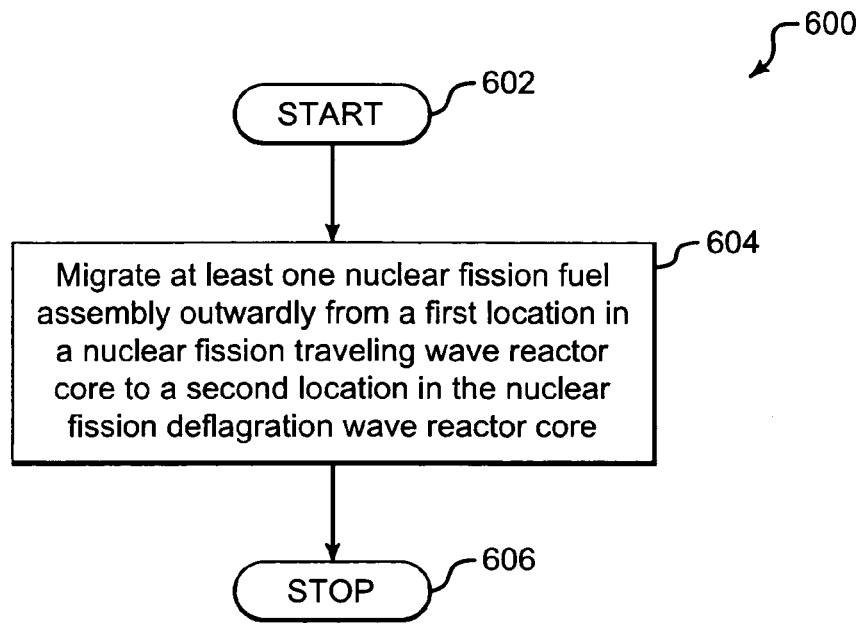
FIG. 6A is a flow chart of an illustrative method of operating a nuclear fission traveling wave reactor.

Referring now to FIG. 6A, in some embodiments a method 600 is provided for operating a nuclear fission traveling wave reactor. The method 600 starts at a block 602. Referring additionally to FIG. 1B, at a block 604 at least one nuclear fission fuel assembly 14 is migrated outwardly from a first location in the nuclear fission traveling wave reactor core 12 to a second location in the nuclear fission traveling wave reactor core 12. The method 600 stops at a block 606.

Figure 6B:
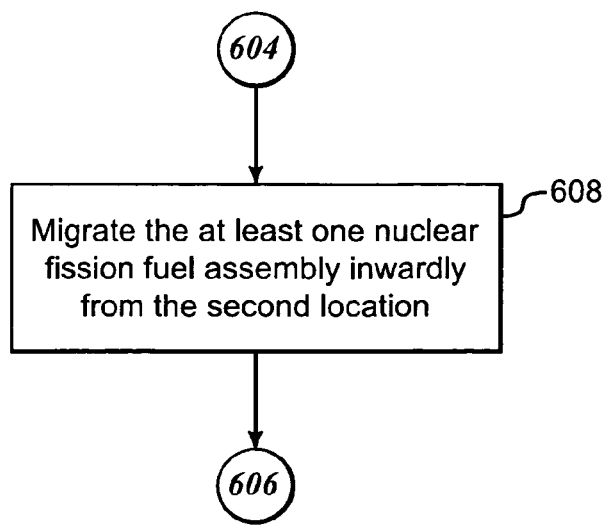
FIG. 6B is a block diagram of a detail of part of the method of FIG. 6A.

In some embodiments and referring additionally to FIG. 6B, at a block 608 the at least one nuclear fission fuel assembly 14 may be migrated inwardly from the second location.

In various embodiments, the first locations and the second locations may be based on geometrical proximity to a central portion of the reactor core 12; neutron flux such that neutron flux at the first locations is greater than neutron flux at the second locations; and reactivity such that $k_{effective}$ at the first locations is greater than $k_{effective}$ at the second locations.

Figure 7:
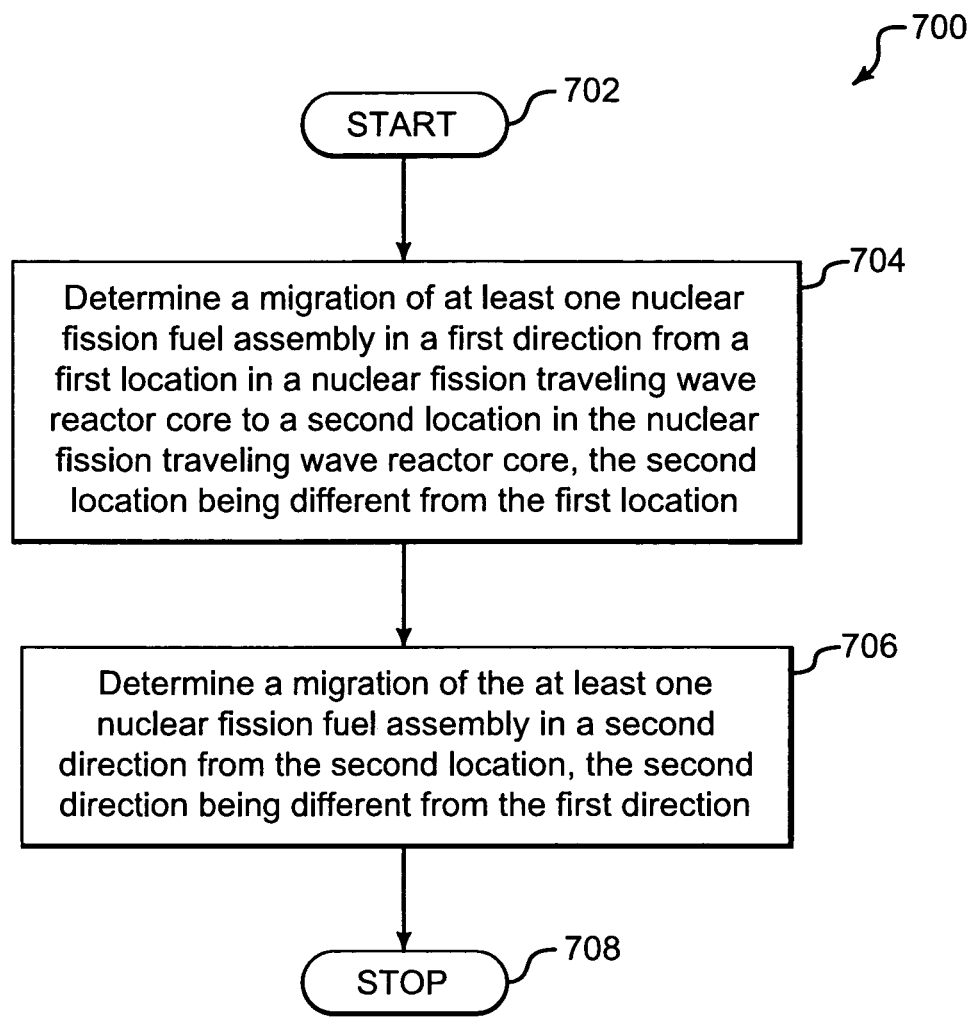
FIG. 7 is a flow chart of an illustrative method of operating a nuclear fission traveling wave reactor.

Referring now to FIG. 7, in some embodiments a method 700 is provided for operating a nuclear fission traveling wave reactor. The method 700 starts at a block 702. Referring additionally to FIG. 1B, at a block 704 a migration is determined of at least one nuclear fission fuel assembly 14 in a first direction from a first location in a nuclear fission traveling wave reactor core 12 to a second location in the nuclear fission traveling wave reactor core 12. The second location is different from the first location. At a block 706 a migration is determined of the at least one nuclear fission fuel assembly 14 in a second direction from the second location. The second direction is different from the first direction. The method 700 stops at a block 708.

In some embodiments, the first direction may be outwardly and the second direction may be inwardly. The first locations and the second locations may be based various attributes or parameters, such as without limitation: geometrical proximity to a central portion of the reactor core 12; neutron flux such that neutron flux at the first locations is greater than neutron flux at the second locations; and/or reactivity such that $k_{effective}$ at the first locations is greater than $k_{effective}$ at the second locations.

In some other embodiments, the first direction may be inwardly and the second direction may be outwardly. The second locations and the first locations may be based on various attributes or parameters, such as without limitation: geometrical proximity to a central portion of the reactor core 12; neutron flux such that neutron flux at the second locations is greater than neutron flux at the first locations; and/or reactivity such that $k_{effective}$ at the second locations is greater than $k_{effective}$ at the first locations.

Figure 8:
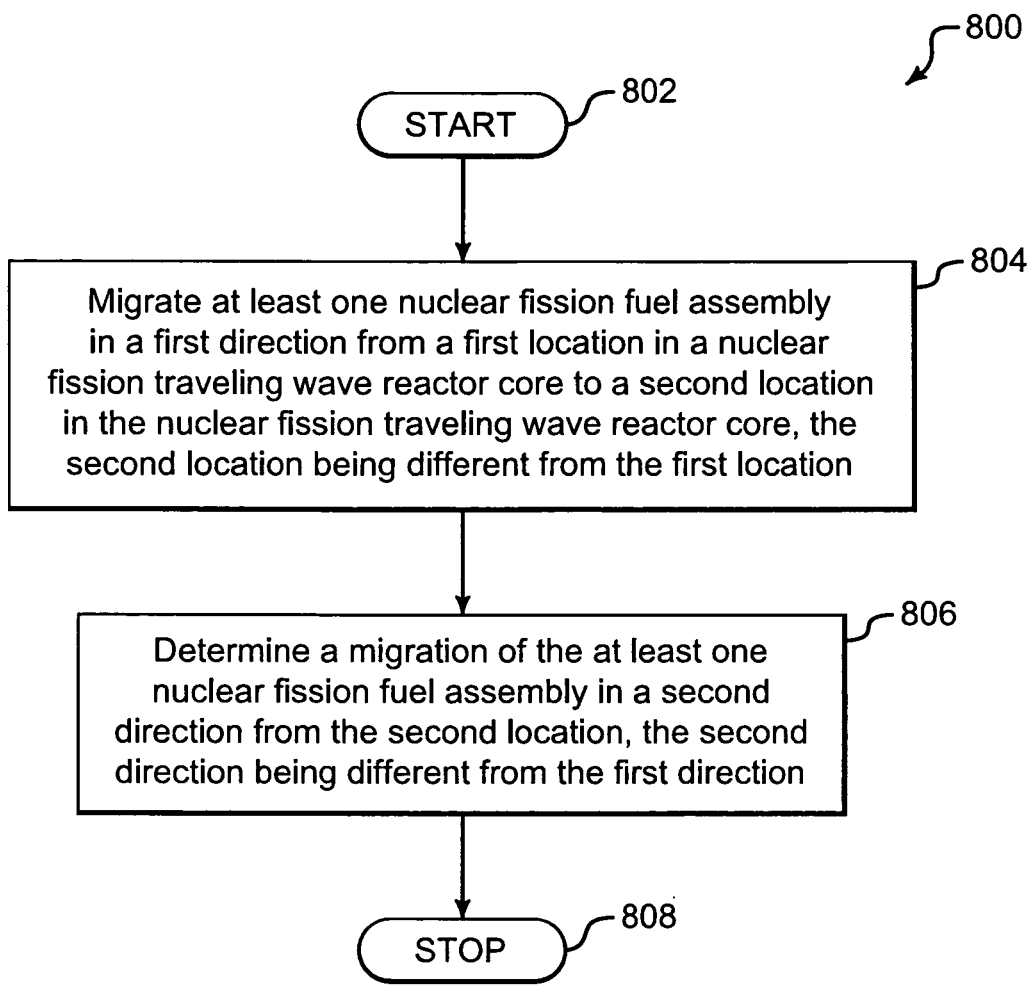
FIG. 8 is a flow chart of an illustrative method of operating a nuclear fission traveling wave reactor.

Referring now to FIG. 8, in some embodiments a method 800 is provided for operating a nuclear fission traveling wave reactor. The method 800 starts at a block 802. Referring additionally to FIG. 1B, at a block 804 at least one nuclear fission fuel assembly 14 is migrated in a first direction from a first location in the nuclear fission traveling wave reactor core 12 to a second location in the nuclear fission traveling wave reactor core 12. The second location is different from the first location. At a block 806 a migration is determined of the at least one nuclear fission fuel assembly 14 in a second direction from the second location. The second direction is different from the first direction. The method 800 stops at a block 808.

In some embodiments, the first direction may be outwardly and the second direction may be inwardly. The first locations and the second locations may be based various attributes or parameters, such as without limitation: geometrical proximity to a central portion of the reactor core 12; neutron flux such that neutron flux at the first locations is greater than neutron flux at the second locations; and/or reactivity such that $k_{effective}$ at the first locations is greater than $k_{effective}$ at the second locations.

In some other embodiments, the first direction may be inwardly and the second direction may be outwardly. The second locations and the first locations may be based on various attributes or parameters, such as without limitation: geometrical proximity to a central portion of the reactor core 12; neutron flux such that neutron flux at the second locations is greater than neutron flux at the first locations; and/or reactivity such that $k_{effective}$ at the second locations is greater than $k_{effective}$ at the first locations.

Figure 9:
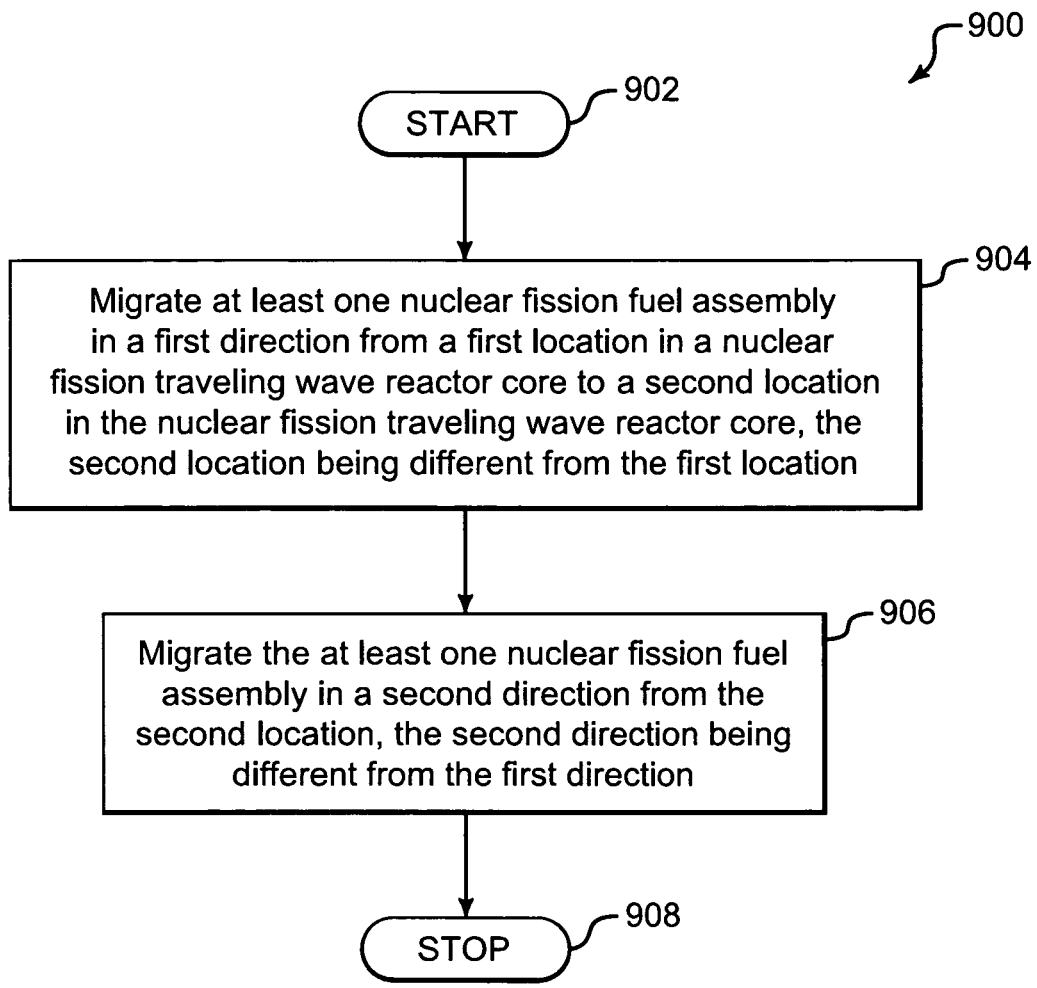
FIG. 9 is a flow chart of an illustrative method of operating a nuclear fission traveling wave reactor.

Referring now to FIG. 9, in some embodiments a method 900 is provided for operating a nuclear fission traveling wave reactor. The method 900 starts at a block 902. Referring additionally to FIG. 1B, at a block 904 at least one nuclear fission fuel assembly 14 is migrated in a first direction from a first location in the nuclear fission traveling wave reactor core 12 to a second location in the nuclear fission traveling wave reactor core 12. The second location is different from the first location. At a block 906 the at least one nuclear fission fuel assembly 14 is migrated in a second direction from the second location. The second direction is different from the first direction. The method 900 stops at a block 908.

In some embodiments, the first direction may be outwardly and the second direction may be inwardly. The first locations and the second locations may be based various attributes or parameters, such as without limitation: geometrical proximity to a central portion of the reactor core 12; neutron flux such that neutron flux at the first locations is greater than neutron flux at the second locations; and/or reactivity such that $k_{effective}$ at the first locations is greater than $k_{effective}$ at the second locations.

In some other embodiments, the first direction may be inwardly and the second direction may be outwardly. The second locations and the first locations may be based on various attributes or parameters, such as without limitation: geometrical proximity to a central portion of the reactor core 12; neutron flux such that neutron flux at the second locations is greater than neutron flux at the first locations; and/or reactivity such that $k_{effective}$ at the second locations is greater than $k_{effective}$ at the first locations.

Figure 10A:
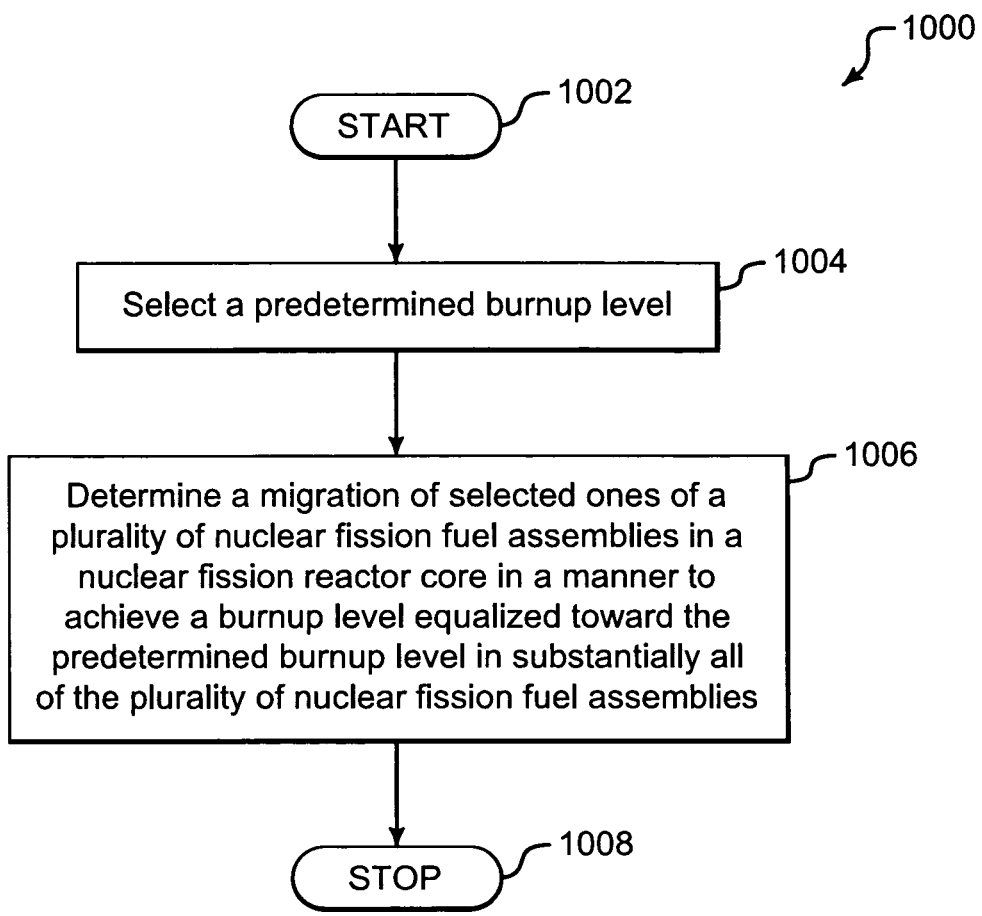
FIG. 10A is a flow chart of an illustrative method of operating a nuclear fission reactor.

Referring now to FIG. 10A, in some embodiments a method 1000 is provided for operating a nuclear fission reactor. The method 1000 starts at a block 1002. At a block 1004 a predetermined burnup level is selected. At a block 1006 a migration is determined of selected ones of nuclear fission fuel assemblies in a nuclear fission reactor core in a manner to achieve a burnup level equalized toward the predetermined burnup level in substantially all of the nuclear fission fuel assemblies. The method 1000 stops at a block 1008.

Figure 10B:
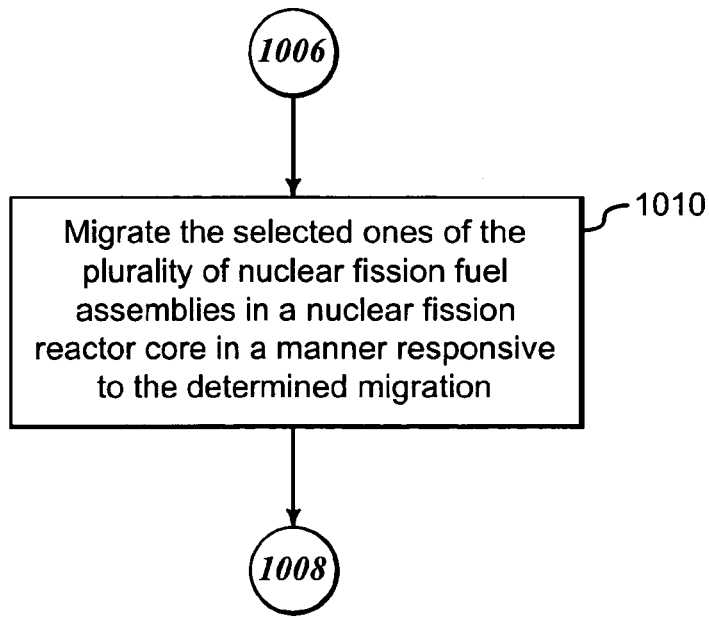
FIGS. 10B-10D are block diagrams of details of parts of the method of FIG. 10A.

Referring additionally to FIG. 10B, in some embodiments at a block 1010 the selected ones of the nuclear fission fuel assemblies may be migrated in a nuclear fission reactor core in a manner responsive to the determined migration.

Figure 10C:
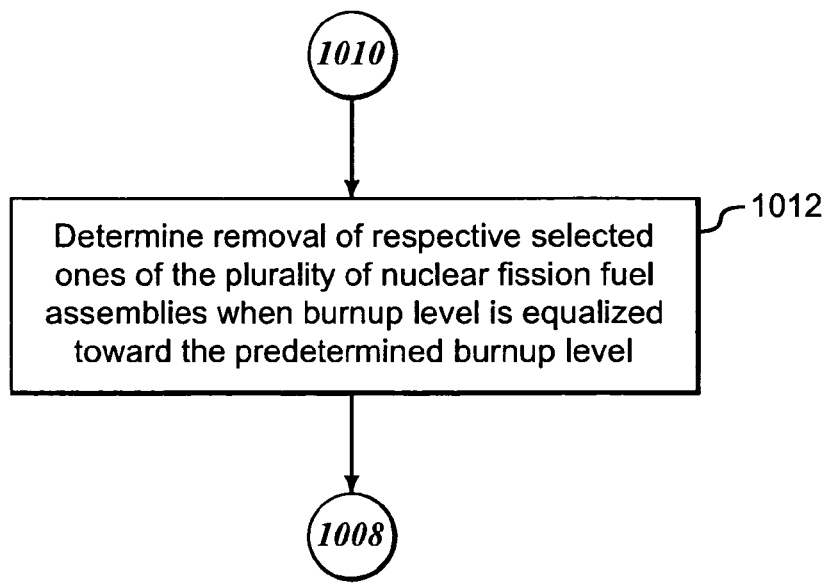

Referring additionally to FIG. 10C, in some embodiments at a block 1012 removal may be determined of respective selected ones of the nuclear fission fuel assemblies when burnup level is equalized toward the predetermined burnup level.

Figure 10D:
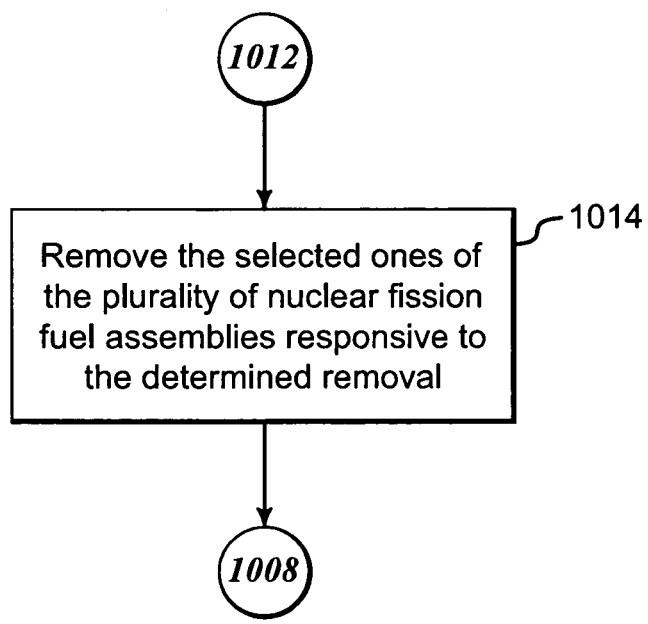

Referring additionally to FIG. 10D, in some embodiments at a block 1014 the selected ones of the nuclear fission fuel assemblies may be removed responsive to the determined removal.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a"

and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of controlling a nuclear fission traveling wave reactor, the method comprising:
   for a nuclear fission traveling wave burnfront propagating along first and second dimensions in a nuclear fission reactor core, determining a desired shape of the nuclear fission traveling wave burnfront along the second dimension within a plurality of nuclear fission fuel subassemblies according to a selected set of dimensional constraints; and
   determining a migration of selected ones of the plurality of nuclear fission fuel subassemblies along the first dimension from respective first locations in the nuclear fission reactor core toward respective second locations in the nuclear fission reactor core in a manner responsive to the desired shape.

2. The method of claim 1, further comprising:
   determining an existing shape of the nuclear fission traveling wave burnfront.

3. The method of claim 1, wherein determining a migration of selected ones of the plurality of nuclear fission fuel subassemblies along the first dimension from respective first locations toward respective second locations in a manner responsive to the desired shape includes determining a migration of selected ones of the plurality of nuclear fission fuel subassemblies along the first dimension from respective first locations toward respective second locations in a manner to establish the desired shape.

4. The method of claim 1, wherein determining a migration of selected ones of the plurality of nuclear fission fuel subassemblies along the first dimension from respective first locations toward respective second locations in a manner responsive to the desired shape includes determining a migration of selected ones of the plurality of nuclear fission fuel subassemblies along the first dimension from respective first locations toward respective second locations in a manner to maintain the desired shape.

5. The method of claim 1, further comprising:
   determining a time when to migrate the selected ones of the plurality of nuclear fission fuel subassemblies along the first dimension from respective first locations toward respective second locations in a manner responsive to the desired shape.

6. The method of claim 1, further comprising:
   migrating selected ones of the plurality of nuclear fission fuel subassemblies along the first dimension from respective first locations toward respective second locations in a manner responsive to the desired shape.

7. The method of claim 1, wherein the plurality of nuclear fission fuel subassemblies are elongate along the second dimension.

8. The method of claim 1, wherein the first dimension is substantially orthogonal to an elongated axis of the plurality of nuclear fission subassemblies.

9. The method of claim 1, wherein the first dimension and the second dimension are substantially orthogonal to each other.

10. The method of claim 1, wherein:
    the first dimension includes a radial dimension; and
    the second dimension includes an axial dimension.

11. The method of claim 1, wherein:
    the first dimension includes an axial dimension; and
    the second dimension includes a radial dimension.

12. The method of claim 1, wherein:
    the first dimension includes an axial dimension; and
    the second dimension includes a lateral dimension.

13. The method of claim 1, wherein:
    the first dimension includes a lateral dimension; and
    the second dimension includes an axial dimension.

14. The method of claim 1, wherein:
    the first locations are intermediate the second locations and an exterior of the nuclear fission reactor core.

15. The method of claim 14, wherein an attribute of position within the nuclear fission reactor core of the second locations and the first locations include geometrical proximity to a central portion of the nuclear fission reactor core.

16. The method of claim 14, wherein the inward locations and the outward locations are based on neutron flux such that neutron flux at the inward locations is greater than neutron flux at the outward locations.

17. The method of claim 14, wherein the inward locations and the outward locations are based on reactivity such that $k_{effective}$ at the inward locations is greater than $k_{effective}$ at the outward locations.

18. The method of claim 1, wherein:
the first locations include inward locations; and
the second locations include outward locations.

19. The method of claim 18, wherein the inward locations and outward locations are based on geometrical proximity to a central portion of the reactor core.

20. The method of claim 18, wherein the inward locations and the outward locations are based on neutron flux such that neutron flux at the inward locations is greater than neutron flux at the outward locations.

21. The method of claim 18, wherein the inward locations and the outward locations are based on reactivity such that $k_{effective}$ at the inward locations is greater than $k_{effective}$ at the outward locations.

22. The method of claim 1, wherein the first locations and the second locations are located on opposite sides of a reference value along the first dimension.

23. The method of claim 1, wherein the first locations and the second locations include at least one attribute that is substantially equalized.

24. The method of claim 23, wherein the at least one attribute includes an attribute chosen from geometrical proximity to a central region of the reactor core, neutron flux, and reactivity.

25. The method of claim 1, wherein determining a migration of selected ones of the plurality of nuclear fission fuel subassemblies along the first dimension from respective first locations toward respective second locations includes determining a rotation of at least one of the selected ones of the plurality of nuclear fission fuel subassemblies.

26. The method of claim 1, wherein determining a migration of selected ones of the plurality of nuclear fission fuel subassemblies along the first dimension from respective first locations toward respective second locations includes determining an inversion of at least one of the selected ones of the plurality of nuclear fission fuel subassemblies.

27. The method of claim 1, wherein the selected set of dimensional constraints includes a predetermined maximum distance along the second dimension.

28. The method of claim 1, wherein the selected set of dimensional constraints is a function of at least one burnfront criteria.

29. The method of claim 28, wherein the burnfront criteria includes neutron flux.

30. The method of claim 29, wherein the neutron flux is associated with at least one of the selected ones of the plurality of nuclear fission fuel subassemblies.

31. The method of claim 28, wherein the burnfront criteria includes neutron fluence.

32. The method of claim 31, wherein the neutron fluence is associated with at least one of the selected ones of the plurality of nuclear fission fuel subassemblies.

33. The method of claim 28, wherein the burnfront criteria includes burnup.

34. The method of claim 33, wherein the burnup is associated with at least one of the selected ones of the plurality of nuclear fission fuel subassemblies.

35. The method of claim 28, wherein the burnfront criteria includes burnfront location within at least one of the selected ones of the plurality of nuclear fission fuel subassemblies.

36. The method of claim 1, wherein determining a migration of selected ones of the plurality of nuclear fission fuel subassemblies along the first dimension from respective first locations toward respective second locations includes determining a radial migration of selected ones of the plurality of nuclear fission fuel subassemblies along the first dimension from respective first locations toward respective second locations.

37. The method of claim 1, wherein determining a migration of selected ones of the plurality of nuclear fission fuel subassemblies along the first dimension from respective first locations toward respective second locations includes determining a spiral migration of selected ones of the plurality of nuclear fission fuel subassemblies along the first dimension from respective first locations toward respective second locations.

38. The method of claim 1, wherein determining a migration of selected ones of the plurality of nuclear fission fuel subassemblies along the first dimension from respective first locations toward respective second locations includes determining an axial translation of selected ones of the plurality of nuclear fission fuel subassemblies.

39. The method of claim 1, wherein the desired shape of the nuclear fission traveling wave burnfront includes a shape chosen from a substantially spherical shape, a shape conforming to a selected continuously curved surface, a shape that is substantially rotationally symmetrical around the second dimension, and a shape having substantial n-fold rotational symmetry around the second dimension.

40. The method of claim 1, wherein the desired shape of the nuclear fission traveling wave burnfront is asymmetrical.

41. The method of claim 40, wherein the desired shape of the nuclear fission traveling wave burnfront is rotationally asymmetrical around the second dimension.

* * * * *